(12) United States Patent
Higuchi et al.

(10) Patent No.: US 10,230,918 B2
(45) Date of Patent: Mar. 12, 2019

(54) CONTROLLING SOUND OUTPUT BASED ON AN OUTPUT MODE OF A DEVICE

(71) Applicant: SONY CORPORATION, Tokyo (JP)

(72) Inventors: Satoshi Higuchi, Kanagawa (JP); Masayoshi Ogura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 148 days.

(21) Appl. No.: 14/497,666

(22) Filed: Sep. 26, 2014

(65) Prior Publication Data

US 2015/0103253 A1 Apr. 16, 2015

(30) Foreign Application Priority Data

Oct. 11, 2013 (JP) .................. 2013-213684

(51) Int. Cl.
| | |
|---|---|
| H04N 5/60 | (2006.01) |
| H04N 21/4367 | (2011.01) |
| H04N 21/4363 | (2011.01) |
| H04N 21/436 | (2011.01) |
| H04N 21/81 | (2011.01) |
| G09G 5/00 | (2006.01) |

(52) U.S. Cl.
CPC ......... *H04N 5/602* (2013.01); *H04N 21/4367* (2013.01); *H04N 21/43615* (2013.01); *H04N 21/43635* (2013.01); *H04N 21/8106* (2013.01); *G09G 5/006* (2013.01); *G09G 2370/06* (2013.01); *G09G 2370/12* (2013.01)

(58) Field of Classification Search
CPC ... G06F 3/00; G06F 3/02; G06F 3/011; G06F 3/162
USPC .......................................................... 710/38
See application file for complete search history.

(56) References Cited

U.S. PATENT DOCUMENTS

| | | | | |
|---|---|---|---|---|
| 2002/0021372 A1* | 2/2002 | Konda | .................. | H04N 5/775 348/730 |
| 2003/0217369 A1* | 11/2003 | Heredia | ................ | H04N 7/162 725/152 |
| 2005/0032500 A1* | 2/2005 | Nashif | .................... | H04R 5/02 455/345 |
| 2006/0294268 A1* | 12/2006 | Yang | ..................... | G06F 3/165 710/62 |
| 2007/0233905 A1* | 10/2007 | Hatano | ............... | H04M 1/6066 710/16 |
| 2009/0174821 A1* | 7/2009 | Matsuo | .............. | H04L 12/2805 348/725 |
| 2010/0161856 A1* | 6/2010 | Ding | ...................... | H04R 3/00 710/62 |

(Continued)

FOREIGN PATENT DOCUMENTS

JP 2013-051533 A 3/2013

*Primary Examiner* — Farley Abad
*Assistant Examiner* — Getente A Yimer
(74) *Attorney, Agent, or Firm* — Chip Law Group

(57) ABSTRACT

There is provided a device control apparatus including an information acquisition section configured to acquire designation information for designating an output destination of a sound input from an external device, and an output control section configured to, in a case where the designation information designates, out of one sound output apparatus and another sound output apparatus, the another sound output apparatus, cause each of the one sound output apparatus and the another sound output apparatus to output the sound.

14 Claims, 39 Drawing Sheets

100A : AV SYSTEM

(56) References Cited

U.S. PATENT DOCUMENTS

2011/0164181 A1* 7/2011 Higuchi .......... H04N 21/42204
                                                                    348/552

* cited by examiner

FIG. 2

Logical address

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Specific Use |
| 15 | Unregistered (as initiator address) Broadcast (as destination address) |

CEC DATA STRUCTURE

HEADER BLOCK DATA STRUCTURE

100B2 : AV SYSTEM

F I G. 18

| CEC MODE<br>COMPARISON ITEM | OFF | MODE1 | MODE2 |
|---|---|---|---|
| OPERATION OF ACQUIRING LOGICAL ADDRESS BY POLLING | NON-COMPATIBLE | ACQUIRE Audio System (5) | DO NOT PERFORM POLLING, AND ACQUIRE Unregistered (15) |
| System Audio Control | NON-COMPATIBLE | COMPATIBLE | NON-COMPATIBLE |
| Audio Return Channel | NON-COMPATIBLE | COMPATIBLE | NON-COMPATIBLE |
| Routing Control | NON-COMPATIBLE | COMPATIBLE | COMPATIBLE |
| System Standby | NON-COMPATIBLE | COMPATIBLE | COMPATIBLE |
| OSD Name Transfer | NON-COMPATIBLE | COMPATIBLE | NON-COMPATIBLE |
| Remote Control Pass Through | NON-COMPATIBLE | COMPATIBLE | NON-COMPATIBLE |
| Give Device Power Status | NON-COMPATIBLE | COMPATIBLE | NON-COMPATIBLE |

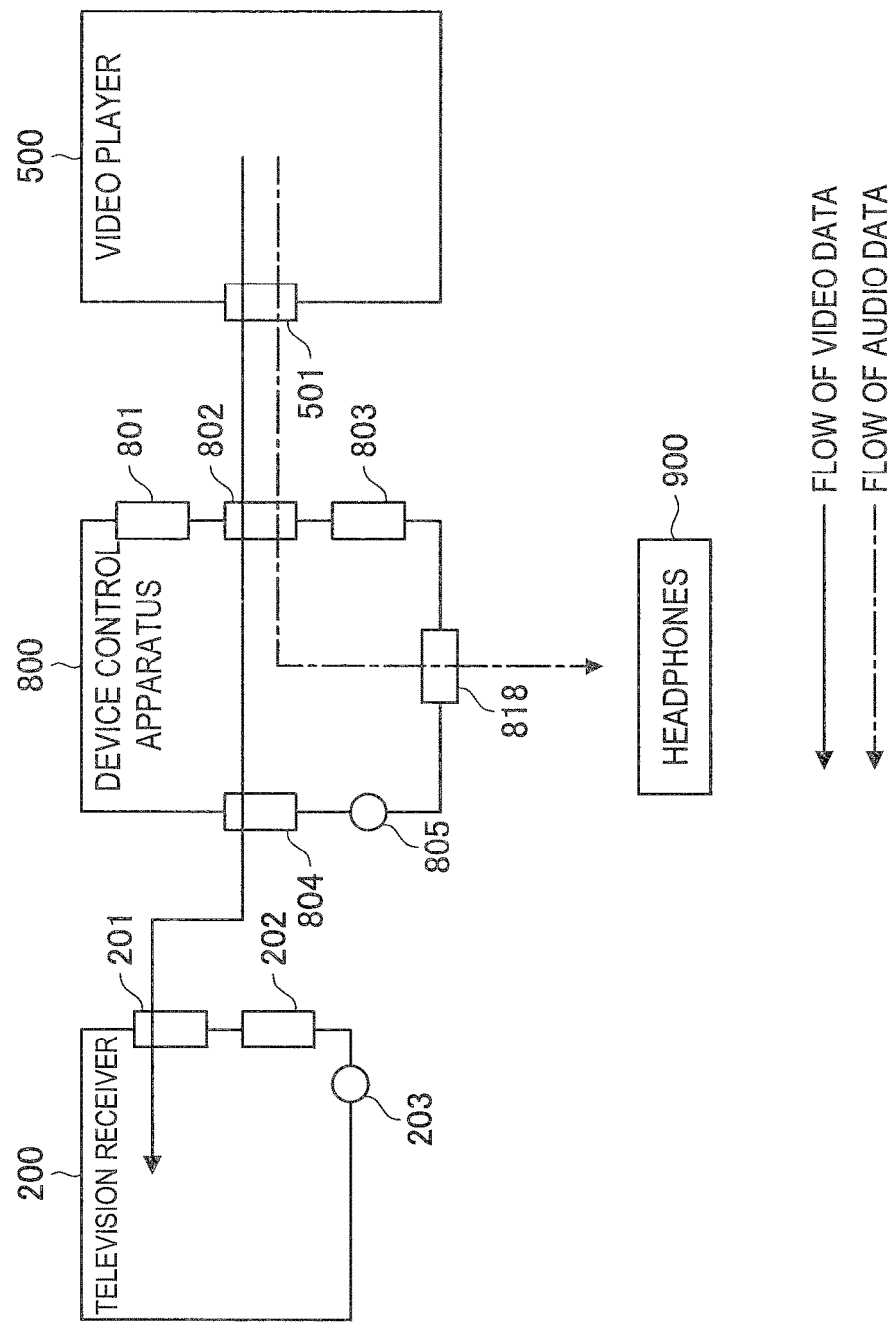

FIG. 23

| POWER | OUTPUT DESTINATION MODE | CEC MODE | | |
|---|---|---|---|---|
| | | MODE 1 | | MODE 2 | OFF |
| | | System Audio Mode = On | System Audio Mode = Off | | |
| ON | TV+HP Audio Out = Off | (C1)<br>HP SOUND: PRESENT<br>EDID: PERFORMANCE OF SELF DEVICE<br>SOUND TRANSMISSION: ABSENT | (C2)<br>HP SOUND: ABSENT (MUTE)<br>EDID: PERFORMANCE OF LATTER DEVICE<br>SOUND TRANSMISSION: PRESENT | (C3)<br>HP SOUND: PRESENT<br>EDID: PERFORMANCE OF SELF DEVICE<br>SOUND TRANSMISSION: ABSENT | --- |
| | TV+HP Audio Out = On | (C4)<br>HP SOUND: PRESENT<br>EDID: PERFORMANCE OF SELF DEVICE<br>SOUND TRANSMISSION: ABSENT | (C5)<br>HP SOUND: PRESENT (MUTE OFF)<br>EDID: PERFORMANCE OF LATTER DEVICE<br>SOUND TRANSMISSION: PRESENT | (C6)<br>HP SOUND: PRESENT<br>EDID: PERFORMANCE OF LATTER DEVICE<br>SOUND TRANSMISSION: PRESENT | --- |
| OFF | (D.C) | --- | (C2#)<br>HP SOUND: ABSENT (BECAUSE POWER IS OFF)<br>EDID: PERFORMANCE OF LATTER DEVICE<br>SOUND TRANSMISSION: PRESENT | (C6#)<br>HP SOUND: PRESENT<br>EDID: PERFORMANCE OF LATTER DEVICE<br>SOUND TRANSMISSION: PRESENT | --- |

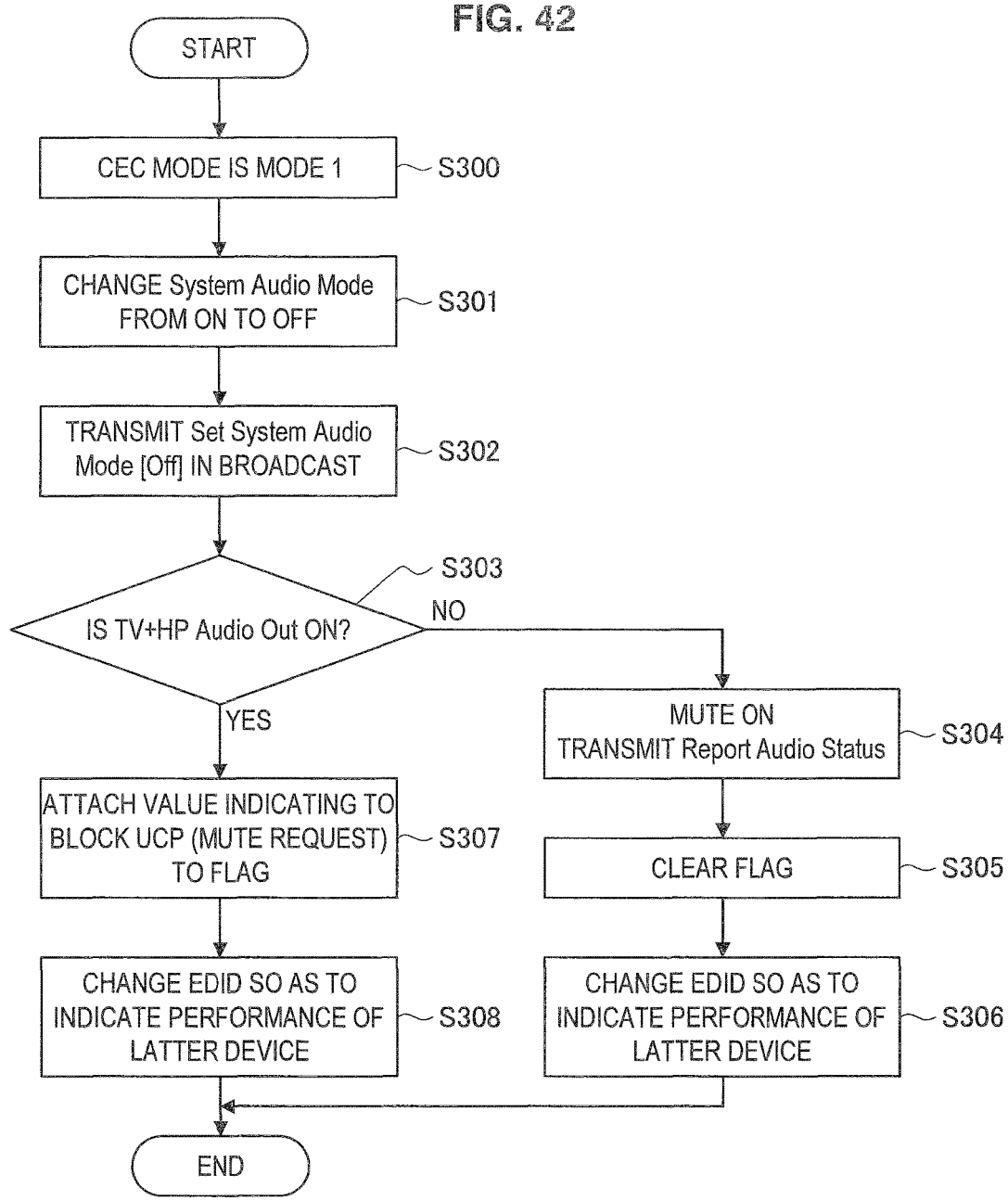

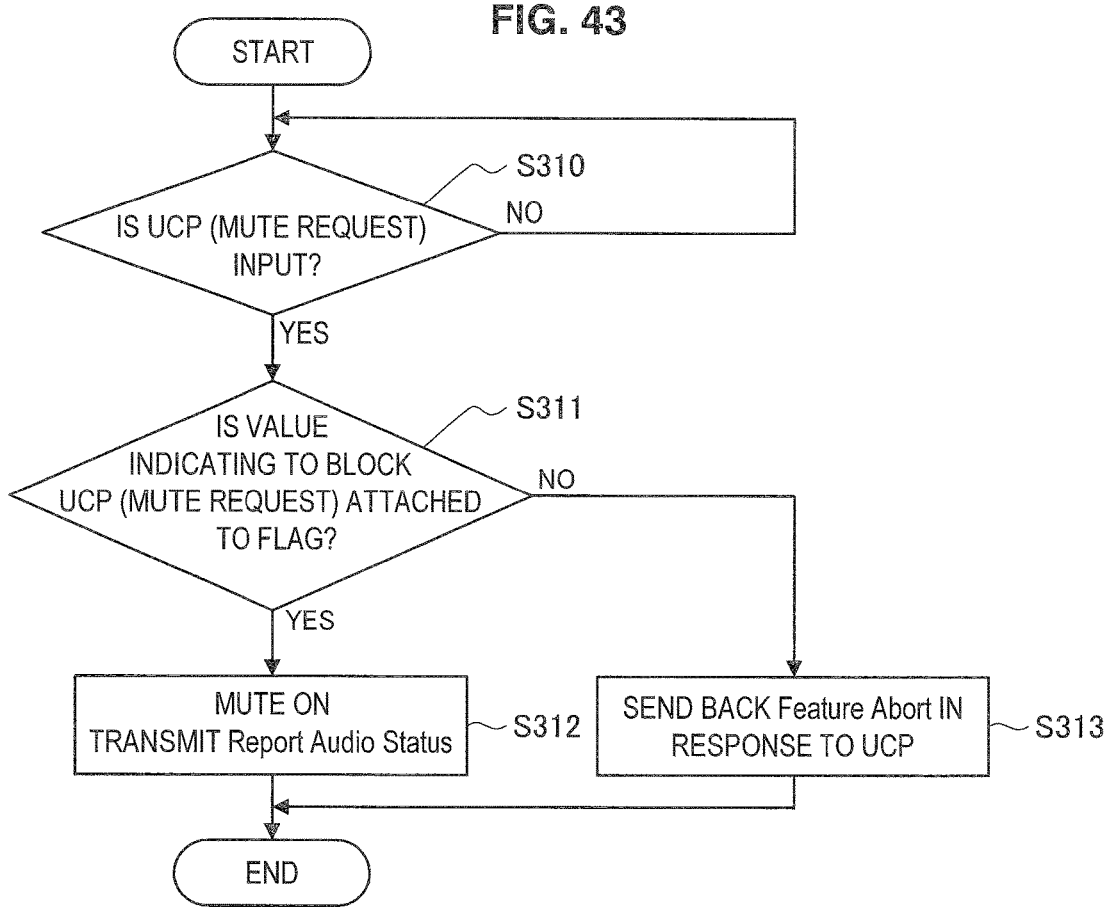

CONTROLLING SOUND OUTPUT BASED ON AN OUTPUT MODE OF A DEVICE

CROSS REFERENCE TO RELATED APPLICATIONS

This application claims the benefit of Japanese Priority Patent Application JP 2013-213684 filed Oct. 11, 2013, the entire contents of which are incorporated herein by reference.

BACKGROUND

The present disclosure relates to a device control apparatus and a device control method.

Recently, a high definition multimedia interface (HDMI) has been drawing attention as a digital interface for transmitting a video signal (image signal) and a sound signal (audio signal). HDMI is an interface in which a sound transmitting function and a copyright protecting function are added for the use in audio visual (AV) devices, to the digital visual interface (DVI) standard, which is a standard of connection between a personal computer (PC) and a display.

Further, in the HDMI standard, inter-device control using consumer electronics control (CEC) is defined. The CEC is one transmission line prepared in the HDMI standard, and performs bidirectional data transmission. Using this CEC line, various controls can be performed based on unique physical and logical addresses assigned to each device present in an HDMI network (for example, see JP 2013-51533A).

Here, in the case where a CEC function called system audio control as disclosed in JP 2013-51533A is introduced, output destinations of sounds are exclusive between one sound output apparatus and another sound output apparatus. To be more specific, in the case where a system audio mode is OFF, headphones are set to be in a mute state, and the sound is output from a television receiver. On the other hand, in the case where the system audio mode is ON, the television receiver is set to be in the mute state, and the sound is output from the headphones.

SUMMARY

However, there is a case where it is desired to output sounds simultaneously from one sound output apparatus and another sound output apparatus. For example, there is a demand to listen to sounds in different volumes and sound fields simultaneously by listening to a sound output from a television receiver while listening to a sound output from headphones. In light of the foregoing, it is desirable to provide technology capable of outputting sounds simultaneously from one sound output apparatus and another sound output apparatus with an easy technique.

According to an embodiment of the present disclosure, there is provided a device control apparatus which includes an information acquisition section configured to acquire designation information for designating an output destination of a sound input from an external device, and an output control section configured to, in a case where the designation information designates, out of one sound output apparatus and another sound output apparatus, the another sound output apparatus, cause each of the one sound output apparatus and the another sound output apparatus to output the sound.

According to another embodiment of the present disclosure, there is provided a device control method which includes acquiring designation information for designating an output destination of a sound input from an external device, and causing, in a case where the designation information designates, out of one sound output apparatus and another sound output apparatus, the another sound output apparatus, each of the one sound output apparatus and the another sound output apparatus to output the sound.

According to one or more of embodiments of the present disclosure, there is provided technology capable of outputting sounds simultaneously from one sound output apparatus and another sound output apparatus with an easy technique. Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 2 is a diagram showing a CEC table indicating correspondence relationship between a device and a CEC logical address;

FIG. 18 is a diagram illustrating examples of functions exhibited in respective modes of a first sound output mode and a second sound output mode;

FIG. 19 is a diagram illustrating an operation example in the first sound output mode;

FIG. 23 is a diagram showing an example of a relationship between each setting and a state of sound output;

FIG. 38 is a diagram showing an operation example of the device control apparatus in a case where TV+HP Audio Out is switched from OFF to ON;

FIG. 39 is a diagram showing a modified operation example of the device control apparatus in a case where TV+HP Audio Out is switched from OFF to ON;

FIG. 41 is a diagram showing an operation example of the device control apparatus in a case where a system audio mode is switched from OFF to ON;

FIG. 42 is a diagram showing an operation example of the device control apparatus in a case where the system audio mode is switched from ON to OFF; and FIG. 43 is a diagram showing an operation example of command monitoring processing performed by the device control apparatus.

DETAILED DESCRIPTION OF THE EMBODIMENT(S)

Figure 1:
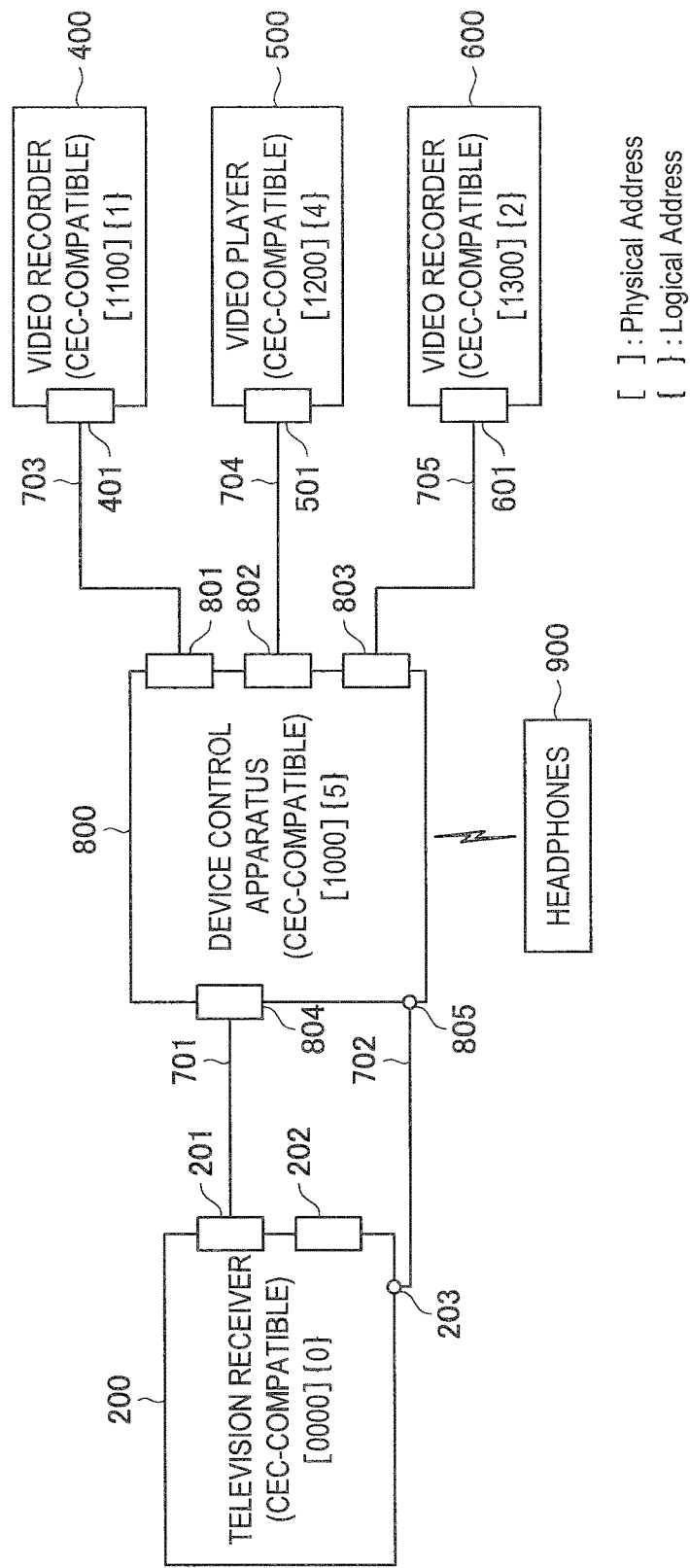
FIG. 1 is a block diagram showing a basic configuration example of an AV system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets or numerals after the same reference numeral. Note that, in the case where it is not necessary to distinguish the multiple structural elements that have substantially the same function and structure from one another, the multiple structural elements are denoted with the same reference numeral only.

Note that the description will be given in the following order.

1. Description of HDMI standard
2. Description of embodiment
2-1. Basic configuration example
2-2. Switching of sound output
2-3. Case where logical address is already acquired
2-4. Two sound output modes
2-5. Simultaneous output of sounds
3. Conclusion «1. Description of HDMI Standard»

First, the HDMI standard that may be applied to an AV system (device control apparatus) according to an embodiment of the present disclosure will be described. In recent years, a high definition multimedia interface (HDMI) has been in widespread use as a digital interface for transmitting a video signal (image signal) and a sound signal (audio signal). HDMI is an interface having a sound transmitting function and a copyright protecting function in addition to the digital visual interface (DVI) standard, which is a standard of connection between a personal computer (PC) and a display, and is arranged for audio visual (AV) devices. The detail of the HDMI standard is described in "High-Definition Multimedia Interface Specification Version 1.4", for example.

Further, an interface of the HDMI standard is capable of performing bidirectional transmission of a control signal. Accordingly, for example, in the interface of the HDMI standard, the control signal may be transmitted from a television receiver to an output apparatus connected to the television receiver by an HDMI cable, such as a set top box (STB) or a video disc player. In this way, the control signal is transmitted by the television receiver, and thus, a user can control an entire AV system using a remote control of the television receiver. Note that the signals transmitted using a transmission cable of the HDMI standard include, in addition to control instruction for controlling the device, a response to the instruction and a signal indicating the state of the device, and those signals are each collectively referred to as control signal in this specification.

In the HDMI standard, inter-device control using consumer electronics control (CEC) is defined. The CEC is one transmission line prepared in the HDMI standard, and performs bidirectional data transmission. Using this CEC line, various controls can be performed based on unique physical and logical addresses assigned to respective devices present in an HDMI network. For example, if play-back is performed by a video disc player connected by the HDMI cable to a television receiver when a user is viewing digital broadcast on the television receiver, the television receiver is automatically switched to an input connected to the video disc player. Also, a menu displayed in the video disc player and ON/OFF of the power can be controlled by using a remote control of the television receiver. Further, as shown in FIG. 2, when each device present in an HDMI network is recognized as a CEC-compatible device corresponding to an assigned logical address, an operation on the recognized CEC-compatible device can be performed.

In the HDMI-CEC standard, <Active Source> is defined as a CEC message to indicate the device having images displayed in the television receiver. According to the definition, for example, when a user operates a playback button of a video disc player compatible with the HDMI standard, the video disc player outputs an AV stream if the player itself is in a state (i.e., active state) of being capable of outputting stable video signals. Further, the video disc player broadcasts an <Active Source> message indicating that the video disc player is an active device. Here, "broadcast" refers to simultaneous transmission of signals to all devices, not to a specific device. The television receiver and the other external devices that have received the broadcasted <Active Source> message switch paths to play back the AV stream output from the video disc player.

In this way, the HDMI-CEC standard defines that a device which starts displaying a video in the television receiver broadcasts an <Active Source> message to the other devices in the network. The <Active Source> message is one of CEC messages defined in the HDMI standard. Heretofore, there has been described the HDMI standard that may be applied to the AV system according to an embodiment of the present disclosure.

«2. Description of Embodiment»

Subsequently, an embodiment of the present disclosure will be described. Technology according to the present disclosure may be executed in various modes.

<2-1. Basic Configuration Example>

First, there will be described a basic configuration example of an AV system that may be applied to an embodiment of the present disclosure. FIG. 1 is a block diagram showing a basic configuration example of an AV system.

This AV system 100A includes a television receiver 200, a device control apparatus 800, a video recorder 400, a video player 500, and a video recorder 600. The video recorder 400, the video player 500, and the video recorder 600 configure HDMI source devices. The device control apparatus 800 configures an HDMI repeater device. The television receiver 200 configures an HDMI sink device. The video recorder 400, the video player 500, and the video recorder 600 are devices that use a video disc such as a DVD or a hard disk as a recording medium and record and play back video data (AV content).

The television receiver 200 is a CEC-compatible device, and includes HDMI terminals 201 and 202, and an optical output terminal 203. The television receiver 200 has a configuration that can be remotely controlled by a remote control (not shown). The television receiver 200 has a function of executing a process based on an application and displaying given information, or controlling a device connected to the television receiver 200 at the HDMI terminals 201 and 202. The video recorder 400 includes an HDMI terminal 401, the video player 500 includes an HDMI terminal 501, and the video recorder 600 includes an HDMI terminal 601, which are all CEC-compatible devices.

The device control apparatus 800 is a CEC-compatible device, and includes HDMI terminals 801, 802, 803, and 804, and an optical input terminal 805. To the device control apparatus 800, headphones 900 are connected, and it is configured such that an audio signal that is playback-processed in the device control apparatus 800 is output from the headphones 900. The device control apparatus 800 and the headphones 900 may be connected to each other via wire or radio.

The television receiver 200 and the device control apparatus 800 are connected via an HDMI cable 701 and an optical cable 702. That is, one end of the HDMI cable 701 is connected to the HDMI terminal 201 of the television receiver 200 and the other end thereof is connected to the HDMI terminal 804 of the device control apparatus 800. One end of the optical cable 702 is connected to the optical output terminal 203 of the television receiver 200 and the other end thereof is connected to the optical input terminal 805 of the device control apparatus 800.

The device control apparatus 800 and the video recorder 400 are connected via an HDMI cable 703. That is, one end of the HDMI cable 703 is connected to the HDMI terminal 801 of the device control apparatus 800, and another end is connected to the HDMI terminal 401 of the video recorder 400. The device control apparatus 800 and the video player 500 are connected via an HDMI cable 704. That is, one end of the HDMI cable 704 is connected to the HDMI terminal 802 of the device control apparatus 800, and another end is connected to the HDMI terminal 501 of the video player 500.

Further, the device control apparatus 800 and the video recorder 600 are connected via an HDMI cable 705. That is, one end of the HDMI cable 705 is connected to the HDMI terminal 803 of the device control apparatus 800, and another end is connected to the HDMI terminal 601 of the video recorder 600.

(Acquisition of Physical Address and Logical Address)

In the AV system 100A shown in FIG. 1, a physical address and a CEC logical address of each device are acquired, for example, as follows. That is, when the device control apparatus 800 is connected to the television receiver 200 (the physical address is and the CEC logical address is {0}) via the HDMI cable 701, the device control apparatus 800 acquires a physical address from the television receiver 200 using an HDMI control protocol. The CEC-compatible device is defined to acquire a logical address upon HDMI connection. The CEC-compatible device performs message transmission and reception using this logical address.

FIG. 2 is a diagram showing a table indicating a correspondence relationship between a device and a CEC logical address. A device "TV" is a device for displaying a video from a television receiver, a projector, and the like. A device "recording device" is a recording device such as a hard disk recorder or a DVD recorder. A device "tuner" is a device for receiving AV content, such as a set top box (STB) that receives a cable television broadcast. A device "playback device" is a player device such as a video player or a camcorder. A device "audio system" is an audio processing device such as an AV amplifier.

The device control apparatus 800 is a CEC-compatible device, as described above. The device control apparatus 800 decides a logical address {5} as an "Audio System" based on the table of FIG. 2. In this case, the device control apparatus 800 recognizes that a device having this logical address {5} is not included in the other devices with a <Polling Message> of the CEC control protocol and then decides the logical address {5} as its logical address. The device control apparatus 800 notifies the television receiver 200 and the like that physical address corresponds to the CEC-compatible device {5} by means of the <Report Physical Address> of the CEC control protocol.

When the video recorder 400 is connected to the device control apparatus 800 via the HDMI cable 703, the video recorder 400 acquires a physical address from the device control apparatus 800 using the HDMI control protocol. The video recorder 400 is a CEC-compatible device, as described above. The video recorder 400 decides logical address {1} as a "Recording Device" based on the table of FIG. 2. In this case, the video recorder 400 recognizes that a device having this logical address {1} is not included in the other devices with a <Polling Message> of the CEC control protocol and then decides the logical address {1} as its logical address. The video recorder 400 notifies the television receiver 200 and the device control apparatus 800 that the physical address corresponds to the CEC-compatible device {1} by means of the <Report Physical Address> of the CEC control protocol.

When the video player 500 is connected to the device control apparatus 800 via the HDMI cable 704, the video player 500 acquires a physical address from the device control apparatus 800 using the HDMI control protocol. The video player 500 is a CEC-compatible device, as described above. The video player 500 decides a logical address {4} as a "Playback Device" based on the table of FIG. 2. In this case, the video player 500 recognizes that a device having this logical address {4} is not included in the other devices with a <Polling Message> of the CEC control protocol and then decides the logical address {4} as its logical address. The video player 500 notifies the television receiver 200 and the device control apparatus 800 that the physical address corresponds to a CEC-compatible device {4} by means of the <Report Physical Address> of the CEC control protocol.

When the video recorder 600 is connected to the device control apparatus 800 via the HDMI cable 705, the video recorder 600 acquires a physical address from the device control apparatus 800 using the HDMI control protocol. The video recorder 600 is a CEC-compatible device, as described above. The video recorder 600 decides a logical address {2} as a "Recording Device" based on the table of FIG. 2. In this case, the video recorder 600 recognizes that a device having this logical address {2} is not included in the other devices with a <Polling Message> of the CEC control protocol and then decides the logical address {2} as its logical address. The video recorder 600 notifies the television receiver 200 and the device control apparatus 800 that the physical address corresponds to the CEC-compatible device {2} by means of the <Report Physical Address> of the CEC control protocol.

(Playback of Video Signal and Sound Signal)

When a program tuned by a tuner of the television receiver 200 is to be viewed in the AV system 100A shown in FIG. 1, the following operation is executed. That is, an image by a video signal obtained by the tuner is displayed on a display panel (not shown) of the television receiver 200. An audio (sound) by an audio signal obtained by the tuner is output from speakers (not shown) of the television receiver 200 when the device control apparatus 800 is in a system audio mode of OFF. When the system audio mode is ON, the audio by the audio signal obtained by the tuner is output from the headphones 900 connected to the device control apparatus 800.

The audio signal obtained by the tuner of the television receiver 200 becomes, for example, an optical digital audio signal and is supplied to the device control apparatus 800 via the optical cable 702. Further, the ON/OFF of the system audio mode in the device control apparatus 800 may be set by a user operating a user operation section (not shown) of the device control apparatus 800 or operating a user operation section (not shown) of the television receiver 200. Alternatively, the ON/OFF of the system audio mode in the device control apparatus 800 may be set by issuing speaker switching instruction by operating the remote control (not shown) of the television receiver 200.

In the AV system 100A shown in FIG. 1, for example, when content played back from a disc in the video recorder 400 or a program selected by the tuner is viewed, by performing a switching operation from the television receiver 200, an operation of a Play button of the video recorder 400, and the like, the following is executed. That is, the image by the output video signal of the video recorder 400 is displayed on a display panel (not shown) of the television receiver 200. In this case, the output video signal of the video recorder 400 is supplied to the television receiver 200 via the HDMI cable 703, the device control apparatus 800, and the HDMI cable 701.

When the device control apparatus 800 is in a system audio mode of OFF, the sound by the output audio signal of the video recorder 400 is output from a speaker (not shown) of the television receiver 200. In this case, the output audio signal of the video recorder 400 is supplied to the television receiver 200 via the HDMI cable 703, the device control apparatus 800, and the HDMI cable 701.

When the device control apparatus 800 is in the system audio mode of ON, the sound by the output audio signal of the video recorder 400 is output from the headphones 900 connected to the device control apparatus 800. In this case, the output audio signal of the video recorder 400 is supplied to the device control apparatus 800 via the HDMI cable 703.

In the AV system 100A shown in FIG. 1, for example, when content played back from the disc in the video player 500 is viewed, by performing a switching operation from the television receiver 200, an operation of a Play button of the video player 500, and the like, the following is executed. That is, an image by the output video signal of the video player 500 is displayed on a display panel (not shown) of the television receiver 200. In this case, the output video signal of the video player 500 is supplied to the television receiver 200 via the HDMI cable 704, the device control apparatus 800, and the HDMI cable 701.

When the device control apparatus 800 is in the system audio mode of OFF, the sound by the output audio signal of the video player 500 is output from the speaker (not shown) of the television receiver 200. In this case, the output audio signal of the video player 500 is supplied to the television receiver 200 via the HDMI cable 704, the device control apparatus 800, and the HDMI cable 701.

When the device control apparatus 800 is in the system audio mode of ON, the sound by the output audio signal of the video player 500 is output from the headphones 900 connected to the device control apparatus 800. In this case, the output audio signal of the video player 500 is supplied to the device control apparatus 800 via the HDMI cable 704.

In the AV system 100A shown in FIG. 1, for example, when content played back from the disc in the video recorder 600 or a program selected by the tuner is viewed by performing a switching operation from the television receiver 200, the following is executed. That is, the image by the output video signal of the video recorder 600 is displayed on a display panel (not shown) of the television receiver 200. In this case, the output video signal of the video recorder 600 is supplied to the television receiver 200 via the HDMI cable 705, the device control apparatus 800, and the HDMI cable 701.

When the device control apparatus 800 is in the system audio mode of OFF, the sound by the output audio signal of the video recorder 600 is output from the speaker (not shown) of the television receiver 200. In this case, the output audio signal of the video recorder 600 is supplied to the television receiver 200 via the HDMI cable 705, the device control apparatus 800, and the HDMI cable 701.

When the device control apparatus 800 is in the system audio mode of ON, the sound by the output audio signal of the video recorder 600 is output from the headphones 900 connected to the device control apparatus 800. In this case, the output audio signal of the video recorder 600 is supplied to the device control apparatus 800 via the HDMI cable 705.

(Configuration of Television Receiver)

Figure 3:
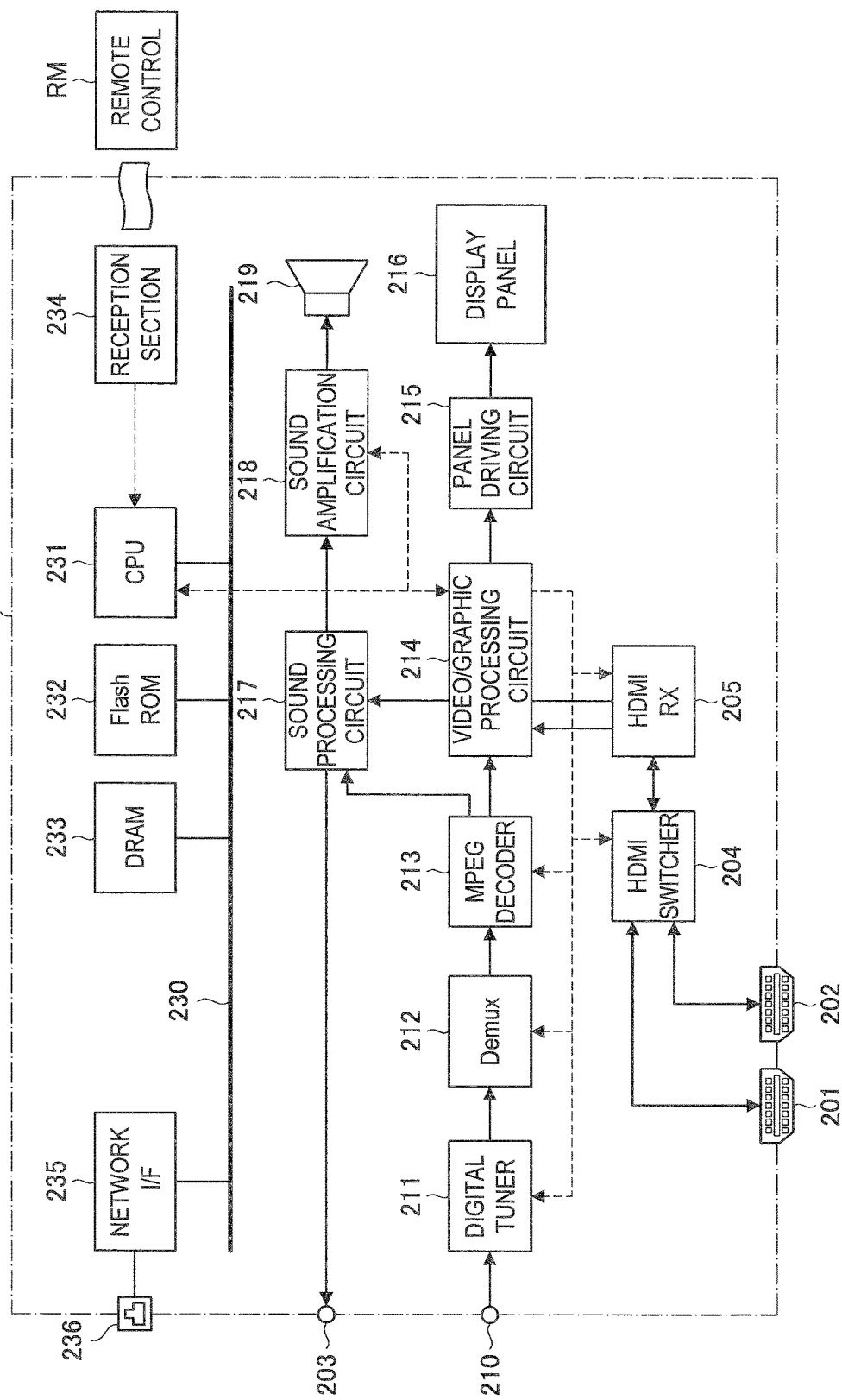
FIG. 3 is a block diagram showing a configuration example of a television receiver (sink device) that configures the AV system.

FIG. 3 is a block diagram showing a configuration example of the television receiver (sink device) 200 that configures the AV system 100A. The television receiver 200 includes HDMI terminals 201 and 202, an HDMI switcher 204, an HDMI reception section 205, an antenna terminal 210, and a digital tuner 211. The television receiver 200 further includes a demultiplexer (Demux) 212, a moving picture expert group (MPEG) decoder 213, a video/graphic processing circuit 214, a panel driving circuit 215, and a display panel 216. The television receiver 200 further includes a sound processing circuit 217, a sound amplification circuit 218, and a speaker 219. The television receiver 200 further includes an internal bus 230, a central processing unit (CPU) 231, a flash ROM 232, a DRAM 233, a reception section 234, a network I/F 235, and a network terminal 236.

The CPU 231 controls an operation of each section of the television receiver 200. The flash ROM 232 stores control software and data. The DRAM 233 configures, for example, a work area for the CPU 231. The CPU 231 develops the software and data read from the flash ROM 232 onto the DRAM 233, starts up the software, and controls each section of the television receiver 200. The CPU 231, the flash ROM 232, and the DRAM 233 are connected to the internal bus 230.

The reception section 234 receives, for example, an infrared remote control signal (remote control code) transmitted from a remote control RM and supplies the signal to the CPU 231. The user can operate the television receiver 200 and another CEC-compatible device connected to the television receiver 200 via the HDMI cable by operating the remote control RM.

The network I/F 235 connects to a network via a network cable connected to the network terminal 236, and transmits/receives data to/from each of various types of devices connected to the network.

The antenna terminal 210 is a terminal that inputs a television broadcast signal received by a reception antenna (not shown). The digital tuner 211 processes the television broadcast signal input to the antenna terminal 210, and outputs a given transport stream corresponding to a user-selected channel. The demultiplexer 212 extracts a partial transport stream (TS) (a TS packet of video data and a TS packet of audio data) corresponding to the user-selected channel from the transport stream obtained by the digital tuner 211.

The demultiplexer 212 extracts program specific information/service information (PSI/SI) from the transport stream obtained by the digital tuner 211 and outputs the PSI/SI to the CPU 231. A plurality of channels are multiplexed in the transport stream obtained by the digital tuner 211. The process in which the demultiplexer 212 extracts the partial TS of any channel from the transport stream can be performed by obtaining information of a packet ID (PID) of any channel from the PSI/SI (PAT/PMT).

The MPEG decoder 213 performs a decoding process on a video packetized elementary stream (PES) packet including the TS packet of the video data obtained by the demultiplexer 212 to obtain video data. Also, the MPEG decoder 213 performs a decoding process on an audio PES packet including the TS packet of the audio data obtained by the demultiplexer 212 to obtain audio data.

The video/graphic processing circuit 214 performs a scaling process, a graphics data superimposing process, and the like on the video data acquired by the MPEG decoder 213, as necessary. Also, the video/graphic processing circuit 214 generates image data through a process based on an application stored in the flash ROM 232 in advance, and outputs the image data to the panel driving circuit 215. The panel driving circuit 215 drives the display panel 216 based on the video data output from the video/graphic processing circuit 214. The display panel 216 includes, for example, a liquid crystal display (LCD), an organic electro-luminescence (EL), or a plasma display panel (PDP).

The sound processing circuit 217 performs a necessary process, such as D/A conversion, on the audio data obtained by the MPEG decoder 213. The sound amplification circuit 218 amplifies an analog audio signal output from the sound processing circuit 217 and supplies the resultant audio signal to the speaker 219. The sound processing circuit 217 converts the audio data obtained by the MPEG decoder 213 into a digital optical signal and outputs the digital optical signal to the optical output terminal 203.

The HDMI switcher 204 selectively connects the HDMI terminals 201 and 202 to the HDMI reception section 205. The HDMI reception section 205 is selectively connected to any of the HDMI terminals 201 and 202 via the HDMI switcher 204. This HDMI reception section 205 receives video and audio data transmitted from an external device (a source device or a repeater device) connected to the HDMI terminal 201 or 202 through communication conforming to HDMI. This HDMI reception section 205 will be described in detail later.

(Operation of Television Receiver)

Here, an operation of the television receiver 200 shown in FIG. 3 will be briefly described. The television broadcast signal input to the antenna terminal 210 is supplied to the digital tuner 211. This digital tuner 211 processes the television broadcast signal to obtain a transport stream corresponding to the user-selected channel. This transport stream is supplied to the demultiplexer 212. The demultiplexer 212 extracts a partial TS (a TS packet of video data and a TS packet of audio data) corresponding to the user-selected channel from the transport stream. This partial TS is supplied to the MPEG decoder 213.

The MPEG decoder 213 performs a decoding process on a video PES packet including the TS packet of the video data to obtain video data. The video/graphic processing circuit 214 performs a scaling process, a graphics data superimposing process and the like on the video data, as necessary, and supplies the resultant video data to the panel driving circuit 215. Accordingly, an image corresponding to the user-selected channel is displayed on the display panel 216.

The MPEG decoder 213 performs a decoding process on an audio PES packet including the TS packet of the audio data to obtain audio data. The sound processing circuit 217 performs a necessary process such as D/A conversion on the audio data, and the sound amplification circuit 218 amplifies the audio data and supplies the audio data to the speaker 219. Accordingly, an audio corresponding to the user-selected channel is output from the speaker 219.

The audio data obtained by the MPEG decoder 213 is converted into, for example, a digital optical signal conforming to the S/PDIF standard by the sound processing circuit 217, and output to the optical output terminal 203. Accordingly, the television receiver 200 can transmit the audio data to the external device via the optical cable. In the AV system 100A shown in FIG. 1, as described above, the audio data from the television receiver 200 is supplied to the device control apparatus 800 via the optical cable 702.

When the device control apparatus 800 is in a system audio mode of ON, an audio by the audio data from the television receiver 200 is output from the headphones 900 connected to the device control apparatus 800. In this case, the sound amplification circuit 218 enters a mute ON state under control of the CPU 231, and the audio is not output from the speaker 219 of the television receiver 200.

In the HDMI reception section 205, video and audio data input to the HDMI terminal 201 or 202 via the HDMI cable is obtained. The video data is supplied to the video/graphic processing circuit 214. The audio data is supplied to the sound processing circuit 217. A subsequent operation is the same as that upon reception of the above-described television broadcast signal, the image is displayed on the display panel 216, and the audio is output from the speaker 219.

In the AV system 100A shown in FIG. 1, for example, when an image and an audio by video data and audio data from the video recorder 400, the video player 500 or the video recorder 600 are watched and listened to, the state becomes a state in which an image and an audio by the video data and the audio data acquired by the HDMI reception section 205, as described above, are watched and listened to. Even in this case, when the device control apparatus 800 is in a system audio mode of ON, the audio by the audio data is output from the headphones 900 connected to the device control apparatus 800, and the sound amplification circuit 218 of the television receiver 200 enters a mute ON state, such that the audio is not output from the television receiver 200.

(Configuration of Device Control Apparatus)

Figure 4:
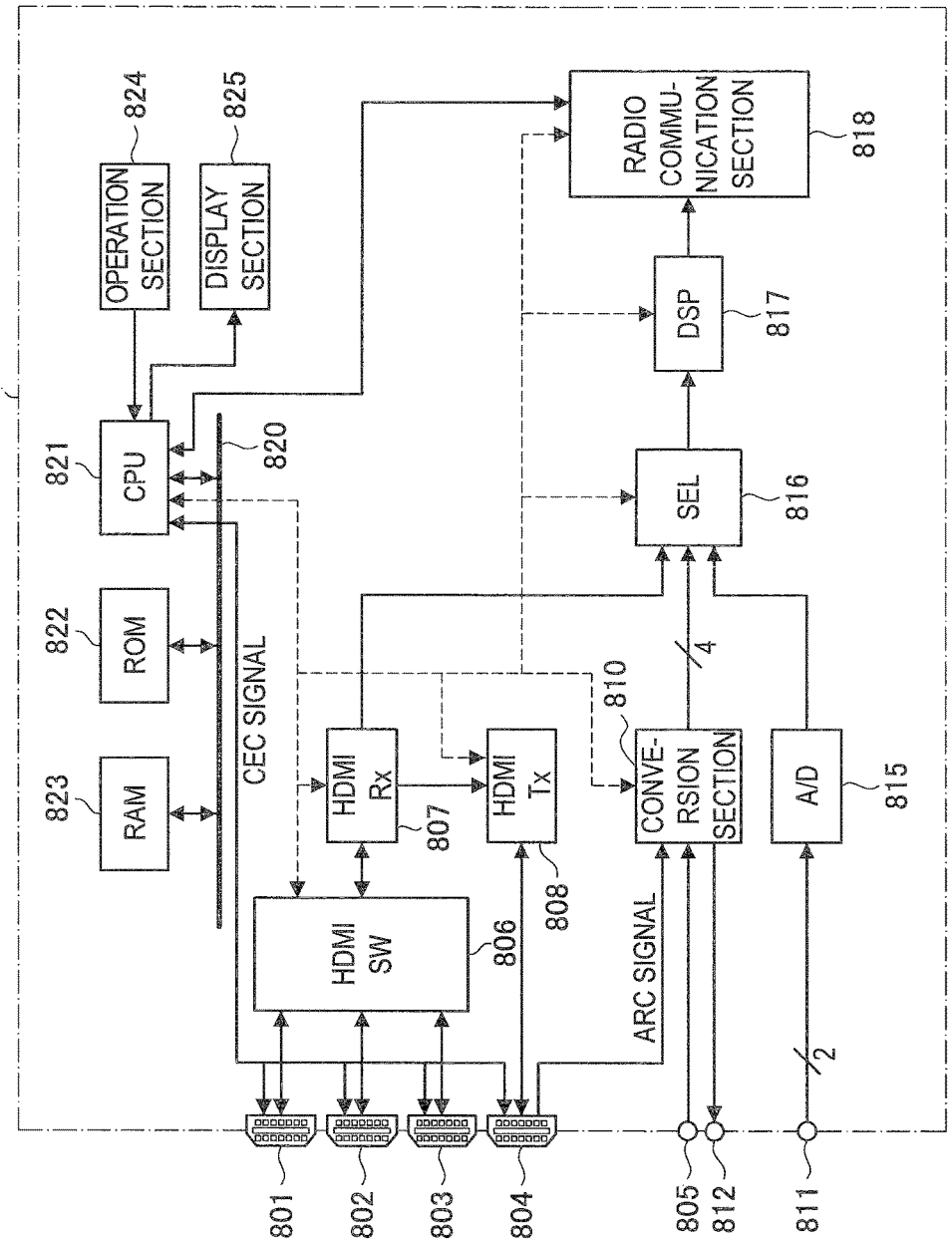
FIG. 4 is a block diagram showing a configuration example of a device control apparatus that configures the AV system.

FIG. 4 is a block diagram showing a configuration example of the device control apparatus 800 that configures the AV system 100A. The device control apparatus 800 includes HDMI terminals 801 to 804, an optical input terminal 805, an HDMI switcher 806, an HDMI reception section 807, an HDMI transmission section 808, and a conversion section 810. The device control apparatus 800 further includes an analog audio input terminal 811, an A/D converter 815, a selector 816, and a digital signal processor (DSP) 817. The device control apparatus 800 further includes a radio communication section 818, an internal bus 820, a CPU 821, a ROM 822, and a RAM 823.

The CPU 821 controls operation of each section of the device control apparatus 800. The ROM 822 stores control software and data. The RAM 823 configures, for example, a work area of the CPU 821. The CPU 821 develops the software or data read from the ROM 822 onto the RAM 823 to start up the software and control each section of the device control apparatus 800. The CPU 821, the ROM 822, and the RAM 823 are connected to the internal bus 820. The CPU 821, the ROM 822, and the RAM 823 may be a microcomputer of one chip (one chip microcomputer).

An operation section 824 and a display section 825 are connected to the CPU 821. The operation section 824 and the display section 825 configure a user interface. Using the operation section 824, the user can perform selection of an output audio of the device control apparatus 800, an operation setting, and the like. The user can set the system audio mode to ON/OFF using the operation section 824. Further, the CPU 821 can transmit/receive a CEC signal to/from an external device connected to the HDMI terminal 801. For example, the CEC signal may be transmitted/received via a CEC line, which will be described later. The CEC signal may function as the above-mentioned control signal.

The operation section 824 includes keys, buttons, a dial, a remote control signal transmission/reception section, and the like disposed on a casing, which is not shown, of the device control apparatus 800. The display section 825 displays an operation status of the device control apparatus 800, a user operation state, and the like, and includes a fluorescent display tube, a liquid crystal display (LCD), or the like.

The optical input terminal 305 is a terminal that inputs a digital optical signal via the optical cable. An optical output terminal 812 is a terminal that outputs a digital optical signal via the optical cable. The conversion section 810 generates a clock LRCK having the same frequency (e.g., 44.1 kHz) as a sampling frequency of an audio signal, a master clock MCK that is, for example, 512 or 256 times the sampling frequency, left and right 24-bit audio data LDATA and RDATA occurring every period of the clock LRCK, and a bit clock BCK synchronized with each bit of the data, from the digital optical signal input to the optical input terminal 805, and supplies them to the selector 816.

Further, the conversion section 810 transmits, from the optical output terminal 812, the digital optical signal input to the optical input terminal 805. In this way, the device control apparatus 800 exhibits a repeater function. Further, the conversion section 810 can supply an audio return channel (ARC) signal out of the signals transmitted from an external device connected to the HDMI terminal 804 to the selector 816. The description on the ARC signal will be made in detail later, and audio data can be received using the ARC signal. The ARC signal may be transmitted/received using a reserved line which will be described later, for example. The analog audio input terminal 811 is a terminal that inputs left and right analog audio signals obtained in the external device. The A/D converter 815 converts the analog audio signal input by the analog audio input terminal 811 into digital audio data and supplies the digital audio data to the selector 816.

The HDMI switcher 806 selectively connects the HDMI terminals 801 to 803 to the HDMI reception section 807. The HDMI reception section 807 is selectively connected to any of the HDMI terminals 801 to 803 via the HDMI switcher 806. The HDMI reception section 807 receives video and audio data transmitted in one direction from external devices (source devices) connected to the HDMI terminals 801 to 803 through communication conforming to HDMI.

The HDMI reception section 807 supplies the audio data to the selector 816, and supplies the video and audio data to the HDMI transmission section 808. The HDMI transmission section 808 transmits, from the HDMI terminal 804, the baseband video and audio data supplied from the HDMI reception section 807 through the communication conforming to HDMI. Thus, the device control apparatus 800 has a repeater function. The HDMI reception section 807 and the HDMI transmission section 808 will be described in detail later.

The selector 816 selectively extracts the audio data supplied from the HDMI reception section 807, the audio data supplied from the conversion section 810, or the audio data supplied from the A/D converter 815, and supplies the audio data to the DSP 817. The DSP 817 processes the audio data obtained by the selector 816, and performs an equalization process for adjusting volume for each frequency band, a sound image localization process for setting a localization position of a sound image, and the like.

The radio communication section 818 converts the audio data output from the DSP 817 into a radio signal, and outputs the radio signal obtained by the conversion to the headphones 900. Further, the radio communication section 818 converts various types of signals for controlling the headphones 900, which are output from the CPU 821, into radio signals, and outputs the radio signals obtained by the conversion to the headphones 900. Further, when receiving a radio signal from the headphones 900, the radio communication section 818 converts the received radio signal into a digital signal, and outputs the digital signal obtained by the conversion to the CPU 821.

(Operation of Device Control Apparatus)

Here, an operation of the device control apparatus 800 shown in FIG. 4 will be briefly described. In the HDMI reception section 807, the baseband video and audio data input to the HDMI terminals 801 to 803 via the HDMI cable is obtained. This video and audio data is supplied to the HDMI transmission section 808 and transmitted to the HDMI cable connected to the HDMI terminal 804. Further, the audio data obtained in the HDMI reception section 807 is supplied to the selector 816. In the selector 816, the audio data supplied from the HDMI reception section 807, the audio data supplied from the conversion section 810, or the audio data supplied from the A/D converter 815 is selectively extracted and supplied to the DSP 817.

In the DSP 817, a necessary process is performed on the audio data, such as an equalization process for adjusting volume for each frequency band or a sound image localization process for setting a localization position of a sound image. The audio signal of each channel output from the DSP 817 is output by the radio communication section 818 as a radio signal.

For example, in the AV system 100A shown in FIG. 1, when the program tuned by the digital tuner 211 of the television receiver 200 is viewed and the device control apparatus 800 is in a system audio mode of ON, the following operation is performed. That is, the selector 816 extracts the audio data from the conversion section 810. Accordingly, the audio signals of the respective channels according to the audio data of the program tuned by the digital tuner 211 of the television receiver 200 are output to the radio communication section 818. Thus, the audio of the program tuned by the digital tuner 211 of the television receiver 200 is output from the headphones 900 connected to the device control apparatus 800.

When the program tuned by the digital tuner 211 of the television receiver 200 is viewed and the device control apparatus 800 is in the system audio mode of OFF, the radio communication section 818 enters a mute ON state. Accordingly, the audio signal is not supplied from the radio communication section 818 to the headphones 900. Note that, when the radio communication section 818 is in the mute ON state, in addition to that the radio communication section 818 is in the mute ON state, each of the DSP 817, a radio communication section 910, a DAC 920, and a sound amplification section 930 may also enter a mute ON state. The same applies hereinafter.

For example, in the AV system 100A shown in FIG. 1, when an image and an audio by the video data and the audio data from the video recorder 400 are to be watched and listened to and the device control apparatus 800 is in the system audio mode of ON, the following operation is performed. That is, the HDMI terminal 801 is connected to the HDMI reception section 807 via the HDMI switcher 806. Further, in the selector 816, the audio data from the HDMI reception section 807 is extracted. Accordingly, the audio signals of the respective channels according to the audio data from the video recorder 400 are output to the radio communication section 818. Thus, the audio by the audio data from the video recorder 400 is output from the headphones 900 connected to the device control apparatus 800.

Note that, when the image and the audio by the video data and the audio data from the video recorder 400 are to be watched and listened to and the AV amplifier 300 is in the system audio mode of OFF, the radio communication section 818 enters a mute ON state, and the audio signal is not supplied from the radio communication section 818 to the headphones 900.

For example, in the AV system 100A shown in FIG. 1, when the image and the audio by the video data and the audio data from the video player 500 are to be watched and listened to and the device control apparatus 800 is in the system audio mode of ON, the following operation is performed. That is, the HDMI terminal 802 is connected to the HDMI reception section 807 via the HDMI switcher 806. Further, in the selector 816, the audio data from the HDMI reception section 807 is extracted. Accordingly, the audio signals of the respective channels according to the audio data from the video player 500 are output to the radio communication section 818. Thus, the audio by the audio data from the video player 500 is output from the headphones 900 connected to the device control apparatus 800.

Note that, when the image and the audio by the video data and the audio data from the video player 500 are to be watched and listened to and the device control apparatus 800 is in the system audio mode of OFF, the radio communication section 818 enters a mute ON state, and the audio signal is not supplied from the radio communication section 818 to headphones 900.

(External Configuration of Device Control Apparatus)

Figure 5:
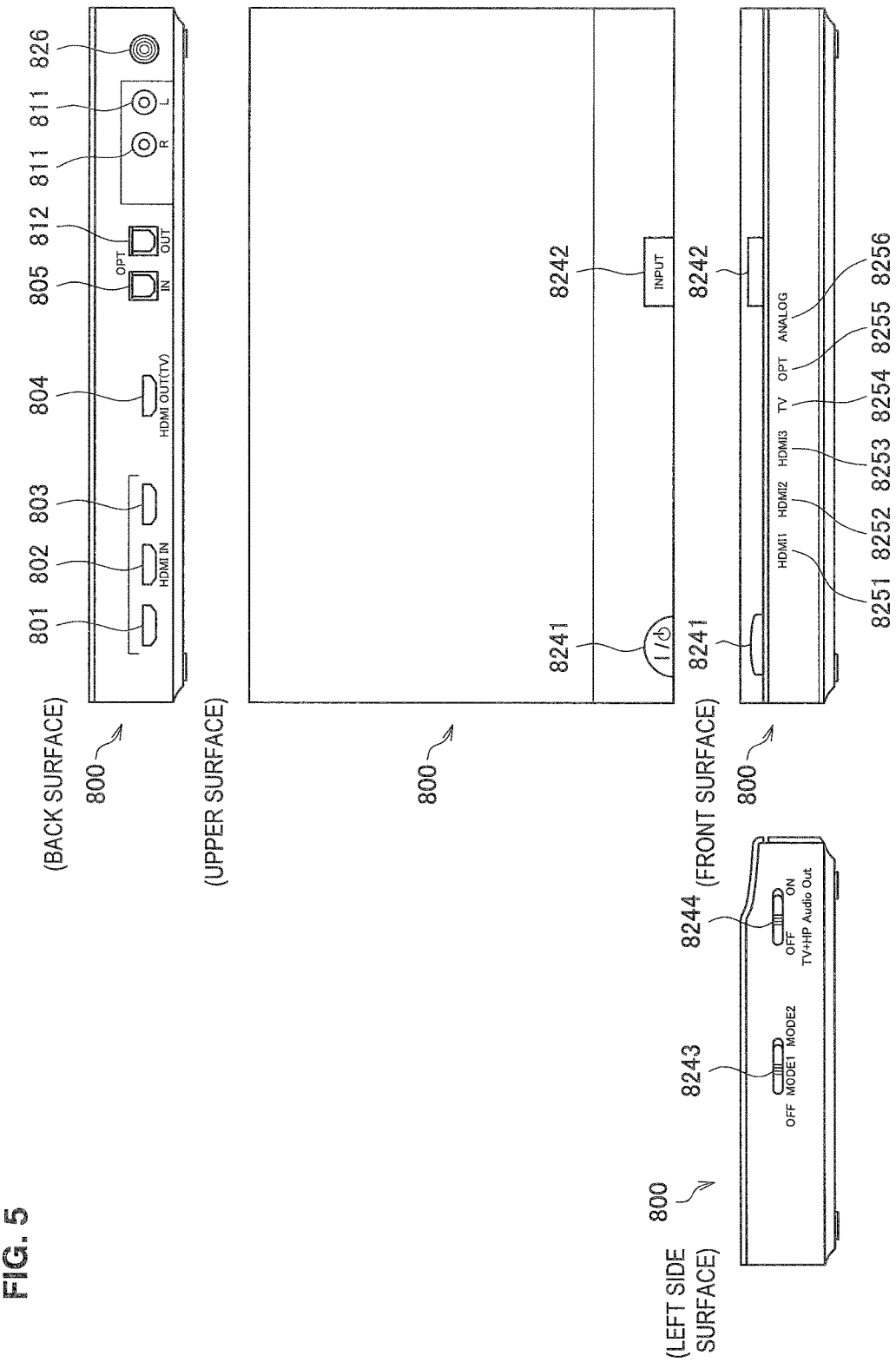
FIG. 5 is a diagram showing an example of an outline of the device control apparatus.

Next, with reference to FIG. 5, an external configuration of the device control apparatus 800 will be described. FIG. 5 is a diagram showing an example of an outline of the device control apparatus 800. As shown in FIG. 5, on the back surface of the device control apparatus 800, there are the HDMI terminals 801, 802, 803, and 804, the optical input terminal 805, the optical output terminal 812, the analog audio input terminal 811, and a power input terminal 826, for example. The analog audio input terminal 811 is divided into R and L. Those terminals are provided on the back surface of the device control apparatus 800 merely as an example, and may be provided on the place other than the back surface of the device control apparatus 800.

On the upper surface of the device control apparatus 800, there are a switch 8241 for switching power and a switch 8242 for switching inputs. For example, each time the switch 8241 for switching power is pressed by a user, the power of the device control apparatus 800 may be switched from ON to OFF, or from OFF to ON. Further, for example, each time the switch 8242 for switching inputs is pressed by the user, the input switching may be executed. For example, each time the switch 8242 for switching inputs is pressed by the user, the input is switched in the following order: the HDMI terminal 801, the HDMI terminal 802, the HDMI terminal 803, the HDMI terminal 804 (used for inputting an ARC signal), the optical input terminal 805, the analog audio input terminal 811, the HDMI terminal 801, . . . . Those switches are provided on the upper surface of the device control apparatus 800 merely as an example, and may be provided on the place other than the upper surface of the device control apparatus 800. Further, those switches may be provided on the headphones 900.

On the front surface of the device control apparatus 800, there are an HDMI1 selection display area 8251, an HDMI2 selection display area 8252, an HDMI3 selection display area 8253, a TV selection display area 8254, an optical selection display area 8255, and an analog selection display area 8256. In the case where an input from the HDMI terminal 801 is being selected by the pressing of the switch 8242 for switching inputs, the display is performed on the HDMI1 selection display area 8251. In the same manner, in the case where an input from the HDMI terminal 802 is being selected, the display is performed on the HDMI2 selection display area 8252, and in the case where an input from the HDMI terminal 803 is being selected, the display is performed on the HDMI3 selection display area 8253.

In the same manner, in the case where an input from the HDMI terminal 804 (used for inputting an ARC signal) is being selected, the display is performed on the TV selection display area 8254, and in the case where an input from the optical input terminal 805 is being selected, the display is performed on the optical selection display area 8255. In the same manner, in the case where an input from the analog audio input terminal 811 is being selected, the display is performed on the analog selection display area 8256. Those display areas are provided on the front surface of the device control apparatus 800 merely as an example, and may be provided on the place other than the front surface of the device control apparatus 800.

On the left side surface of the device control apparatus 800, there is a switch 8243 for switching modes. For example, the user switches the switch 8243 for switching modes, and thus can switch the operation modes among "OFF", "MODE 1", and "MODE 2". The details of those operation modes will be described later. The switch 8243 for switching modes is provided on the left side surface of the device control apparatus 800 merely as an example, and may be provided on the place other than the left side surface of the device control apparatus 800.

Further, on the left side surface of the device control apparatus 800, there is a switch 8244 for setting output modes. For example, the user switches the switch 8244 for setting output modes, and thus can switch the output destination modes between "ON" and "OFF". The details of those output destination modes will be described later. The switch 8244 for setting output modes is provided, for example, on the left side surface of the device control apparatus 800, and may also be provided on the place other than the left side surface of the device control apparatus 800.

(Configuration of Headphones)

Figure 6:
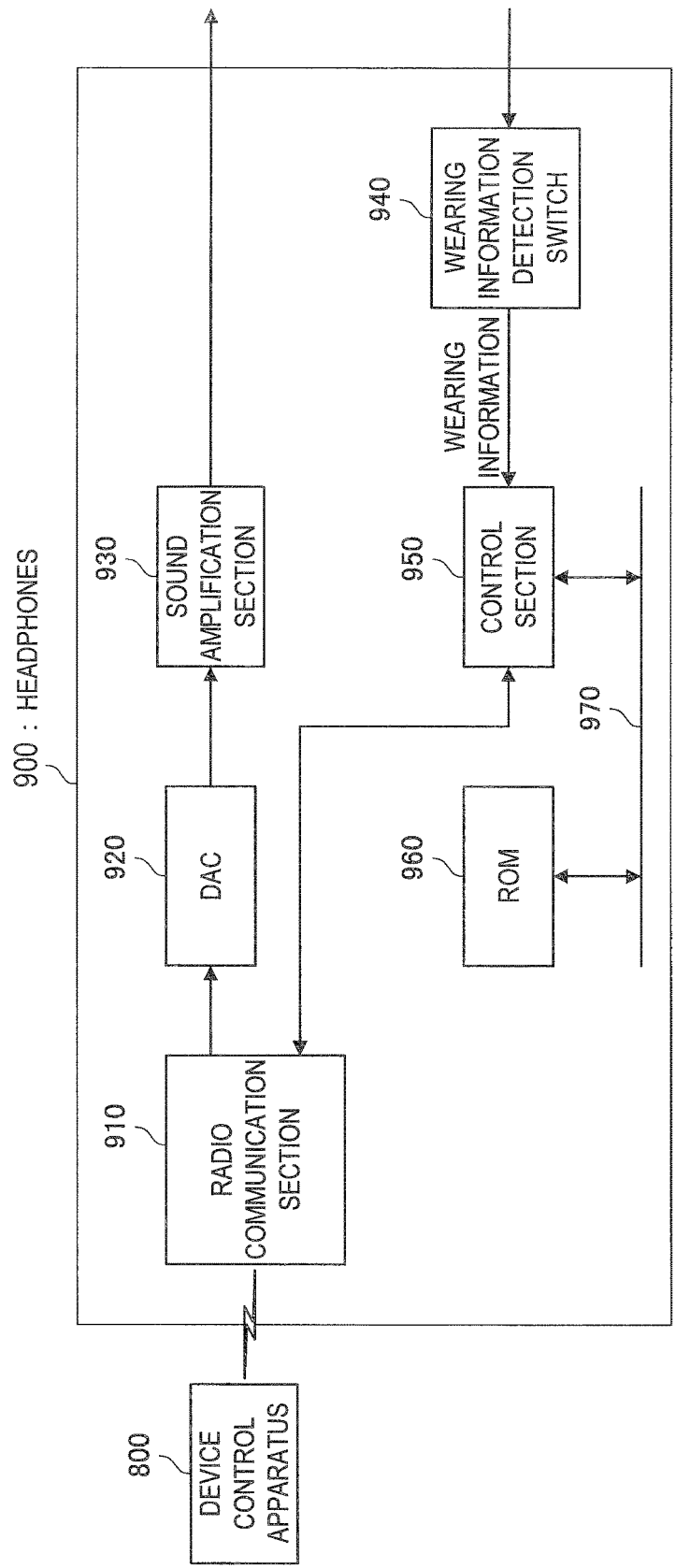
FIG. 6 is a block diagram showing a configuration example of headphones that configures the AV system.

FIG. 6 is a block diagram showing a configuration example of the headphones 900 that configures the AV system 100A. As shown in FIG. 6, the headphones 900 includes a radio communication section 910, a digital analog converter (DAC) 920, a sound amplification section 930, a wearing information detection switch 940, a control section 950, a ROM 960, and an internal bus 970.

The control section 950 controls operation of each section of the headphones 900. The ROM 960 stores control software and data. The control section 950 includes a CPU and a RAM, and develops the software or data read from the ROM 960 onto the RAM to start up the software and control each section of the headphones 900. The control section 950 and the ROM 960 are connected to the internal bus 970. The control section 950 and the ROM 960 may be a microcomputer of one chip (one chip microcomputer).

To the control section 950, the wearing information detection switch 940 and the radio communication section 910 are connected. The wearing information detection switch 940 constitutes a user interface. For example, the wearing information detection switch 940 is turned on when the user wears the headphones 900. In this case, wearing information indicating the wearing of the headphones 900 is output to the control section 950. On the other hand, the wearing information detection switch 940 is turned off when the user takes off the headphones 900. In this case, wearing information indicating the taking off of the headphones 900 is output to the control section 950. The wearing information detection switch 940 is attached at the position at which wearing and taking off of the headphones 900 by the user can be detected. For example, the wearing information detection switch 940 may be attached at an inner side of a band part of the headphones 900. The wearing information output from the wearing information detection switch 940 is output to radio communication section 910 by the control section 950.

The control section 950 can control the power state of the headphones 900. For example, the control section 950 can turn on the power of the headphones 900 or can turn off the power of the headphones 900 based on a power control signal output from the radio communication section 910. Note that the power of the headphones 900 indicates the power that is supplied mainly to the DAC 920 and the sound amplification section 930 of the headphones 900. Accordingly, the following state is assumed: even in the state in which the power of the headphones 900 is off, the power is supplied to the radio communication section 910 and the control section 950.

Further, for example, the control section 950 can acquire the power state of the headphones 900, and can output the acquired power state of the headphones 900 to the radio communication section 910. The power state of the headphones 900 may be acquired periodically, or may be acquired in accordance with the control performed by the device control apparatus 800.

The radio communication section 910 can transmit the power state output from the control section 950 to the device control apparatus 800 via a radio signal. Further, the radio communication section 910 can transmit the wearing information output from the control section 950 to the device control apparatus 800 via a radio signal. Still further, in the case of receiving a power control signal from the device control apparatus 800, the radio communication section 910 converts the received radio signal into a digital signal, and outputs the digital signal obtained by the conversion to the control section 950. In the case of receiving audio data from the device control apparatus 800 via a radio signal, the radio communication section 910 converts the audio data by the radio signal into a digital audio signal, and outputs the digital audio signal obtained by the conversion to the DAC 920.

The DAC 920 converts the digital audio signal output from the radio communication section 910 into an analog audio signal, and outputs the analog audio signal obtained by the conversion to the sound amplification section 930. The sound amplification section 930 amplifies the analog audio signal output from the DAC 920 and outputs the audio. When the user wears the headphones 900, the user can listen to the audio output from the sound amplification section 930.

(Detail of HDMI Communication)

Figure 7:
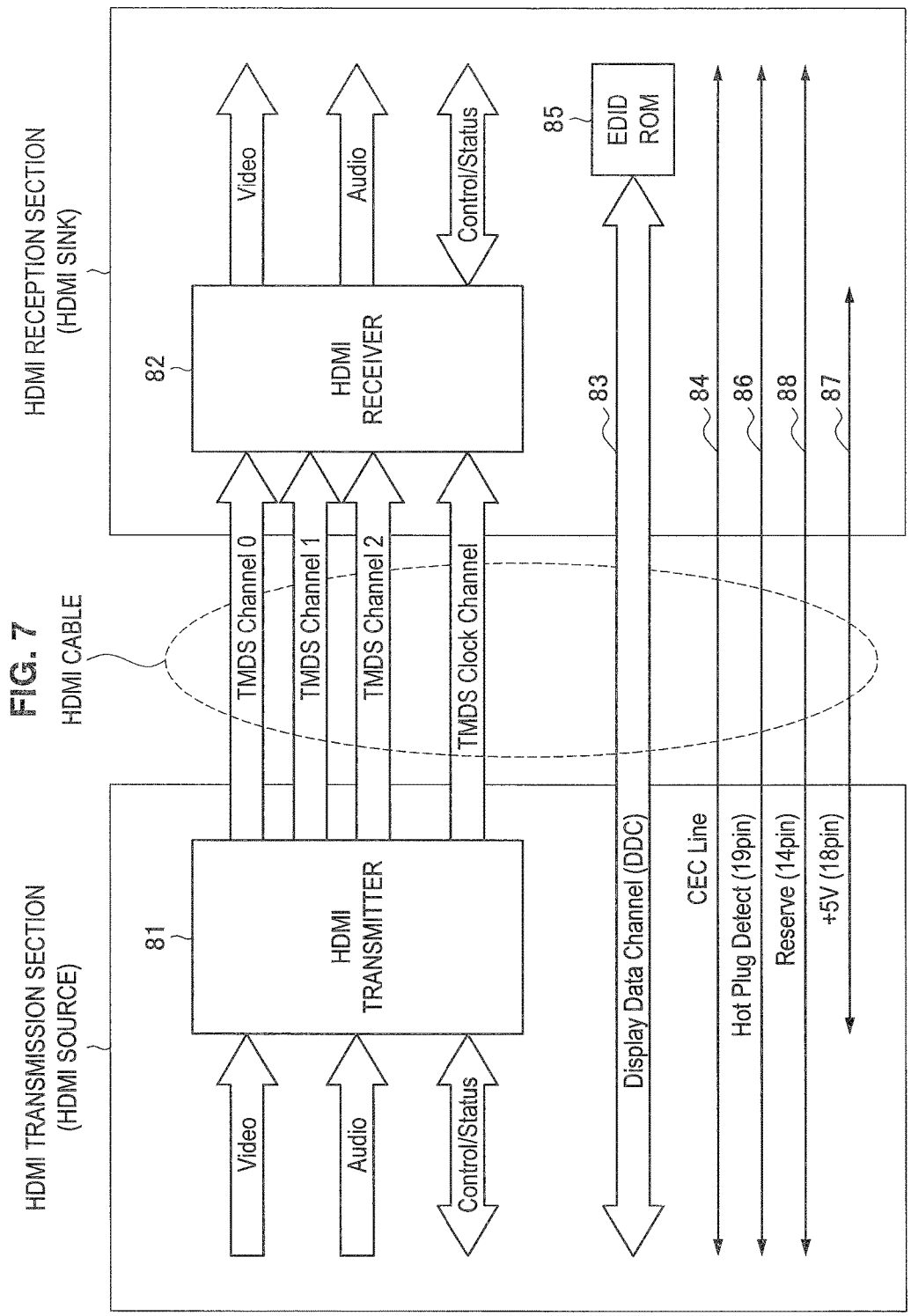
FIG. 7 is a block diagram showing a configuration example of an HDMI transmission section (HDMI source) and an HDMI reception section (HDMI sink)

FIG. 7 is a block diagram showing a configuration example of an HDMI transmission section (HDMI transmission section 808) and an HDMI reception section (HDMI reception section 205, HDMI reception section 807).

The HDMI transmission section (HDMI source) performs transmission in one unit in a valid image period (hereinafter, referred to as an active video period as appropriate) that is a period obtained by excluding a horizontal blacking period and a vertical blacking period from a period from one vertical synchronization signal to a next vertical synchronization signal. That is, in the active video period, the HDMI transmission section transmits, in one direction, a differential signal corresponding to non-compressed image pixel data corresponding to one screen to the HDMI reception section (HDMI sink) via a plurality of channels. In the horizontal blacking period or the vertical blacking period, the HDMI transmission section transmits, in one direction, a differential signal corresponding to at least the audio data associated with the image, control data, other auxiliary data, and the like to the HDMI reception section via a plurality of channels.

The HDMI transmission section includes a transmitter 81. The transmitter 81 converts, for example, non-compressed image pixel data into a corresponding differential signal, and serially transmits, in one direction, the differential signal to the HDMI reception section connected via the HDMI cable, via a plurality of channels, i.e., three TMDS channels #0, #1, and #2. The transmitter 81 converts audio data associated with non-compressed image, necessary control data, other auxiliary data, and the like into a corresponding differential signal. The transmitter 81 serially transmits, in one direction, the differential signal to the HDMI reception section connected via the HDMI cable, via three TMDS channels #0, #1, and #2.

The transmitter 81 transmits the pixel clock synchronized to the pixel data transmitted via three TMDS channels #0, #1, and #2 to the HDMI reception section connected via the HDMI cable via the TMDS clock channel. Here, via one TMDS channel #i (i=0, 1, 2), 10-bit pixel data is transmitted during one clock of the pixel clock. The HDMI reception section, in an active video period, receives a differential signal corresponding to the pixel data that is transmitted in one direction from the HDMI transmission section via a plurality of channels. Further, the HDMI reception section, in the horizontal blacking period or the vertical blacking period, receives a differential signal corresponding to audio data or control data that is transmitted in one direction from the HDMI transmission section via a plurality of channels.

That is, the HDMI reception section includes a receiver 82. The receiver 82 receives a differential signal corresponding to the pixel data and a differential signal corresponding to the audio data or the control data transmitted in one direction from the HDMI transmission section via the TMDS channels #0, #1, and #2. In this case, the receiver 82 receives in synchronization with the pixel clock transmitted from the HDMI transmission section via the TMDS clock channel.

The transmission channels of the HDMI system include three TMDS channels #0 to #2 as transmission channels for serially transmitting pixel data and audio data, and a TMDS clock channel as a transmission channel that transmits a pixel clock. Further, there is a transmission channel called a display data channel (DDC) 83 or a CEC line 84.

The DDC 83 is used for the HDMI transmission section to read enhanced extended display identification data (E-EDID) from the HDMI reception section connected via the HDMI cable. The DDC 83 includes two signal lines, not shown, included in the HDMI cable. That is, the HDMI reception section includes an EDID ROM 85, in addition to the HDMI receiver 82. The EDID ROM 85 stores an E-EDID that is performance information about its performance (configuration/capability). The HDMI transmission section reads, from the HDMI reception section connected via the HDMI cable, the E-EDID of the HDMI reception section via the DDC 83. Based on the read E-EDID, the HDMI transmission section recognizes, for example, a format (profile) of an image to which an electronic device having the HDMI reception section corresponds, such as RGB, YCbCr4:4:4, YCbCr4:2:2, and the like.

The CEC line 84 includes one signal line, which is not shown, included in the HDMI cable, and is used to perform bidirectional communication of control data between the HDMI transmission section and the HDMI reception section. The bidirectional communication is performed in time division. A line 86 connected to a pin called a hot plug detect (HPD) is included in the HDMI cable. A source device can detect a connection of a sink device using the line 86. Further, the HDMI cable includes a line 87 used to supply power from the source device to the sink device. In addition, the HDMI cable also includes a reserved line 88.

Figure 8:
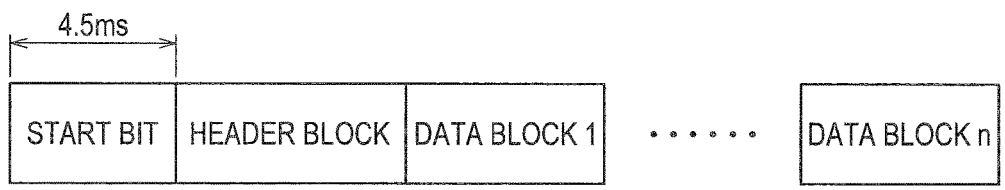
FIG. 8 is a diagram showing a block configuration of data transmitted through a CEC line (CEC channel)

FIG. 8 is a diagram showing a block configuration of data transmitted through a CEC line (CEC channel). The data has a structure in which one block is transmitted for 4.5 ms via the CEC line. In data transmission initiation, a start bit is arranged, a header block is arranged, and then any number (n) of data blocks including data to be actually transmitted are arranged.

Figure 9:
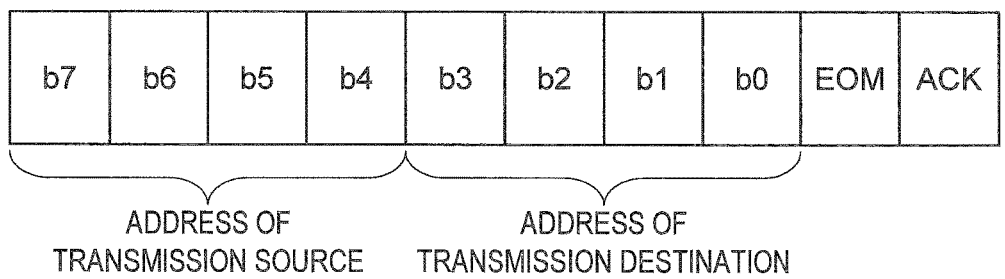
FIG. 9 is a diagram showing an example of data structure of a header block.

FIG. 9 is a diagram showing an example of data structure of a header block. A logical address (source address) of a transmission source and a logical address (sink address) of a transmission destination are arranged in the header block. The logical address of a transmission source corresponds to an initiator, and the logical address of a transmission destination corresponds to a destination.

Figure 30:
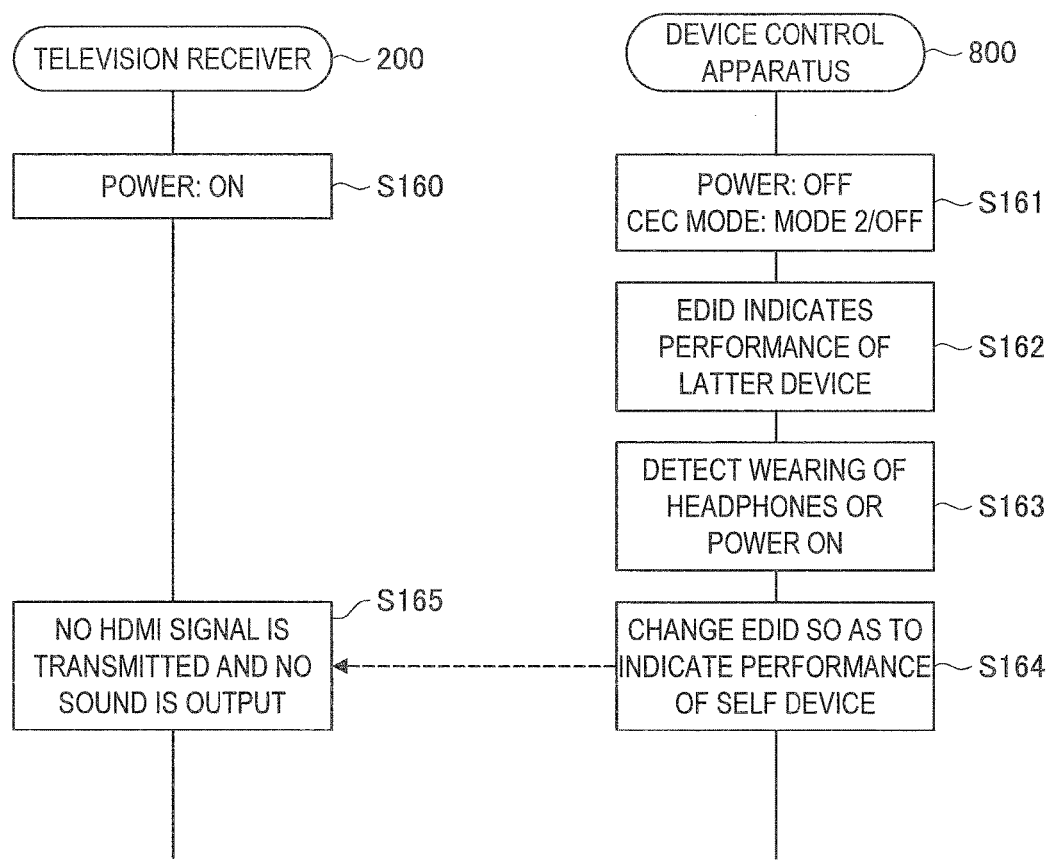
FIG. 30 is a diagram showing an operation example of the AV system in a case where the state of sound output changes from a state C6# to a state C3.

The CEC message has a structure in which a maximum of sixteen pieces of 10-bit data are connected. Among the 10 bits, last 2 bits include an EOM bit indicating that it is a last bit, and an ACK bit indicating that the message is recognized, as shown in FIG. 30. Accordingly, hereinafter, first 8 bits of the 10-bit data are treated as one byte.

A first one byte of the CEC command includes 4 bits in which a logical address of a command transmission source is stored, and 4 bits in which a logical address of a command transmission destination is stored. As shown in FIG. 2, the television receiver 200, generally, has a logical address designated as 0 and the device control apparatus 800 has a logical address designated as 5. Further, command transmission methods include broadcast by which transmission is performed from one device to all devices, and unicast by which transmission is performed from one device to a device having a specific logical address.

Heretofore, there has been described the basic configuration example of the AV system 100A that may be applied an embodiment of the present disclosure.

<2-2. Switching of Sound Output>

Subsequently, switching of sound output according to an embodiment of the present disclosure will be described. In the switching of sound output according to an embodiment of the present disclosure, there will be described in detail a technique of easily switching, by the device control apparatus 800, an audio (sound) output destination between the headphones 900 serving as an example of sound output apparatus and the television receiver 200 serving as an example of another sound output apparatus.

Figure 10:
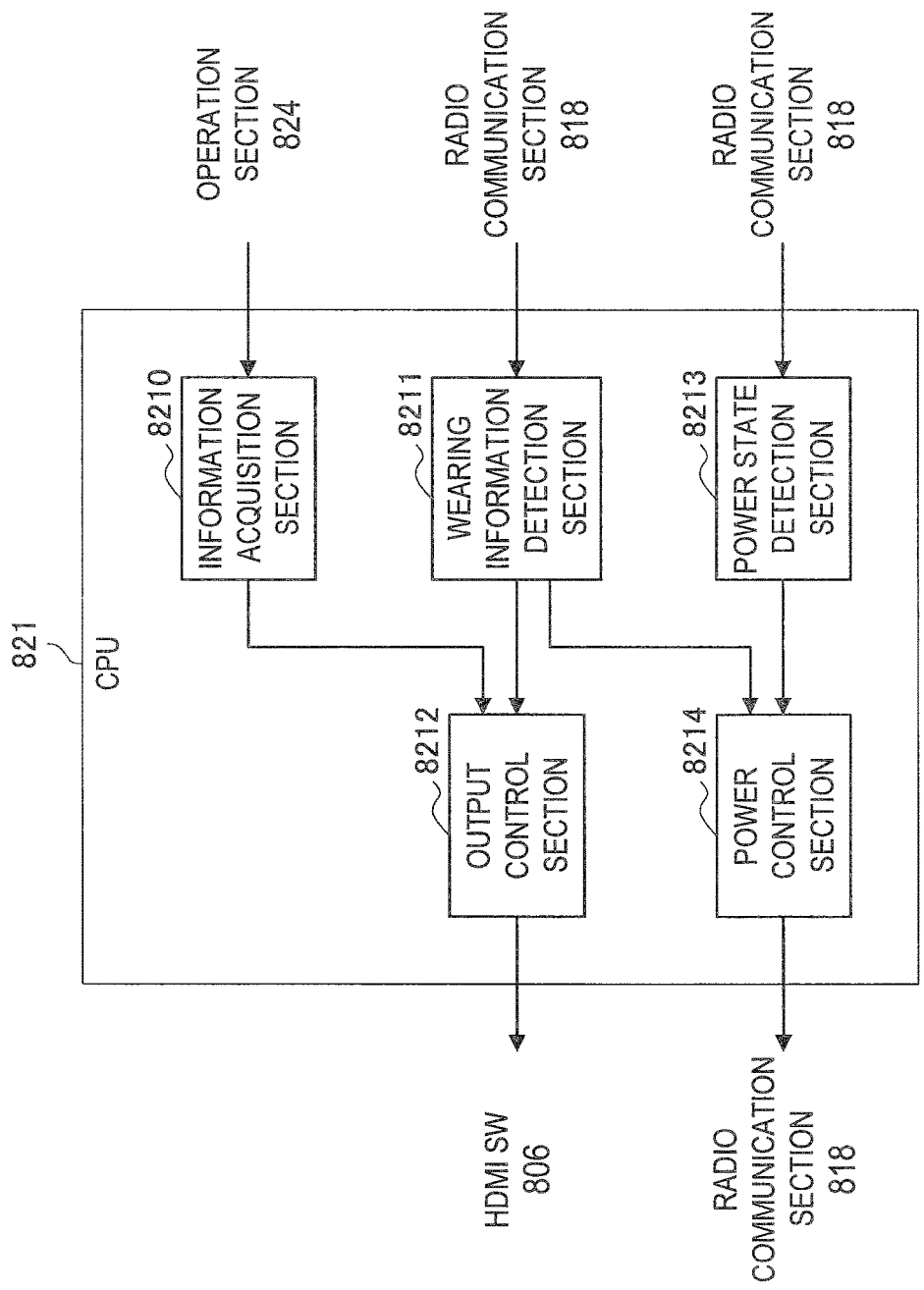
FIG. 10 is a diagram showing a functional configuration example of a CPU of the device control apparatus.

FIG. 10 is a diagram showing a functional configuration example of the CPU 821 of the device control apparatus 800. As shown in FIG. 10, the CPU 821 includes an information acquisition section 8210, a wearing information detection section 8211, an output control section 8212, a power state detection section 8213, and a power control section 8214. Note that the information acquisition section 8210, the wearing information detection section 8211, the output control section 8212, the power state detection section 8213, and the power control section 8214 are each actually realized by the CPU 821 reading out from the ROM 822 and developing on the RAM 823 software or data, and activating software.

The information acquisition section 8210 acquires, from the operation section 824, information given by a user to the operation section 824, and provides the output control section 8212 with the acquired information. The types of information acquired by the information acquisition section 8210 from the operation section 824 are not particularly limited. Further, the information acquisition section 8210 does not only acquire information from the operation section 824, but is also capable of acquiring another piece of information and providing the output control section 8212 with the other piece of information.

The wearing information detection section 8211 detects wearing information of the headphones 900 serving as an example of a sound output apparatus. The wearing information transmitted from the headphones 900 is received by the radio communication section 818, and the wearing information received by the radio communication section 818 is detected by the wearing information detection section 8211. In the case where the wearing information is transmitted from the headphones 900 via a radio signal, the radio signal is converted into a digital signal by the radio communication section 818.

The output control section 8212 switches the output destination of an input sound between the headphones 900 serving as an example of sound output apparatus and the television receiver 200 serving as an example of another sound output apparatus, in accordance with the detection result obtained by the wearing information detection section 8211. The input sound is, for example, an audio signal input from the HDMI terminal 801, and is, for example, an audio signal input through the HDMI terminal 801 from the video recorder 400. For example, in the case where the wearing of the headphones 900 is detected by the wearing information detection section 8211, the output control section 8212 may perform control such that the output destination of an input sound is the headphones 900. The reason therefor is that it is estimated that, when the wearing of the headphones 900 is detected, a user attempts to listen to the audio output from the headphones 900.

For example, in the case where the wearing of the headphones 900 is detected by the wearing information detection section 8211, the output control section 8212 may perform control such that an audio signal input from the HDMI terminal 801 is output from the radio communication section 818. The audio by the audio signal output from the radio communication section 818 may be output from the headphones 900. In order to perform such control, the output control section 8212 may perform control such that an audio signal received by the HDMI reception section 807 is transmitted by the HDMI transmission section 808, for example. Further, the output control section 8212 may perform control such that the audio signal received by the HDMI reception section 807 is not output by the radio communication section 818.

On the other hand, for example, in the case where the taking off of the headphones 900 is detected by the wearing information detection section 8211, the output control section 8212 may perform control such that the output destination of an input sound is the television receiver 200. The reason therefor is that it is estimated that, when the taking off of the headphones 900 is detected, a user attempts to listen to the audio output from the television receiver 200. For example, in the case where the taking off of the headphones 900 is detected by the wearing information detection section 8211, the output control section 8212 may perform control such that an audio signal input from the HDMI terminal 801 is output from the HDMI terminal 804. The audio by the audio signal output from the HDMI terminal 804 may be output from speaker 219 of the television receiver 200.

In order to perform such control, the output control section 8212 may perform control such that an audio signal received by the HDMI reception section 807 is transmitted by the radio communication section 818 to the headphones 900. Further, the output control section 8212 may perform control such that the audio signal received by the HDMI reception section 807 is not transmitted by the HDMI transmission section 808. According to the functions of the device control apparatus 800, the device control apparatus 800 can easily switch the output destination of an audio between the headphones 900 serving as an example of sound output apparatus and the television receiver 200 serving as an example of another sound output apparatus. Therefore, time and effort can be saved for the user to perform the switching of the audio output destination.

Note that, in the case where the wearing of the headphones 900 is detected, it becomes necessary to supply power to the DAC 920 and the sound amplification section 930 of the headphones 900. Accordingly, in the case where the wearing of the headphones 900 is detected and the power of the headphones 900 is OFF, the control may be performed such that the power of the headphones 900 is turned on. Such control can save time and effort for the user to turn on the power.

The specific configuration therefor is that the power state detection section 8213 may detect the power state of the headphones 900. Further, in the case where the wearing of the headphones 900 is detected by the wearing information detection section 8211 and the power OFF state of the headphones 900 is detected by the power state detection section 8213, the power control section 8214 may perform control such that the power of the headphones 900 is turned on. The control for turning on the power of the headphones 900 is realized by causing a power control signal indicating turning on power to be output from the radio communication section 818 to the headphones 900.

In the same manner, in the case where the taking off of the headphones 900 is detected, it becomes unnecessary to supply power to the DAC 920 and the sound amplification section 930 of the headphones 900. Accordingly, in the case where the taking off of the headphones 900 is detected and the power of the headphones 900 is ON, the control may be performed such that the power of the headphones 900 is turned off. Such control can save time and effort for the user to turn off the power.

The specific configuration therefor is that the power state detection section 8213 may detect the power state of the headphones 900. Further, in the case where the taking off of the headphones 900 is detected by the wearing information detection section 8211 and the power ON state of the headphones 900 is detected by the power state detection section 8213, the power control section 8214 may perform control such that the power of the headphones 900 is turned off. The control for turning off the power of the headphones 900 is realized by causing a power control signal indicating turning off power to be output from the radio communication section 818 to the headphones 900.

Figure 11:
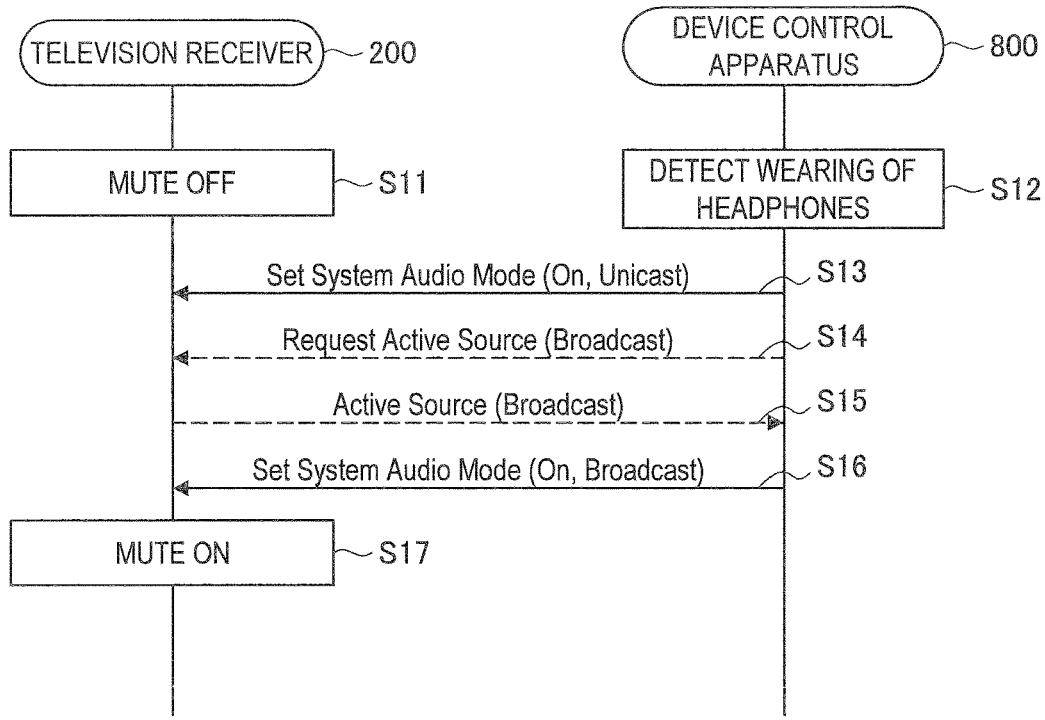
FIG. 11 is a sequence diagram showing an operation example of the AV system when it is detected that the headphones are being worn.

FIG. 11 is a sequence diagram showing an operation example of the AV system 100A when it is detected that the headphones 900 are being worn. The operation example in the sequence diagram mainly shows an example of operation performed based on data transmitted/received between the device control apparatus 800 and the television receiver 200, and may be performed in accordance with the HDMI standard. As shown in FIG. 11, let us assume that the device control apparatus 800 performs control such that the output destination of the audio played back by the television receiver 200 is the television receiver 200 (device control apparatus 800 is in a system audio mode OFF state). In this case, the sound amplification circuit 218 is controlled to be in a mute OFF state by the CPU 231 of the television receiver 200 (Step S11). Further, the radio communication section 818 is controlled to be in a mute ON state by the output control section 8212 of the device control apparatus 800.

Here, when the wearing of the headphones 900 is detected by the wearing information detection section 8211 of the device control apparatus 800 (Step S12), the output control section 8212 transmits a message <Set System Audio Mode>[On] to the television receiver 200 in unicast (Step S13). The output control section 8212 controls the radio communication section 818 to be in a mute OFF state.

The output control section 8212 monitors whether a response to the message, such as Ack or a message <Feature Abort>, is sent back from the television receiver 200. Note that, the HDMI standard defines the following: Ack is sent back in the case where the received message can be accepted (in the case of being compatible with a command of the received message); and a message <Feature Abort> is sent back in the case where the received message cannot be accepted (in the case of not being compatible with a command of the received message). Here, the television receiver 200 sends back Ack in the case of being compatible with "System Audio Control", and sends back <Feature Abort> in the case of not being compatible with "System Audio Control".

When Ack is sent back from the television receiver 200, for example, the output control section 8212 transmits a message <Request Active Source> in broadcast (Step S14). Based on a message <Active Source> transmitted by the television receiver 200 in broadcast (Step S15), the output control section 8212 switches the input of the audio signal to the HDMI terminal 804 or to the TV dedicated terminal (optical input terminal 805 or analog audio input terminal 811). Note that, in the case of using Active Source information which is already grasped, the output control section 8212 may not perform Step S14 and Step S15.

Further, when Ack is sent back from the television receiver 200, for example, the output control section 8212 transmits a message <Set System Audio Mode>[On] in broadcast (Step S16), and switches the state of the device control apparatus 800 to a system audio mode ON state.

When receiving the message, the CPU 231 of the television receiver 200 is controlled to be in a mute ON state (sound amplification circuit 218 is controlled to be in a mute ON state) (Step S17). In the mute ON state, audio is not output from the speaker 219 of the television receiver 200.

Figure 12:
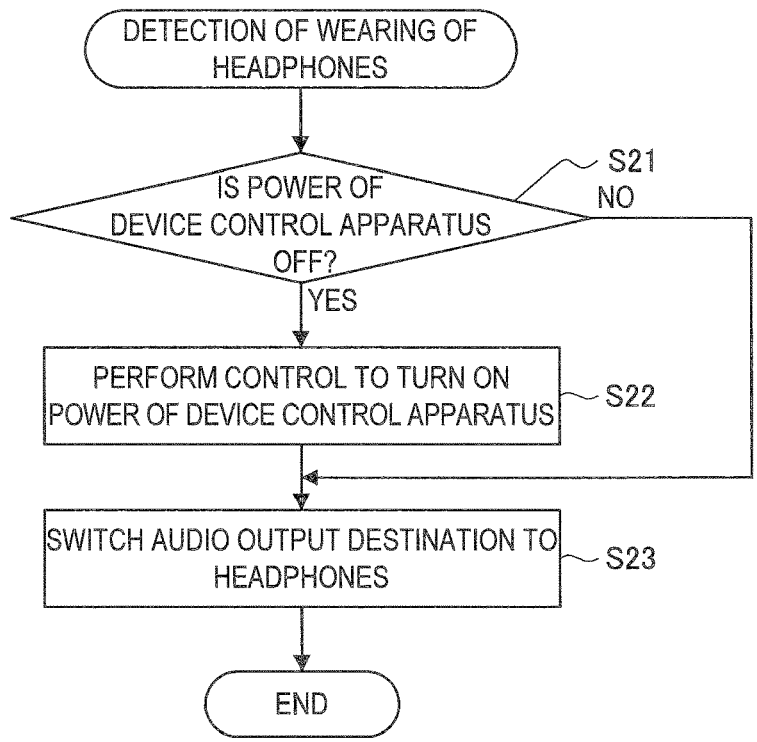
FIG. 12 is a flowchart showing an operation example of the device control apparatus when it is detected that the headphones are being worn.

FIG. 12 is a flowchart showing an operation example of the device control apparatus 800 when it is detected that the headphones 900 are being worn. The operation example in the flowchart mainly shows an example of operation performed based on data transmitted/received between the device control apparatus 800 and the headphones 900. As shown in FIG. 12, let us assume that the device control apparatus 800 performs control such that the output destination of the audio played back by the television receiver 200 is the television receiver 200 (device control apparatus 800 is in a system audio mode OFF state). In this case, the sound amplification circuit 218 is controlled to be in a mute OFF state by the CPU 231 of the television receiver 200. Further, the radio communication section 818 is controlled to be in a mute ON state by the output control section 8212 of the device control apparatus 800.

Here, when the wearing of the headphones 900 is detected by the wearing information detection section 8211 of the device control apparatus 800, the power state detection section 8213 determines whether the power of the device control apparatus 800 is OFF (Step S21). In the case where it is determined by the power state detection section 8213 that the power of the device control apparatus 800 is OFF ("YES" in Step S21), the power control section 8214 performs control such that the power of the device control apparatus 800 is turned on (Step S22), and proceeds to Step S23. In the case where it is determined by the power state detection section 8213 that the power of the device control apparatus 800 is ON ("NO" in Step S21), the power control section 8214 proceeds to Step S23. Note that the case where the power of the device control apparatus 800 is OFF means a case where the device control apparatus 800 is in a standby state, for example.

The output control section 8212 switches the audio output destination to the headphones 900 (Step S23). In more detail, the output control section 8212 switches the state of the device control apparatus 800 to a system audio mode ON state. While in the system audio mode ON state, the output control section 8212 controls the radio communication section 818 to be in a mute OFF state. Further, the output control section 8212 switches the input of the audio signal to the HDMI terminal 804 or to the TV dedicated terminal (optical input terminal 805 or analog audio input terminal 811). In addition, the output control section 8212 performs control such that the sound amplification circuit 218 of the television receiver 200 is in a mute ON state.

Figure 13:
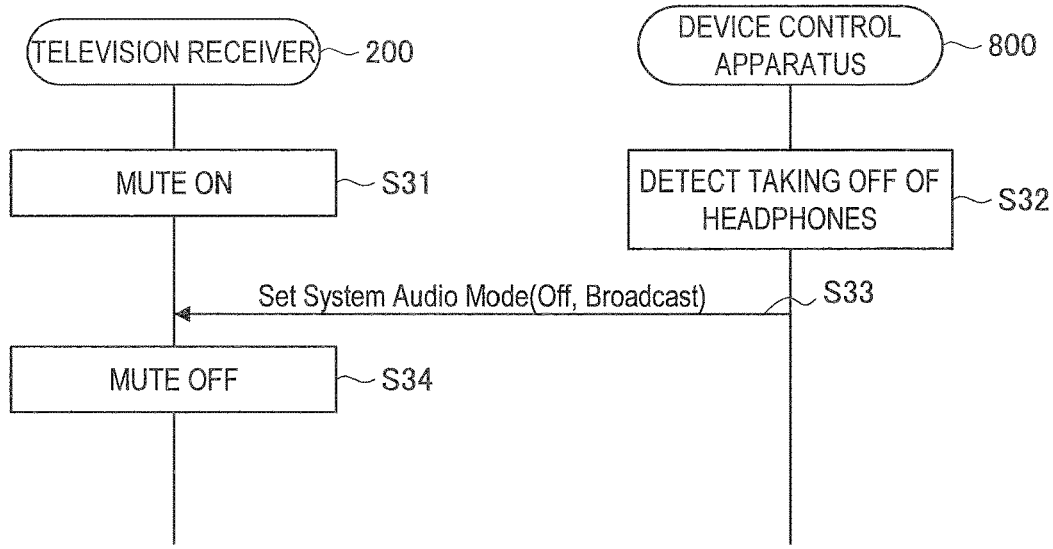
FIG. 13 is a sequence diagram showing an operation example of the AV system when it is detected that the headphones are taken off.

FIG. 13 is a sequence diagram showing an operation example of the AV system 100A when it is detected that the headphones 900 are taken off. The operation example in the sequence diagram mainly shows an example of operation performed based on data transmitted/received between the device control apparatus 800 and the television receiver 200, and may be performed in accordance with the HDMI standard. As shown in FIG. 13, let us assume that the device control apparatus 800 performs control such that the output destination of the audio played back by the television receiver 200 is the headphones 900 (device control apparatus 800 is in a system audio mode ON state). In this case, the sound amplification circuit 218 is controlled to be in a mute ON state by the CPU 231 of the television receiver 200 (Step S31). Further, the radio communication section 818 is controlled to be in a mute OFF state by the output control section 8212 of the device control apparatus 800.

Here, when the taking off of the headphones 900 is detected by the wearing information detection section 8211 of the device control apparatus 800 (Step S32), the output control section 8212 switches the state of the device control apparatus 800 to a system audio mode OFF state, and transmits a message <Set System Audio Mode>[Off] in broadcast (Step S33). While in the system audio mode ON state, the output control section 8212 controls the radio communication section 818 to be in a mute ON state. When receiving the message, the CPU 231 of the television receiver 200 enters a mute OFF state (sound amplification circuit 218 is controlled to be in a mute OFF state) (Step S34). In the mute OFF state, audio is output from the speaker 219 of the television receiver 200.

Figure 14:
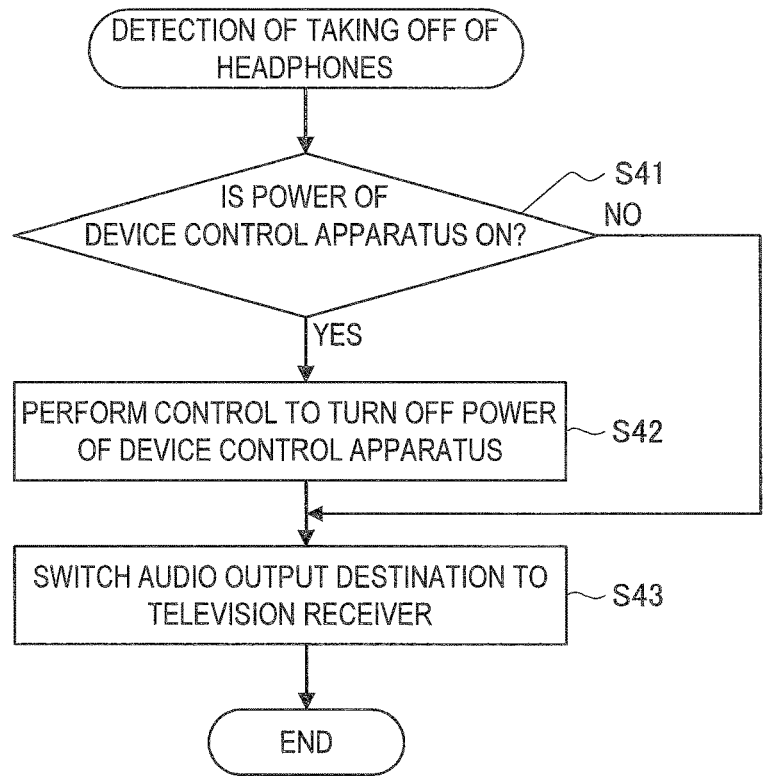
FIG. 14 is a flowchart showing an operation example of the device control apparatus when it is detected that the headphones are taken off.

FIG. 14 is a flowchart showing an operation example of the device control apparatus 800 when it is detected that the headphones 900 are taken off. The operation example in the flowchart mainly shows an example of operation performed based on data transmitted/received between the device control apparatus 800 and the headphones 900. As shown in FIG. 14, let us assume that the device control apparatus 800 performs control such that the output destination of the audio played back by the television receiver 200 is the headphones 900 (device control apparatus 800 is in a system audio mode ON state). In this case, the sound amplification circuit 218 is controlled to be in a mute OFF state by the CPU 231 of the television receiver 200. Further, the radio communication section 818 is controlled to be in a mute ON state by the output control section 8212 of the device control apparatus 800.

Here, when the taking off of the headphones 900 is detected by the wearing information detection section 8211 of the device control apparatus 800, the power state detection section 8213 determines whether the power of the device control apparatus 800 is ON (Step S41). In the case where it is determined by the power state detection section 8213 that the power of the device control apparatus 800 is ON ("YES" in Step S41), the power control section 8214 performs control such that the power of the device control apparatus 800 is turned off (Step S42), and proceeds to Step S43. In the case where it is determined by the power state detection section 8213 that the power of the device control apparatus 800 is OFF ("NO" in Step S41), the power control section 8214 proceeds to Step S43.

The output control section 8212 switches the audio output destination to the television receiver 200 (Step S43). In more detail, the output control section 8212 switches the state of the device control apparatus 800 to a system audio mode OFF state. While in the system audio mode OFF state, the output control section 8212 controls the radio communication section 818 to be in a mute ON state. Further, the output control section 8212 performs control such that the sound amplification circuit 218 of the television receiver 200 is in a mute OFF state.

As described above, according to the embodiment of the present disclosure, the output destination of audio can be easily switched between the headphones 900 serving as an example of sound output apparatus and the television receiver 200 serving as an example of another sound output apparatus. In more detail, since the output destination of audio can be switched based on the operation of wearing the headphones 900 performed by the user or the operation of taking off the headphones 900 performed by the user, the convenience of the user is increased.

Although wireless headphones have been used in the past, it was difficult for the headphones to perform a cooperative operation with another device, since those wireless headphones employed SPDIF or analog input as the sound input and no control signal was particularly prepared for the use between the wireless headphones and the other device. Decoding of a sound signal in the wireless headphones was also limited to the decoding of a sound signal transmitted via SPDIF. Further, although home theatres compatible with HDMI-CEC have been used in the past, it was necessary to perform a button operation on a remote control or a device main body for the switching of the sound output.

The embodiment of the present disclosure is compatible with HDMI-CEC. In more detail, the first embodiment of the present disclosure is compatible with "System Audio Control" described in the specification "High-Definition Multimedia Interface Specification Version 1.4" of HDMI distributed from HDMI-LLC. Accordingly, unlike the case of employing the SPDIF or analog input, the sound output can be easily switched from the headphones 900 side, like in a home theatre system. Further, the operability is enhanced, since the switching of the sound output is realized by detecting the operation of the user using a wearing detection switch attached to the headphones 900.

Further, since the device control apparatus 800 has a function of Audio System of HDMI-CEC, it becomes possible to perform volume adjustment, mute adjustment, and the like of the television receiver 200 and the headphones 900 by an operation on a remote control of the television receiver 200 used when viewing TV. Further, it becomes possible to perform input switch interlock, power interlock, and various cooperative operations. The functions of the input switch interlock, the power interlock, and the like will be described later.

<2-3. Case where Logical Address is Already Acquired>

Subsequently, a case where logical address is already acquired will be described. To be specific, there will be described a case where a logical address that a device control apparatus is capable of acquiring is already acquired by another device (for example, AV amplifier).

Figure 15:
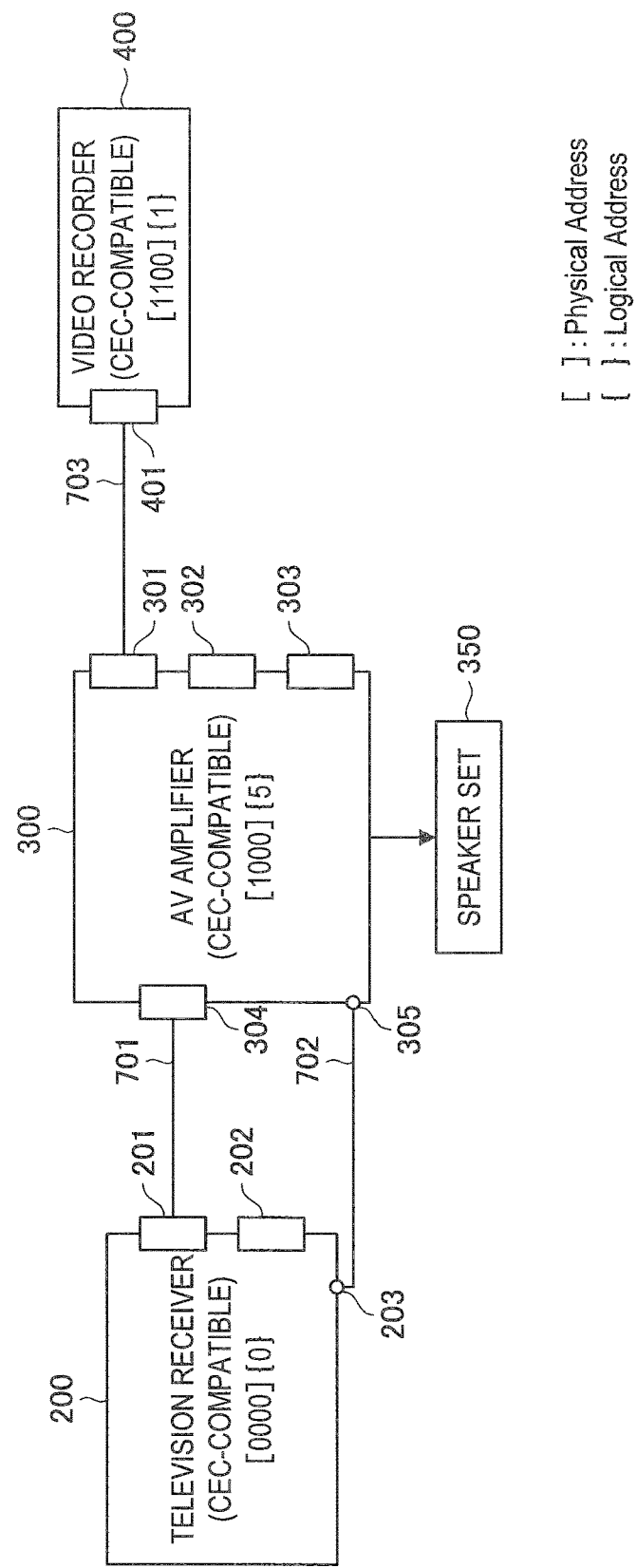
FIG. 15 is a diagram illustrating an AV system (before connection of the device control apparatus)

FIG. 15 is a diagram illustrating an AV system (before connection of a device control apparatus 800) according to an embodiment of the present disclosure. As shown in FIG. 15, an AV system 100A includes a television receiver 200, an AV amplifier 300, and a video recorder 400. The video recorder 400 configures an HDMI source device. The AV amplifier 300 configures an HDMI sink device. The television receiver 200 configures an HDMI sink device. The video recorder 400 is a device that uses a video disc such as a DVD or a hard disk as a recording medium and record video data (AV content).

The AV amplifier 300 is a CEC-compatible device, and includes HDMI terminals 301, 302, 303, and 304, and an optical input terminal 305. A speaker set 350 including a plurality of speakers is connected to the AV amplifier 300, and an audio signal that is playback-processed in the AV amplifier 300 is output from the speaker set 350. This speaker set 350 includes speakers located at a front, right front, left front, right rear, and left rear of a listener, and a subwoofer speaker for bass output which realizes, for example, 5.1 channel surround. The AV amplifier 300 and each speaker may be separate entities, but, for example, the AV amplifier and the respective speakers (at least front speakers) may be housed in a rack in which a television receiver is placed.

The television receiver 200 and the AV amplifier 300 are connected via an HDMI cable 701 and an optical cable 702.

That is, one end of the HDMI cable 701 is connected to the HDMI terminal 201 of the television receiver 200 and the other end thereof is connected to the HDMI terminal 304 of the AV amplifier 300. One end of the optical cable 702 is connected to the optical output terminal 203 of the television receiver 200 and the other end thereof is connected to the optical input terminal 305 of the AV amplifier 300. The AV amplifier 300 and the video recorder 400 are connected via an HDMI cable 703. That is, one end of the HDMI cable 703 is connected to the HDMI terminal 301 of the AV amplifier 300, and another end is connected to the HDMI terminal 401 of the video recorder 400.

In the AV system 100B1 shown in FIG. 15, a physical address and a CEC logical address of each device are acquired, for example, as follows. That is, when the AV amplifier 300 is connected to the television receiver 200 (the physical address is and the CEC logical address is {0}) via the HDMI cable 701, the AV amplifier 300 acquires the physical address from the television receiver 200 using an HDMI control protocol. As described above, the CEC-compatible device is defined to acquire a logical address upon HDMI connection. Further, as described above, the CEC-compatible device performs message transmission and reception using this logical address.

The AV amplifier 300 is a CEC-compatible device, as described above. The AV amplifier 300 decides a logical address {5} as "Audio System" based on the table of FIG. 2. In this case, the AV amplifier 300 recognizes that a device having this logical address {5} is not included in the other devices with a <Polling Message> of the CEC control protocol and then decides the logical address {5} as its logical address. The AV amplifier 300 notifies the television receiver 200 that the physical address corresponds to the CEC-compatible device {5} by means of a <Report Physical Address> of the CEC control protocol.

When the video recorder 400 is connected to the AV amplifier 300 via the HDMI cable 703, the video recorder 400 acquires a physical address from the AV amplifier 300 using the HDMI control protocol.

The video recorder 400 is a CEC-compatible device, as described above. The video recorder 400 decides logical address {1} as a "Recording Device" based on the table of FIG. 2. In this case, the video recorder 400 recognizes that a device having this logical address {1} is not included in the other devices with a <Polling Message> of the CEC control protocol and then decides the logical address {1} as its logical address. The video recorder 400 notifies the television receiver 200 and the AV amplifier 300 that the physical address corresponds to the CEC-compatible device {1 } by means of the <Report Physical Address> of the CEC control protocol.

(Configuration of AV Amplifier)

Figure 16:
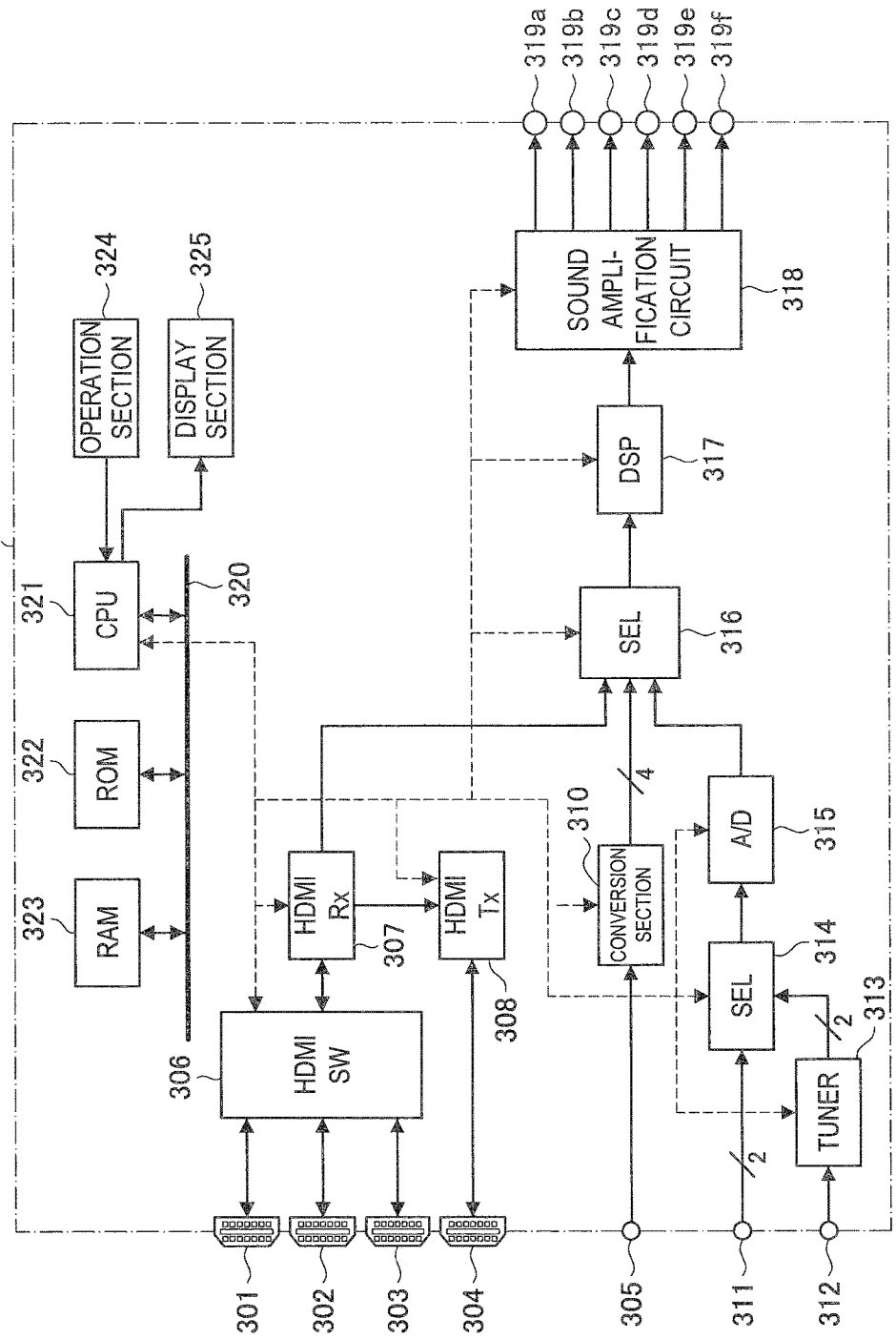
FIG. 16 is a block diagram showing a configuration example of an AV amplifier (repeater device) that configures the AV system.

FIG. 16 is a block diagram showing a configuration example of the AV amplifier 300 (repeater device) that configures the AV system 100B1. As shown in FIG. 16, the AV amplifier 300 includes HDMI terminals 301 to 304, an optical input terminal 305, an HDMI switcher 306, an HDMI reception section 307, an HDMI transmission section 308, and a conversion section 310. The AV amplifier 300 further includes an analog audio input terminal 311, an antenna terminal 312, a FM tuner 313, a selector 314, an A/D converter 315, a selector 316, and a digital signal processor (DSP) 317. The AV amplifier 300 further includes a sound amplification circuit 318, audio output terminals 319a to 319f, an internal bus 320, a CPU 321, a ROM 322, and a RAM 323.

The CPU 321 controls operation of each section of the AV amplifier 300. The ROM 322 stores control software and data. The RAM 323 configures, for example, a work area of the CPU 321. The CPU 321 develops the software or data read from the ROM 322 onto the RAM 323 to start up the software and control each section of the AV amplifier 300. The CPU 321, the ROM 322, and the RAM 323 are connected to the internal bus 320. The CPU 321, the ROM 322, and the RAM 323 may be a microcomputer of one chip (one chip microcomputer).

An operation section 324 and a display section 325 are connected to the CPU 321. The operation section 324 and the display section 325 configure a user interface. Using the operation section 324, the user can perform selection of an output audio of the AV amplifier 300, tuning by the FM tuner 313, an operation setting, and the like. The user can set the system audio mode to ON/OFF using the operation section 324.

This operation section 324 includes keys, buttons, a dial, a remote control signal transmission/reception section, and the like disposed on a casing, which is not shown, of the AV amplifier 300. The display section 325 displays an operation status of the AV amplifier 300, a user operation state, and the like, and includes a fluorescent display tube, a liquid crystal display (LCD), or the like.

The optical input terminal 305 is a terminal that inputs a digital optical signal via the optical cable. The conversion section 310 generates a clock LRCK having the same frequency (e.g., 44.1 kHz) as a sampling frequency of an audio signal, a master clock MCK that is, for example, 512 or 256 times the sampling frequency, left and right 24-bit audio data LDATA and RDATA occurring every period of the clock LRCK, and a bit clock BCK synchronized with each bit of the data from the digital optical signal input to the optical input terminal 305, and supplies them to the selector 316.

The analog audio input terminal 311 is a terminal that inputs left and right analog audio signals obtained in the external device. The antenna terminal 312 is a terminal that inputs an FM broadcast signal received by an FM receiving antenna (not shown). The FM tuner 313 processes the FM broadcast signal (radio broadcast signal) input to the antenna terminal 312 to output left and right analog audio signals corresponding to the user-selected channel. The selector 314 selectively extracts the analog audio signal input to the analog audio input terminal 311 or the analog audio signal output from the tuner 313. The A/D converter 315 converts the analog audio signal extracted by the selector 314 into digital audio data and supplies the digital audio data to the selector 316.

The HDMI switcher 306 selectively connects the HDMI terminals 301 to 303 to the HDMI reception section 307. The HDMI reception section 307 is selectively connected to any of the HDMI terminals 301 to 303 via the HDMI switcher 306. This HDMI reception section 307 receives video and audio data transmitted in one direction from external devices (source devices) connected to the HDMI terminals 301 to 303 through communication conforming to HDMI.

The HDMI reception section 307 supplies the audio data to the selector 316, and supplies the video and audio data to the HDMI transmission section 308. The HDMI transmission section 308 transmits, from the HDMI terminal 304, the baseband video and audio data supplied from the HDMI reception section 307 through the communication conforming to HDMI. Thus, the AV amplifier 300 has a repeater function. The HDMI reception section 307 and the HDMI transmission section 308 will be described in detail later.

The selector 316 selectively extracts the audio data supplied from the HDMI reception section 307, the audio data supplied from the conversion section 310, or the audio data supplied from the A/D converter 315, and supplies the audio data to the DSP 317.

The DSP 317 performs a process of processing the audio data obtained by the selector 316 to generate audio data of each channel for realizing surround audio, a process of giving a given sound field property and an acoustic property, a process of converting a digital signal into an analog signal, and the like. For example, the DSP 317 can perform sound field processing of 5.1 channel surround audio, and enables another mode such as 2-channel audio. The sound amplification circuit 318 amplifies a front left audio signal SFL, a front right audio signal SFR, a front center audio signal SFC, a rear left audio signal SRL, a rear right audio signal SRR, and a subwoofer audio signal SSW output from the DSP 317, and outputs the signals to the audio output terminals 319a to 319f.

Although not shown, speakers constituting the speaker set 350 are connected to the audio output terminals 319a to 319f. That is, a front left speaker, a front right speaker, a front center speaker, a rear left speaker, a rear right speaker, and a subwoofer speaker are connected. Here, though, for example, with a virtual sound image localization process in the DSP 317, surround audio may be reproduced by a smaller number of speakers.

(Operation of AV Amplifier)

Subsequently, an operation of the AV amplifier 300 shown in FIG. 16 will be briefly described. In the HDMI reception section 307, the baseband video and audio data input to the HDMI terminals 301 to 303 via the HDMI cable is obtained. This video and audio data is supplied to the HDMI transmission section 308 and transmitted to the HDMI cable connected to the HDMI terminal 304. Further, the audio data obtained in the HDMI reception section 307 is supplied to the selector 316. In the selector 316, the audio data supplied from the HDMI reception section 307, the audio data supplied from the conversion section 310, or the audio data supplied from the A/D converter 315 is selectively extracted and supplied to the DSP 317.

In the DSP 317, necessary processes such as a process of generating audio data of each channel for realizing the 5.1 channel surround, a process of giving a given sound field property, a process of converting the digital signal into an analog signal, and the like are performed on the audio data. Audio signals of respective channels output from the DSP 317 are output to the audio output terminals 319a to 319f via the sound amplification circuit 318.

For example, in the AV system 100 B1 shown in FIG. 15, when the program tuned by the digital tuner 211 of the television receiver 200 is viewed and the AV amplifier 300 is in a system audio mode of ON, the following operation is performed. That is, the selector 316 extracts the audio data from the conversion section 310. Accordingly, the audio signals of the respective channels according to the audio data of the program tuned by the digital tuner 211 of the television receiver 200 are output to the audio output terminals 319a to 319f. Thus, the audio of the program tuned by the digital tuner 211 of the television receiver 200 is output from the speaker set 350 connected to the AV amplifier 300. When the program tuned by the digital tuner 211 of the television receiver 200 is viewed and the AV amplifier 300 is in the system audio mode of OFF, the sound amplification circuit 318 enters a mute ON state. Accordingly, the audio signal is not supplied from the sound amplification circuit 318 to the audio output terminals 319a to 319f.

For example, in the AV system 100 B1 shown in FIG. 15, when an image and an audio by the video data and the audio data from the video recorder 400 are watched and listened to and the AV amplifier 300 is in the system audio mode of ON, the following operation is performed. That is, the HDMI terminal 301 is connected to the HDMI reception section 307 via the HDMI switcher 306. Further, in the selector 316, the audio data from the HDMI reception section 307 is extracted. Accordingly, the audio signals of the respective channels according to the audio data from the video recorder 400 are output to the audio output terminals 319a to 319f. Thus, the audio by the audio data from the video recorder 400 is output from the speaker set 350 connected to the AV amplifier 300.

When the video and the audio by video data and the audio data from the video recorder 400 are watched and listened to and the AV amplifier 300 is in the system audio mode of OFF, the sound amplification circuit 318 enters a mute ON state, and the audio signal is not supplied from the sound amplification circuit 318 to the audio output terminals 319a to 319f.

(Configuration Example of AV System According to Present Embodiments)

Figure 17:
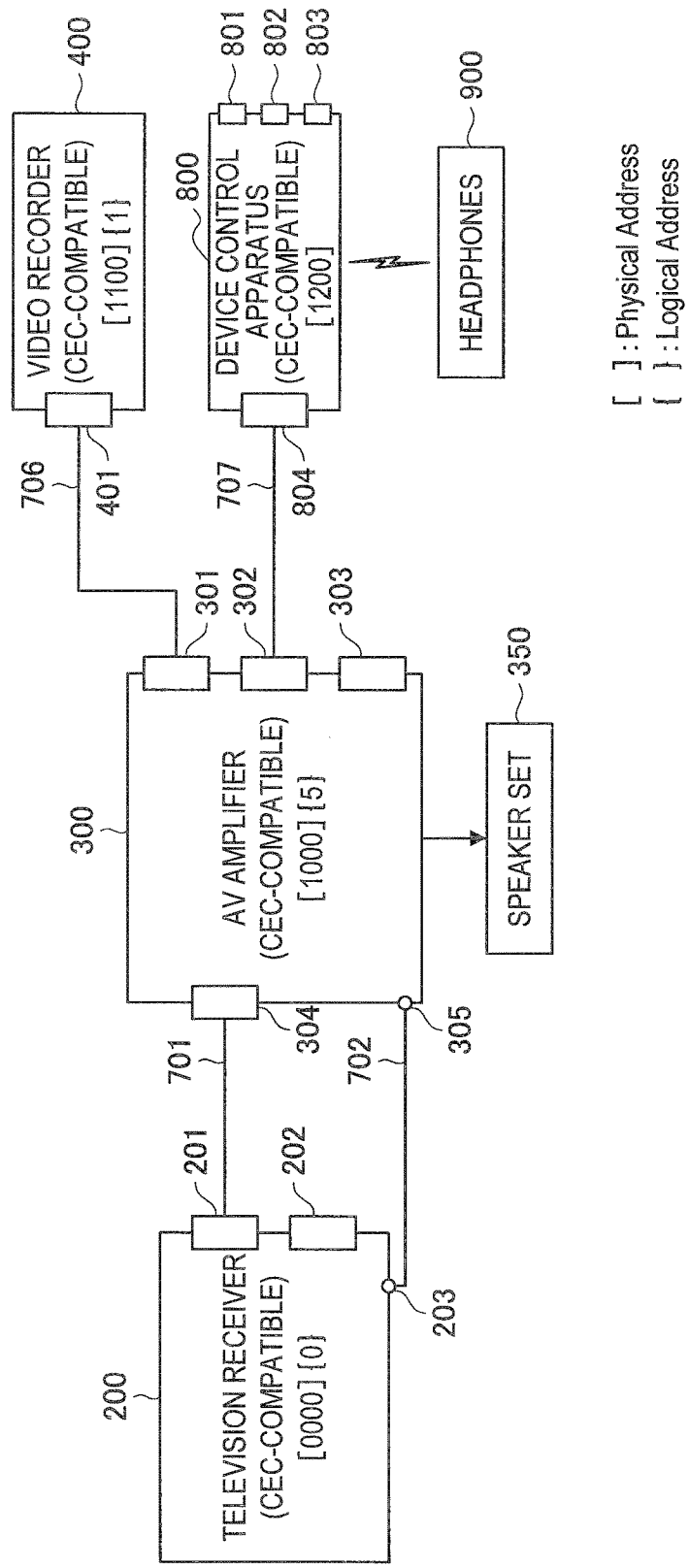
FIG. 17 is a diagram illustrating the AV system (after connection of the device control apparatus)

FIG. 17 is a diagram illustrating the AV system (after connection of the device control apparatus 800) according to an embodiment of the present disclosure. As shown in FIG. 17, let us assume the case where the device control apparatus 800 is connected to the AV system 100B1 shown in FIG. 15. When the device control apparatus 800 is connected to the AV amplifier 300 (the physical address is and the CEC logical address is {5}) via the HDMI cable 707, the device control apparatus 800 acquires the physical address from the AV amplifier 300 using the HDMI control protocol.

The device control apparatus 800 is a CEC-compatible device, as described above. The device control apparatus 800 attempts to acquire a logical address {5} as "Audio System" based on the table of FIG. 2. In this case, it is necessary that the device control apparatus 800 confirms that a device having this logical address {5} is not included in the other devices with a <Polling Message> of the CEC control protocol. However, since the logical address {5} is already acquired by the AV amplifier 300, the AV amplifier 300 already has this logical address {5}. Accordingly, since the device control apparatus 800 cannot decide the logical address {5} as its logical address, the device control apparatus 800 cannot operate using the logical address {5}. That is, the device control apparatus 800 cannot operate as "Audio System".

In exchange for not being able to acquire the logical address {5}, the device control apparatus 800 ends up in acquiring a logical address {15}. The flow thereof is described as follows. That is, in the HDMI-CEC standard, when acquiring a valid physical address (for example, "F.F.F.F" or the like is an invalid physical address), a device connected to the AV system performs operation for acquiring the logical address using a <Polling Message>. For example, the device sets a logical address to be acquired as an initiator, and sets the same logical address as a destination, and thus attempts to acquire the logical address. In the case where ACK is sent back from another device in response to the <Polling Message>, it is determined that the logical address is already acquired. Then, the device performs operation of acquiring a vacant logical address (that is, a logical address that ACK is not sent back) by sequentially changing logical addresses, in an order of logical addresses {1}, {2}, . . . , for example.

In the case where the device has a logical address that is acquired beforehand, the device attempts to acquire sequentially logical addresses starting from the logical address that is acquired beforehand, and in the case where no vacant can be found after attempting to acquire all logical addresses that are capable of being acquired, the device holds the logical address {15}. As in the case described above, in the case of attempting to add the device control apparatus 800 serving as "Audio System" to the AV system 100B1 in the state in which "Audio System" is already acquired by the AV amplifier 300, the device control apparatus 800 sets "Initiator" and "Destination" to {5} and {5}, respectively, and transmits the <Polling Message>. However, since the AV amplifier 300 sends back ACK in response to the message, the device control apparatus 800 ends up in acquiring the logical address {15} and cannot be operated as "Audio System".

In this manner, in an environment in which an AV amplifier is already used, it is difficult to add the device control apparatus 800 to the HDMI-CEC system (CEC connecting system) and to use the device control apparatus 800. As described in the specification "High-Definition Multimedia Interface Specification Version 1.4" of HDMI distributed from HDMI-LLC, that is because a logical address capable of being acquired is uniquely decided for each device as CEC, and the number of logical addresses corresponding to "Audio System" is only one. Accordingly, the following suggests the device control apparatus 800 which can be effectively added to the AV system 100B1, even in the case where another device already has a logical address capable of being acquired by the device control apparatus 800 as in the case shown in FIG. 17, for example.

<2-4. Two Sound Output Modes>

First, two sound output modes according to an embodiment of the present disclosure will be described. Here, a technique will be described in detail, in which two operation modes are provided as operation modes of the device control apparatus 800, which are a first sound output mode (MODE 1) using a first logical address and a second sound output mode (MODE 2) using a second logical address. The second sound output mode (MODE 2) is a mode having functions which are more limited compared to those of the first sound output mode (MODE 1). The CPU 821 of the device control apparatus 800 controls a sound output from the headphones 900 in accordance with one of those two modes. Note that, in the description below, an operation mode (hereinafter, may be referred to as "CEC mode" in some cases) as a CEC device will be used as an example of the operation mode of the device control apparatus 800.

FIG. 18 is a diagram illustrating examples of functions exhibited in respective modes of the first sound output mode (MODE 1) and the second sound output mode (MODE 2). As shown in FIG. 18, as the CEC modes of the device control apparatus 800, there is provided the second sound output mode (MODE 2) in addition to the first sound output mode (MODE 1). As a CEC mode of the device control apparatus 800, there is also provided "OFF=CEC-non-compatible mode". FIG. 18 shows differences between the first sound output mode (MODE 1) and the second sound output mode (MODE 2).

The first sound output mode (MODE 1) is a mode for the case in which the logical address {5} is acquired and an operation is performed using the acquired logical address {5}, for example. Further, the second sound output mode (MODE 2) is a mode for the case in which the logical address {15} is acquired without performing polling and an operation is performed using the acquired logical address {15}, for example. As shown in FIG. 2, the logical address {15} corresponds to "Unregistered". As shown in FIG. 18, there are functions which are compatible in the first sound output mode (MODE 1) but non-compatible in the second sound output mode (MODE 2).

In this manner, even in the case where the logical address {5} has already been acquired by another device (AV amplifier 300 in the example shown in FIG. 17), the logical address {15} can be acquired and an operation can be performed using the acquired logical address {15}. In the case where the device control apparatus 800 operates as the second sound output mode (MODE 2) using the logical address {15}, the device control apparatus 800 has more limited functions compared to the case of operating as the first sound output mode (MODE 1) using the logical address {5}.

Specifically, as shown in FIG. 18, since the second sound output mode (MODE 2) is not compatible with the "System Audio Control" function, the device control apparatus 800 cannot operate as the first sound output mode (MODE 1) in the second sound output mode (MODE 2), for example. Further, for example, since the second sound output mode (MODE 2) is not compatible with the "Audio Return Channel" function, the device control apparatus 800 cannot operate using an ARC signal in the second sound output mode (MODE 2).

On the other hand, for example, since the second sound output mode (MODE 2) is compatible with the "Routing Control" function, the device control apparatus 800 can switch a signal input from a device at the upstream side (device connected to the HDMI terminal 801, 802, or 803 of the device control apparatus 800) in an interlocking manner with an <Active Source> device in the second sound output mode (MODE 2 (i.e., the device control apparatus 800 has an input switch interlock function). Further, for example, since the second sound output mode (MODE 2) is compatible with the "System Standby" function, power interlock can be performed (for example, the power of the device control apparatus 800 can be turned off in an interlocking manner with the power OFF of the television receiver 200).

As described above, the second sound output mode (MODE 2) which is the CEC mode using the logical address {15} cannot operate system audio control. However, also in the second sound output mode (MODE 2), a sound output from the headphones 900 can be controlled, for example. Hereinafter, a technique of controlling the sound output from the headphones 900 in the second sound output mode (MODE 2) will be described with reference to FIG. 19 and FIG. 20.

FIG. 19 is a diagram illustrating an operation example in the first sound output mode (MODE 1). As shown in FIG. 19, for example, in the case where the CEC mode of the device control apparatus 800 is the first sound output mode (MODE 1), let us assume that data is input to the device control apparatus 800 from a video player 500 serving as an example of a first external device through the HDMI terminal 802. The input data includes video data and audio data. Since the first sound output mode (MODE 1) is compatible with the input switch interlock function as described above, in the first sound output mode (MODE 1), the signal input can be switched to the video player 500 even when the video player 500 is connected to any of the HDMI terminals 801, 802, and 803 of the device control apparatus 800.

In the first sound output mode (MODE 1), the CPU 821 can separate the audio data from the data input from the video player 500 via the HDMI terminal 802, and can cause the headphones 900 to output the audio data. The audio data is output as an audio from the radio communication section 818 in accordance with control performed by the CPU 821. In the case of wearing the headphones 900, the user can listen to the audio output from the headphones 900 in this manner. Note that whether the CPU 821 can separate the audio data from the input data may be decided based on the state of "System Audio Control".

Further, in the first sound output mode (MODE 1), the CPU 821 can separate the video data from the data input from the video player 500 via the HDMI terminal 802, and can cause the television receiver 200 to output the video data. The video data is output to the television receiver 200 via the HDMI terminal 804 in accordance with control performed by the CPU 821. Further, the video data input to the television receiver 200 via the HDMI terminal 201 is output as a video from the display panel 216 of the television receiver 200 in accordance with control performed by the CPU 231. The user can view the video output from the television receiver 200 in this manner.

Figure 20:
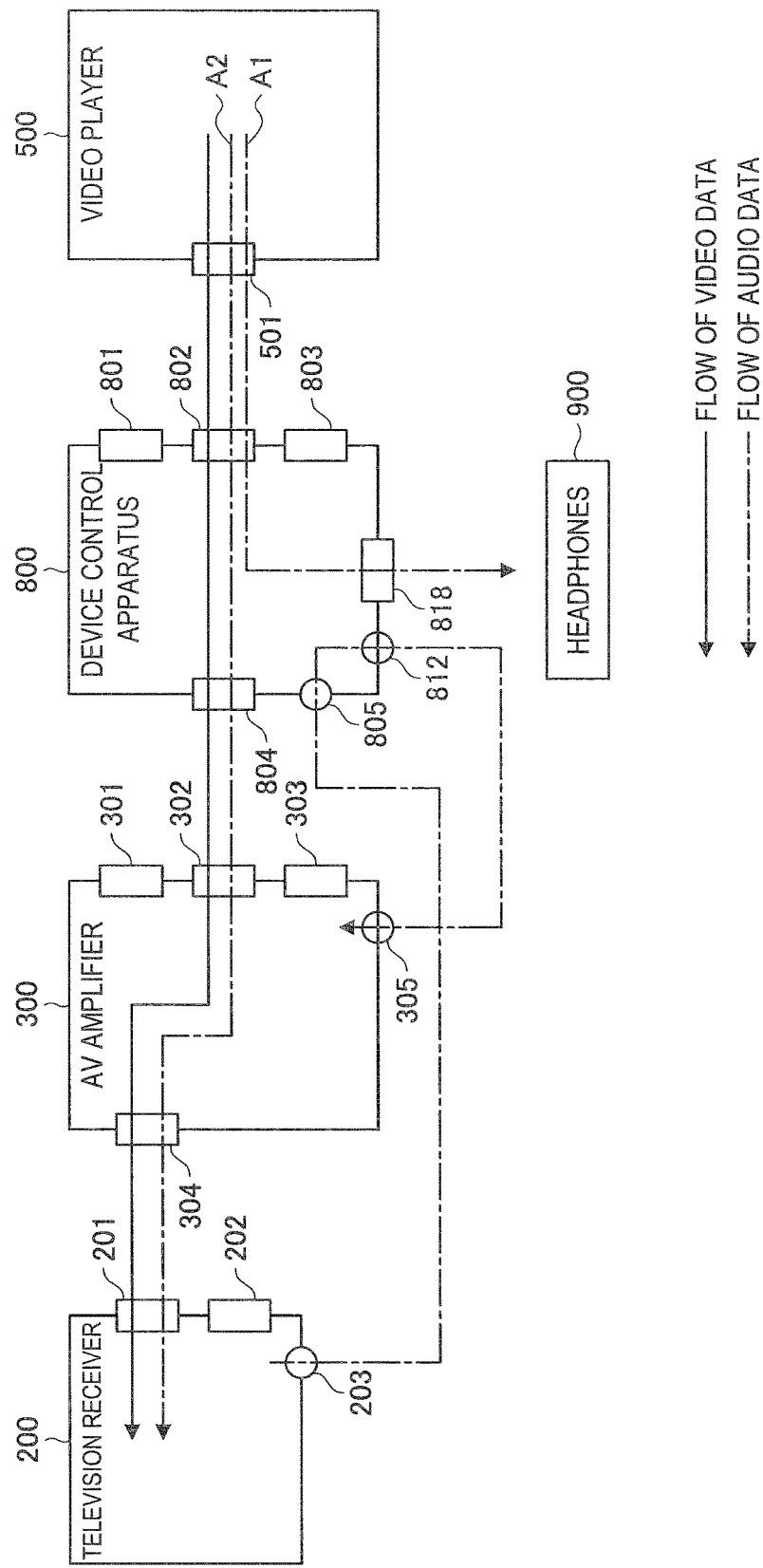
FIG. 20 is a diagram illustrating an operation example in the second sound output mode.

FIG. 20 is a diagram illustrating an operation example in the second sound output mode (MODE 2). As shown in FIG. 20, for example, in the case where the CEC mode of the device control apparatus 800 is the second sound output mode (MODE 2), let us assume that data is input to the device control apparatus 800 from the video player 500 serving as an example of a first external device through the HDMI terminal 802. The input data includes video data and audio data. In the same manner as the first sound output mode (MODE 1), since the second sound output mode (MODE 2) is also compatible with the input switch interlock function, in the second sound output mode (MODE 2), the signal input can be switched to the video player 500 even when the video player 500 is connected to any of the HDMI terminals 801, 802, and 803 of the device control apparatus 800.

However, in the second sound output mode (MODE 2), the CPU 821 cannot control exclusively the sound output from the television receiver 200 and the sound output from the headphones 900, by using "System Audio Control". Accordingly, in the second sound output mode (MODE 2), in accordance with the power state of the device control apparatus 800 (when the power of the device control apparatus 800 is OFF), the CPU 821 performs control such that the input data is transferred via the HDMI terminal 804 to the television receiver 200 serving as an example of a second external device through the AV amplifier 300 ("flow of video data" shown in FIG. 20). Further, in accordance with the power state of the device control apparatus 800 (when the power of the device control apparatus 800 is ON), the CPU 821 can switch EDID for the video player 500, can separate the audio data from the data input from the video player 500, and can cause the headphones 900 to play back the audio data obtained by the separation ("flow of audio data" shown in FIG. 20). In the case where the user wears the headphones 900, the CPU 821 controls the power of the device control apparatus 800 and causes the device control apparatus 800 to output the separated audio data of the video player 500 to the headphones 900. In this way, the user can view the video output from the television receiver 200 while listening to the audio output from the headphones 900.

On the other hand, from a signal directly input to the television receiver 200 from the HDMI terminal 202 or the like, audio data may be separated in accordance with a control signal of the CPU 231, and the separated audio data may be output from the optical output terminal 203. Note that the separated audio data may be output from an analog output terminal (not shown), and may be input via the analog audio input terminal 811. Those signals are output as an audio from the radio communication section 818 in accordance with the control performed by the CPU 821. In the case of wearing the headphones 900, the user can listen to the audio input to the HDMI terminal 202 or the like in this manner.

From the television receiver 200, the audio data of the digital tuner 211 (built-in tuner) may be input via the optical input terminal 805, for example. The audio data may be input via the analog audio input terminal 811. Those signals are output as an audio from the radio communication section 818 in accordance with control performed by the CPU 821. In the case of wearing the headphones 900, the user can listen to the audio of the digital tuner 211 (built-in tuner) in this manner.

As described above with reference to FIG. 19 and FIG. 20, the second sound output mode (MODE 2) cannot control exclusively the sound output by the system audio control, but can control the sound output from the headphones 900 by controlling the sound transmission. Note that, for example, the operation section 824 of the device control apparatus 800 has a function of detecting a setting operation performed by the user in a first mode set state or a second mode set state. Further, the operation section 824 has a function of detecting a setting operation performed by the user in an OFF state. The function of detecting the setting operation is realized by the switch 8243 for switching modes shown in FIG. 5.

For example, the first mode set state represents a state in which the switch 8243 for switching modes is set to "MODE 1", and the second mode set state represents a state in which the switch 8243 for switching modes is set to "MODE 2". Further, for example, the OFF state represents a state in which the switch 8243 for switching modes is set to "OFF". The CPU 821 can decide the CEC mode (CEC-non-compatible mode, first sound output mode (MODE 1), or second sound output mode (MODE 2)) based on the setting operation.

Figure 21:
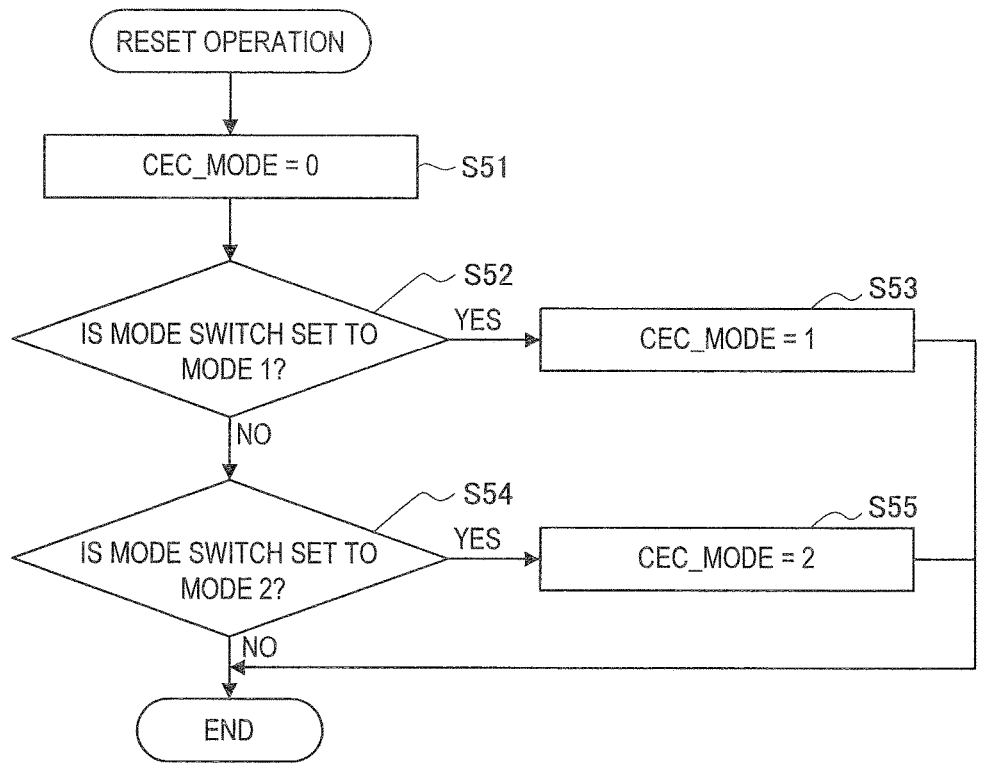
FIG. 21 is a flowchart showing an operation example (when Reset operation is performed) of the device control apparatus.

FIG. 21 is a flowchart showing an operation example (when a Reset operation is performed) of the device control apparatus 800. Here, let us assume that the device control apparatus 800 shown in FIG. 19 or the device control apparatus 800 shown in FIG. 20 is used. As shown in FIG. 21, for example, in the case where RESET is performed on the CPU 821, the CPU 821 sets a mode-setting variable CEC_MODE to "0" (Step S51). Note that the operation of Step S51 may be started in a case other than the case where RESET is performed on the CPU 821. Further, although "0" is set as the initial value here, the initial value may be a value other than "0".

Subsequently, the CPU 821 determines whether the switch 8243 for switching modes is set to "MODE 1" (Step S52). In the case of determining that the switch 8243 for switching modes is set to "MODE 1" ("YES" in Step S52), the CPU 821 sets CEC_MODE to "1" (Step S53), and terminates the operation. Note that, although "1" is set as a value representing "MODE 1" here, the value representing "MODE 1" may be a value other than "1". On the other hand, in the case of determining that the switch 8243 for switching modes is not set to "MODE 1" ("NO" in Step S52), the CPU 821 proceeds to Step S54.

Subsequently, the CPU 821 determines whether the switch 8243 for switching modes is set to "MODE 2" (Step S54). In the case of determining that the switch 8243 for switching modes is set to "MODE 2" ("YES" in Step S54), the CPU 821 sets CEC_MODE to "2" (Step S55), and terminates the operation. Note that, although "2" is set as a value representing "MODE 2" here, the value representing "MODE 2" may be a value other than "2". On the other hand, in the case of determining that the switch 8243 for switching modes is not set to "MODE 2" ("NO" in Step S54), the CPU 821 terminates the operation.

Figure 22:
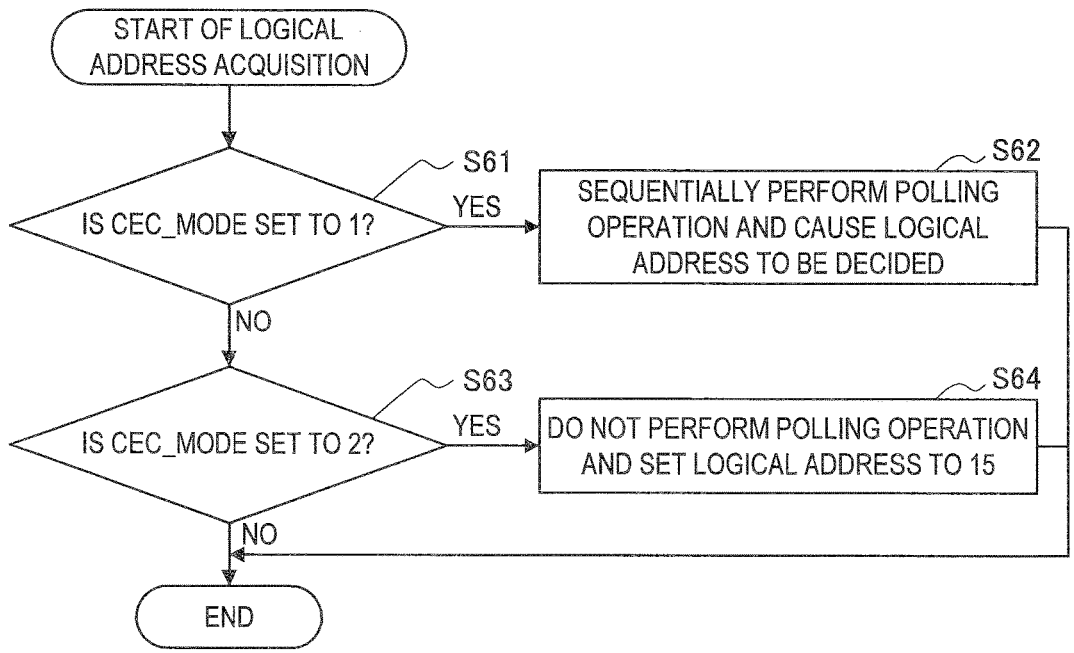
FIG. 22 is a flowchart showing an operation example (when logical address is acquired) of the device control apparatus.

FIG. 22 is a flowchart showing an operation example (when logical address is acquired) of the device control apparatus. Also, here, let us assume that the device control apparatus 800 shown in FIG. 19 or the device control apparatus 800 shown in FIG. 20 is used. As shown in FIG. 22, for example, in the case of acquiring a valid physical address, the CPU 821 starts acquiring a logical address. First, the CPU 821 determines whether the mode-setting variable CEC_MODE is set to "1" (Step S61).

In the case of determining that the mode-setting variable CEC_MODE is set to "1" ("YES" in Step S61), the CPU 821 sequentially performs polling operation and causes a logical address to be decided (Step S62), and terminates the operation. In more detail, in the polling operation, the CPU 821 detects an assignment state of the logical address {5} by performing polling, and in the case where the logical address {5} is not assigned, the CPU 821 may set the logical address {5}. For example, in the system shown in FIG. 19, since it is assumed that the logical address {5} is not assigned to a device other than the device control apparatus 800, the CPU 821 may set the logical address {5}.

Further, in the case where the logical address {5} has already been assigned, the CPU 821 may sequentially perform polling operation, and may cause the logical address {15} to be decided. In the system shown in FIG. 20, since it is assumed that the logical address {5} is assigned to the AV amplifier 300, the CPU 821 may sequentially perform polling operation, and may cause the logical address {15} to be decided. In the case of determining that the mode-setting variable CEC_MODE is not set to "1" ("NO" in Step S61), the CPU 821 proceeds to Step S63.

Subsequently, the CPU 821 determines whether the mode-setting variable CEC_MODE is set to "2" (Step S63). In the case of determining that the mode-setting variable CEC_MODE is set to "2" ("YES" in Step S63), the CPU 821 does not perform the polling operation and sets the logical address to {15} (Step S64), and terminates the operation.

As described above with reference to FIG. 21 and FIG. 22, in the case where the switch 8243 for switching modes is set to "MODE 1", the CPU 821 can place priority on the operation as the first sound output mode (MODE 1) using the logical address {5}. On the other hand, in the case where the switch 8243 for switching modes is set to "MODE 2", the CPU 821 can place priority on the operation as the second sound output mode (MODE 2) using the logical address {15}. After setting the logical addresses using the techniques shown in FIG. 21 and FIG. 22, the CPU 821 can operate using the set logical address. For example, in the case of setting the logical address {5}, the CPU 821 can operate as the first sound output mode (MODE 1) using the logical address {5}. Further, in the case of setting the logical address {15}, the CPU 821 can operate as the second sound output mode (MODE 2) using the logical address {15}.

As described above, according to an embodiment of the present disclosure, even when the logical address {5} has been acquired by the AV amplifier 300, for example, the device control apparatus 800 can be operated as the second sound output mode (MODE 2), and thus, the device control apparatus 800 can be effectively added to the AV system. Accordingly, the device control apparatus 800 can be effectively added to the AV system regardless of whether a prescribed logical address is acquired by another device.

Note that, although the CPU 821 sets the CEC mode based on the switch 8243 for switching modes in the example described above, the CEC mode may be set based on information other than the switch 8243 for switching modes. For example, the CPU 821 may set the CEC mode based on a mode selected by the user from a menu displayed on a screen. The screen may be displayed by the display section 825 of the device control apparatus 800, for example.

<2-5. Simultaneous Output of Sounds>

As described above, in the case where a CEC function called system audio control is introduced, destinations from which sounds are output are exclusive between one sound output apparatus and another sound output apparatus. To be more specific, in the case where a system audio mode is OFF, the output control section 8212 sets the headphones 900 to a mute state, and causes the television receiver 200 to output the sound. On the other hand, in the case where the system audio mode is ON, the output control section 8212 sets the television receiver 200 to the mute state, and causes the headphones 900 to output the sound.

However, there is a case where it is desired to output sounds simultaneously from one sound output apparatus and another sound output apparatus. For example, there is a demand to listen to sounds in different volumes and sound fields simultaneously by listening to a sound output from the television receiver 200 while listening to a sound output from the headphones 900. In order to satisfy such a demand, it has been necessary that the system audio mode be set to OFF and then an operation to cancel the mute state of the headphones 900 be performed. In the case where the system audio mode is ON, it has been difficult to satisfy such a demand. Accordingly, hereinafter, there will be described technology capable of outputting sounds simultaneously from one sound output apparatus and another sound output apparatus with an easy technique.

Note that, hereinafter, the description will be given with the headphones 900 given as an example of the one sound output apparatus and the television receiver 200 given as an example of the other sound output apparatus, but the types of the one sound output apparatus and the other sound output apparatus are not particularly limited. Further, there will be mainly described a case where the video player 500 is given as an example of an external device that inputs sound in the device control apparatus 800, and the sound is input from the video player 500 through the HDMI terminal 802 to the device control apparatus 800, but the type of the external device is also not particularly limited.

Further, the system audio mode is used as designation information for designating an output destination of the sound input from the video player 500 to the device control apparatus 800. That is, as an example of a state where the designation information designates the headphones 900, the state where the system audio mode is ON is used, and as an example of a state where the designation information designates the headphones 900, the state where the system audio mode is OFF is used. However, the designation information is not limited to the information indicating whether or not the system audio mode is ON.

In order to achieve the technology for outputting sounds simultaneously from the headphones 900 and the television receiver 200 with an easy technique, the information acquisition section 8210 acquires information indicating whether or not the system audio mode is ON, and, in the case where the system audio mode is OFF, the output control section 8212 may output sound from each of the headphones 900 and the television receiver 200. Here, in the case where the system audio mode is OFF, the sound may be output from each of the headphones 900 and the television receiver 200 with no condition, or the sound may be output from each of the headphones 900 and the television receiver 200 only in the case where a given condition is satisfied.

For example, the output destination mode may be set. For the output destination mode, a dual output mode or a single output mode may be set, the dual output mode being the mode in which the sounds are output from the headphones 900 and from the television receiver 200, the single output mode being the mode in which the sound is output from one of the headphones 900 and the television receiver 200. Hereinafter, TV+HP Audio Out is given as an example of the output destination mode, the state where TV+HP Audio Out is ON is given as an example of the dual output mode, and the state where TV+HP Audio Out is OFF is given as an example of the single output mode. HP may be used as an abbreviation of the headphones 900.

As shown in FIG. 5, the switching between ON and OFF of TV+HP Audio Out may be performed by a switching operation executed by the user between "ON" and "OFF" of the switch 8244 for setting output modes. The information acquisition section 8210 may acquire TV+HP Audio Out, and the output control section 8212 may control the sound output destination in accordance with the TV+HP Audio Out. In this way, whether to output the sounds from the headphones 900 and the television receiver 200 can be specified by the user operation.

FIG. 23 is a diagram showing an example of a relationship between each setting and a state of sound output. Examples of settings in FIG. 23 include information indicating whether the power of the device control apparatus 800 is ON, an output destination mode, and a CEC mode. In FIG. 23, "HP sound" indicates whether there is a sound output from the headphones 900. Further, "EDID" indicates EDID shown from the device control apparatus 800 to the video player 500, "EDID: performance of the latter device" may correspond to performance information indicating performance of the television receiver 200, and "EDID: performance of the self device" may correspond to performance information indicating performance of the device control apparatus 800. Note that, in the present specification, "EDID: performance of the latter device" mainly means that the EDID indicates the performance of the latter device, and may also mean third performance which satisfies the performance of the latter device and the performance of the self device.

In the case where the EDID is shown from the device control apparatus 800 to the video player 500, the video player 500 inputs the data corresponding to the shown EDID to the device control apparatus 800. For example, in the case where performance information indicating performance of the television receiver 200 is shown from the device control apparatus 800, the video player 500 inputs the sound corresponding to the performance of the television receiver 200 to the device control apparatus 800. On the other hand, in the case where performance information indicating performance of the device control apparatus 800 is shown from the device control apparatus 800, the video player 500 inputs the sound corresponding to the performance of the device control apparatus 800 to the device control apparatus 800.

In FIG. 23, "sound transmission" may correspond to information indicating whether the control apparatus 800 transmits the sound input by the video player 500 to the television receiver 200. In the case where the system audio mode is OFF and TV+HP Audio Out is ON, the output control section 8212 may cause the headphones 900 and the television receiver 200 to output the sound.

Referring to FIG. 23, a state C5 is shown in which the output control section 8212 operates in accordance with the first sound output mode (MODE 1), and, when the system audio mode is OFF and TV+HP Audio Out is ON, causes the headphones 900 and the television receiver 200 to output sound.

Further, referring to FIG. 23, a state C6 is shown in which the output control section 8212 operates in accordance with the second sound output mode (MODE 2) whose function is limited than the function of the first sound output mode (MODE 1), and, when TV+HP Audio Out is ON, causes the headphones 900 and the television receiver 200 to output sound.

Further, referring to the state C6, an example is shown in which no audio output mode is selected (in the case where the CEC mode is OFF) and when TV+HP Audio Out is ON, the output control section 8212 causes the headphones 900 and the television receiver 200 to output sound.

Note that, in FIG. 23, as the states of sound output performed by the device control apparatus 800, there are also shown a state C1, a state C2, a state C3, a state C4, a state C2#, and a state C6#, in addition to the state C5 and the state C6. Hereinafter, there will be described an operation example of an AV system in the case where a state of sound output performed by the device control apparatus 800 changes. Note that "Standby Pass Thru" used in the description below indicates that an input signal is passed thorough in a standby state. In more detail, in the case where Standby Pass Thru is ON, an HDMI signal that is input is transmitted to the latter device (television receiver 200) as it is by changing the EDID shown in the video player 500 in the standby state into the EDID indicating the performance of the latter device.

Figure 24:
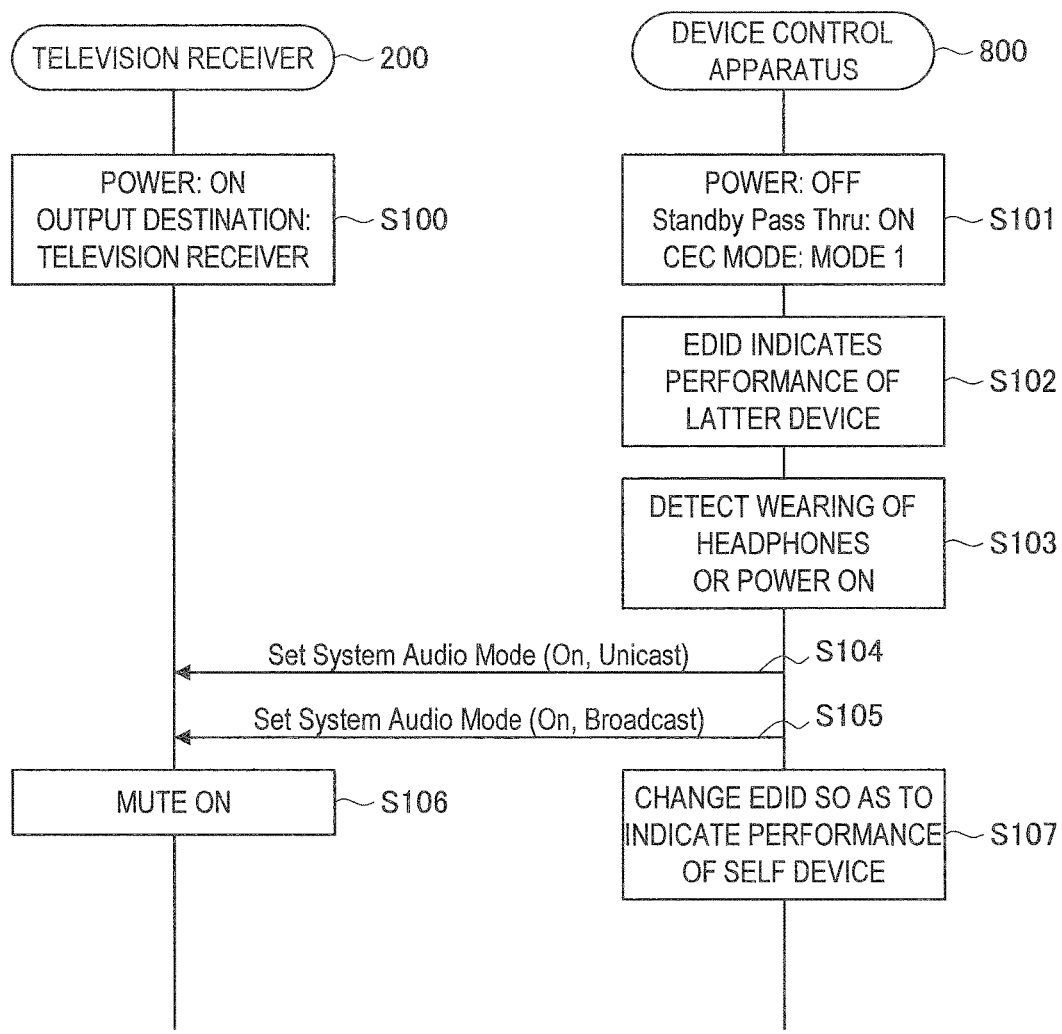
FIG. 24 is a diagram showing an operation example of the AV system in a case where the state of sound output changes from a state C2# to a state C1.

FIG. 24 is a diagram showing an operation example of the AV system in a case where a state of sound output changes from the state C2# to the state C1. In the example shown in FIG. 24, the case is shown where the power of the television receiver 200 is ON and the system audio mode is OFF (step S100). Further, in the example shown in FIG. 24, the case is shown where: the power of the device control apparatus 800 is OFF, Standby Pass Thru is ON, which indicates that an input signal in the standby state is passed through, and the CEC mode is MODE 1 (step S101); and the EDID indicates the performance of the latter device (television receiver 200) (step S102).

In the case where the wearing information detection section 8211 detects the wearing of the headphones 900 or the power state detection section 8213 detects that the power of the device control apparatus 800 is ON (step S103), the output control section 8212 transmits a message <Set System Audio Mode>[On] to the television receiver 200 in unicast (step S14). Further, in the case where Ack is sent back from the television receiver 200, for example, the output control section 8212 transmits a message <Set System Audio Mode>[On] in broadcast (step S105), and changes the EDID such that the EDID shown in the video player 500 indicates the performance of the self device (device control apparatus 800) (step S107).

In receiving the message, the CPU 231 of the television receiver 200 is set to the mute ON state (the sound amplification circuit 218 is set to the mute ON state) (step S106).

In the mute ON state, no audio is output from the speaker 219 of the television receiver 200.

Figure 25:
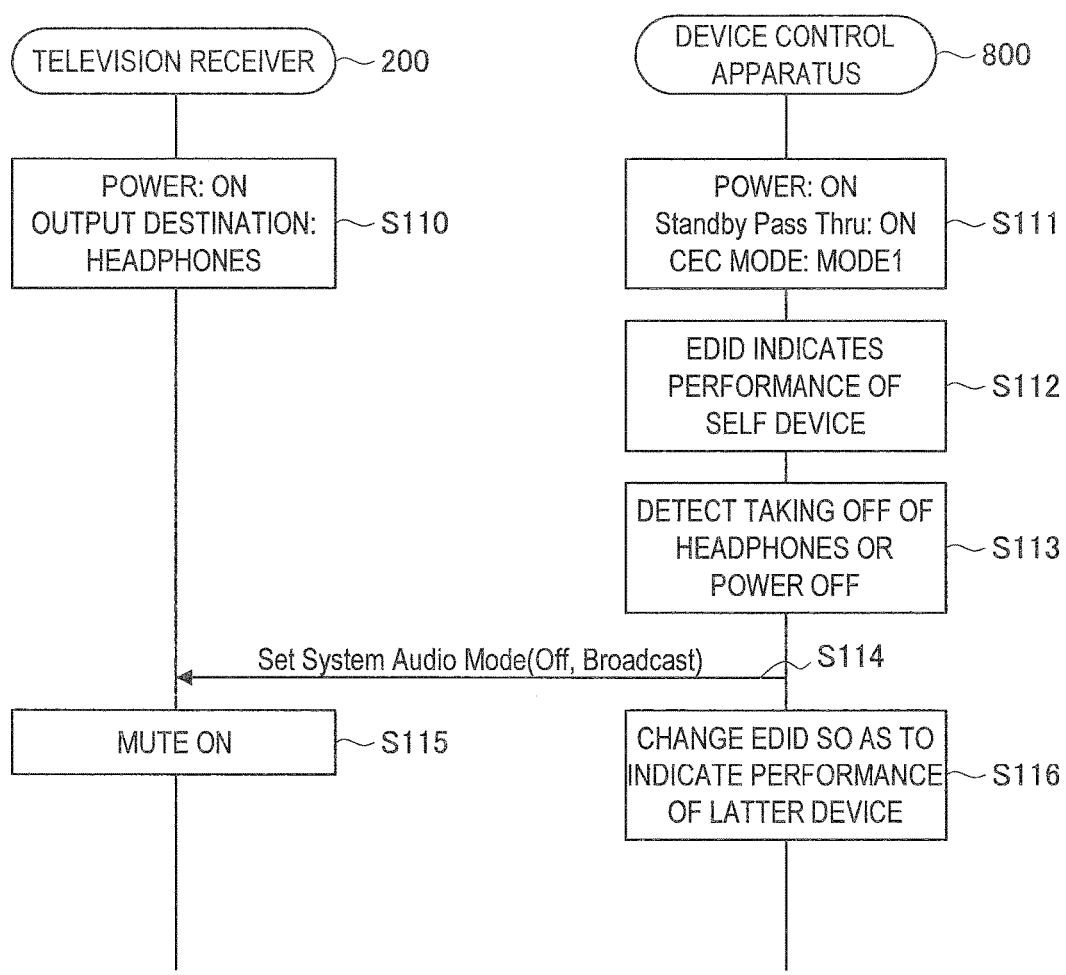
FIG. 25 is a diagram showing an operation example of the AV system in a case where the state of sound output changes from the state C1 to the state C2#.

FIG. 25 is a diagram showing an operation example of the AV system in a case where the state of sound output changes from the state C1 to the state C2#. In the example shown in FIG. 25, the case is shown where the power of the television receiver 200 is ON and the system audio mode is ON (step S110). Further, in the example shown in FIG. 25, the case is shown where: the power of the device control apparatus 800 is ON, Standby Pass Thru is ON, and the CEC mode is MODE 1 (step S111); and the EDID indicates the performance of the self device (device control apparatus 800) (step S112).

In the case where the wearing information detection section 8211 detects the taking off of the headphones 900 or the power state detection section 8213 detects that the power of the device control apparatus 800 is OFF (step S113), the output control section 8212 transmits a message <Set System Audio Mode>[Off] to the television receiver 200 in unicast (step S114), and changes the EDID such that the EDID shown in the video player 500 indicates the performance of the latter device (television receiver 200) (step S116).

In receiving the message, the CPU 231 of the television receiver 200 is set to a mute OFF state (the sound amplification circuit 218 is set to the mute OFF state) (step S115). In the mute OFF state, the audio is output from the speaker 219 of the television receiver 200.

Figure 26:
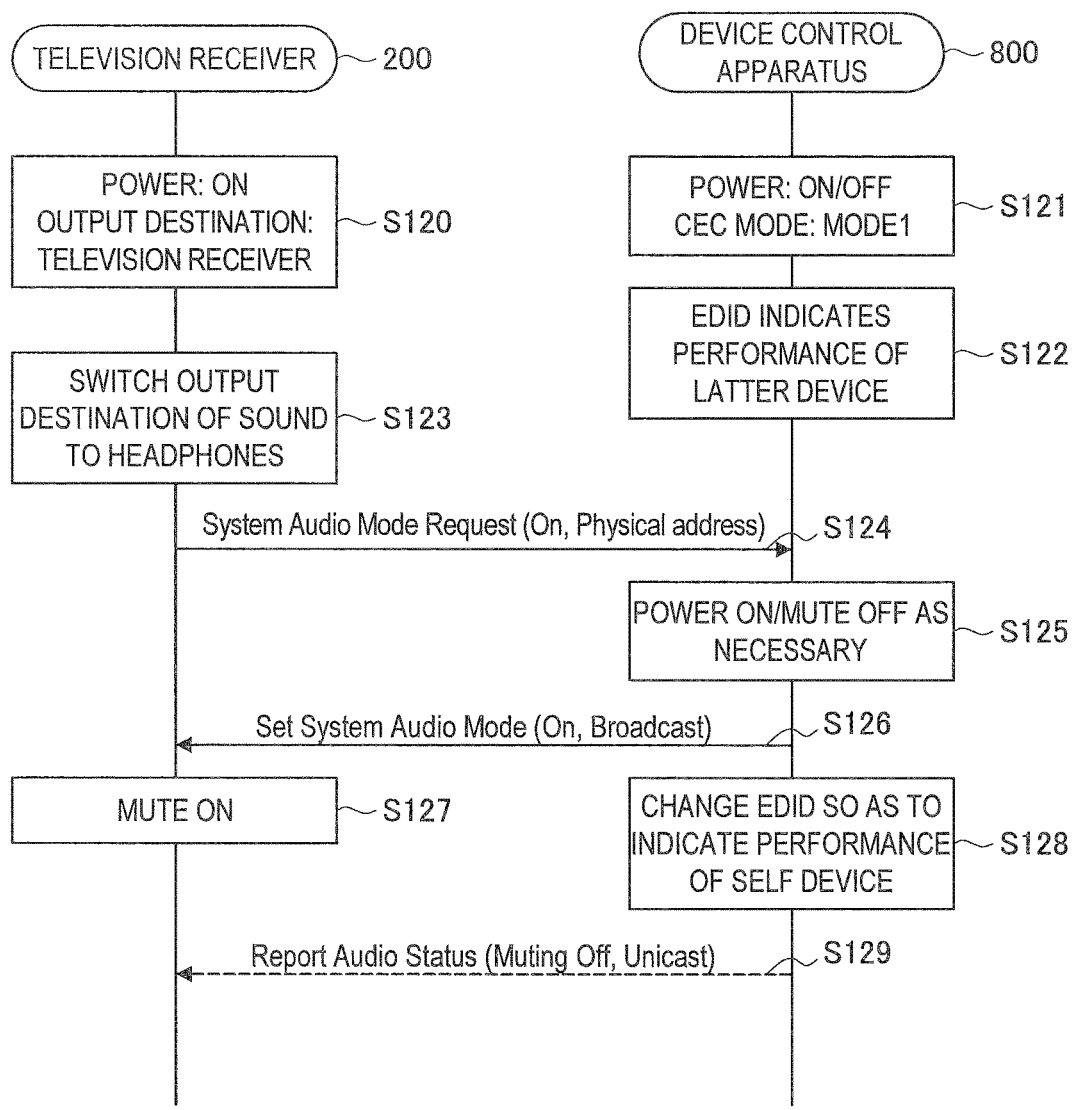
FIG. 26 is a diagram showing an operation example of the AV system in a case where the state of sound output changes from a state C2 to the state C1.

FIG. 26 is a diagram showing an operation example of the AV system in a case where the state of sound output changes from the state C2 to the state C1. In the example shown in FIG. 26, the case is shown where the power of the television receiver 200 is ON and the system audio mode is OFF (step S120). Further, in the example shown in FIG. 26, the case is shown where: the power of the device control apparatus 800 is ON or OFF, and the CEC mode is MODE 1 (step S121); and the EDID indicates the performance of the latter device (television receiver 200) (step S122).

In the case where the system audio mode is switched ON (step S123), the output control section 8212 transmits a message <System Audio Mode Request>[On, physical address] to the device control apparatus 800 (step S124). In the device control apparatus 800, when receiving the message, the output control section 8212 turns ON the power of device control apparatus 800 as necessary, and sets the radio communication section 818 to the mute OFF state (step S125). In the mute OFF state, the audio is output from the headphones 900.

Further, the output control section 8212 transmits a message <Set System Audio Mode>[On] in broadcast (step S126), and changes the EDID such that the EDID shown in the video player 500 indicates the performance of the self device (device control apparatus 800) (step S128).

In receiving the message, the CPU 231 of the television receiver 200 is set to the mute ON state (the sound amplification circuit 218 is set to the mute ON state) (step S127). In the mute ON state, no audio is output from the speaker 219 of the television receiver 200. After changing the EDID, the output control section 8212 transmits a message <Report Audio Status>[Muting Off] to the television receiver 200 in unicast (step S129).

Figure 27:
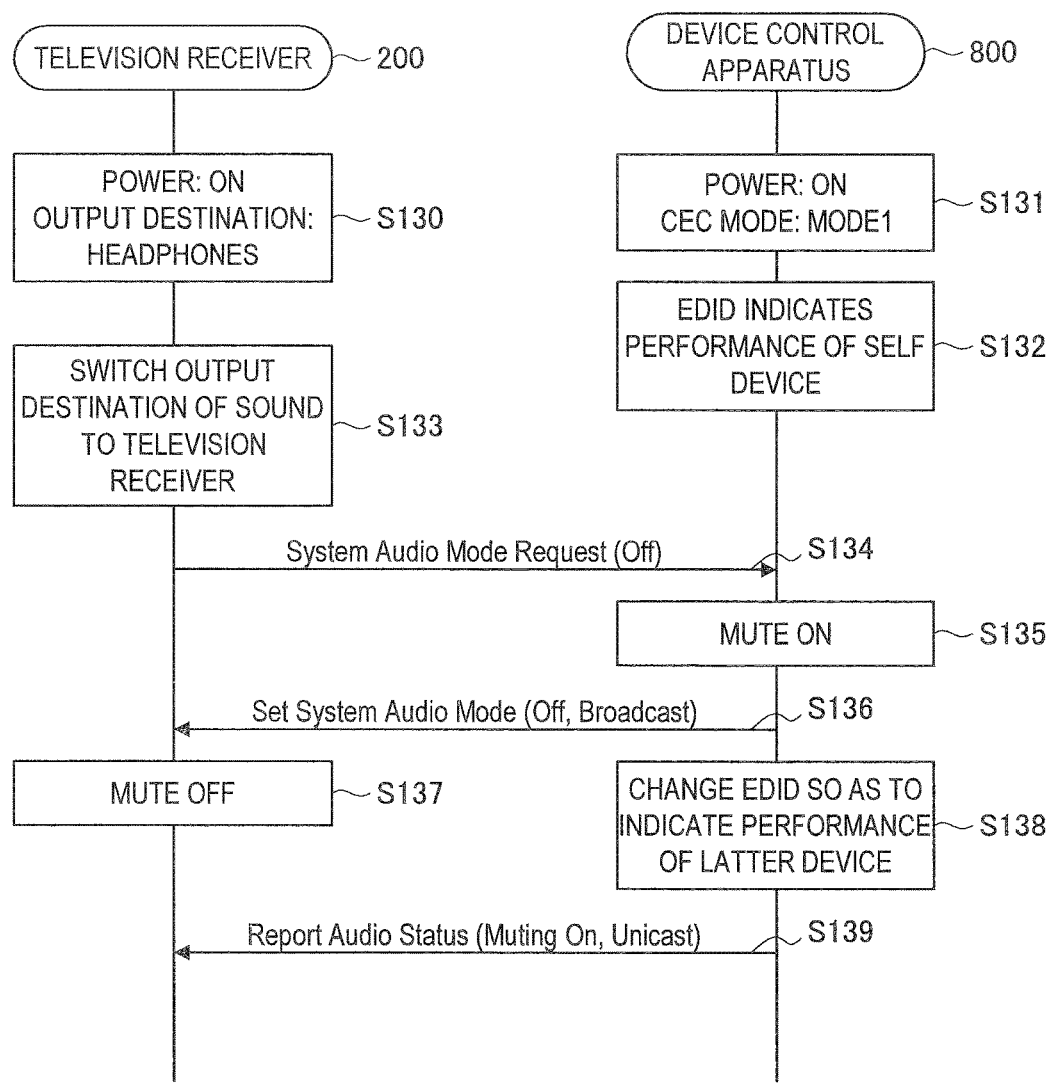
FIG. 27 is a diagram showing an operation example of the AV system in a case where the state of sound output changes from the state C1 to the state C2.

FIG. 27 is a diagram showing an operation example of the AV system in a case where the state of sound output changes from the state C1 to the state C2. In the example shown in FIG. 27, the case is shown where the power of the television receiver 200 is ON and the system audio mode is ON (step S130). Further, in the example shown in FIG. 27, the case is shown where: the power of the device control apparatus 800 is ON, and the CEC mode is MODE 1 (step S131); and the EDID indicates the performance of the self device (device control apparatus 800) (step S132).

In the case where the system audio mode is switched OFF (step S133), the output control section 8212 transmits a message <System Audio Mode Request>[Off] to the device control apparatus 800 (step S134). In the device control apparatus 800, when receiving the message, the output control section 8212 sets the radio communication section 818 to the mute ON state (step S135). In the mute ON state, no audio is output from the headphones 900.

Further, the output control section 8212 transmits a message <Set System Audio Mode>[Off] in broadcast (step S136), and changes the EDID such that the EDID shown in the video player 500 indicates the performance of the latter device (television receiver 200) (step S138).

In receiving the message, the CPU 231 of the television receiver 200 is set to the mute OFF state (the sound amplification circuit 218 is set to the mute OFF state) (step S137). In the mute OFF state, the audio is output from the speaker 219 of the television receiver 200. After changing the EDID, the output control section 8212 transmits a message <Report Audio Status>[Muting On] to the television receiver 200 in unicast (step S139).

Note that, although FIG. 27 shows an operation example of the AV system in the case where the state of sound output changes from the state C1 to the state C2, the output control section 8212 may also automatically switch, in the case where the system audio mode is switched OFF, the sound output destination from the headphones 900 to the headphones 900 and the television receiver 200. At that time, in the case where the switching is automatically performed from the sound output destination including the headphones 900 to the sound output destinations including the headphones 900 and the television receiver, the output control section 8212 may switch ON TV+HP Audio Out. In this way, it is expected that convenience of users is increased.

Figure 28:
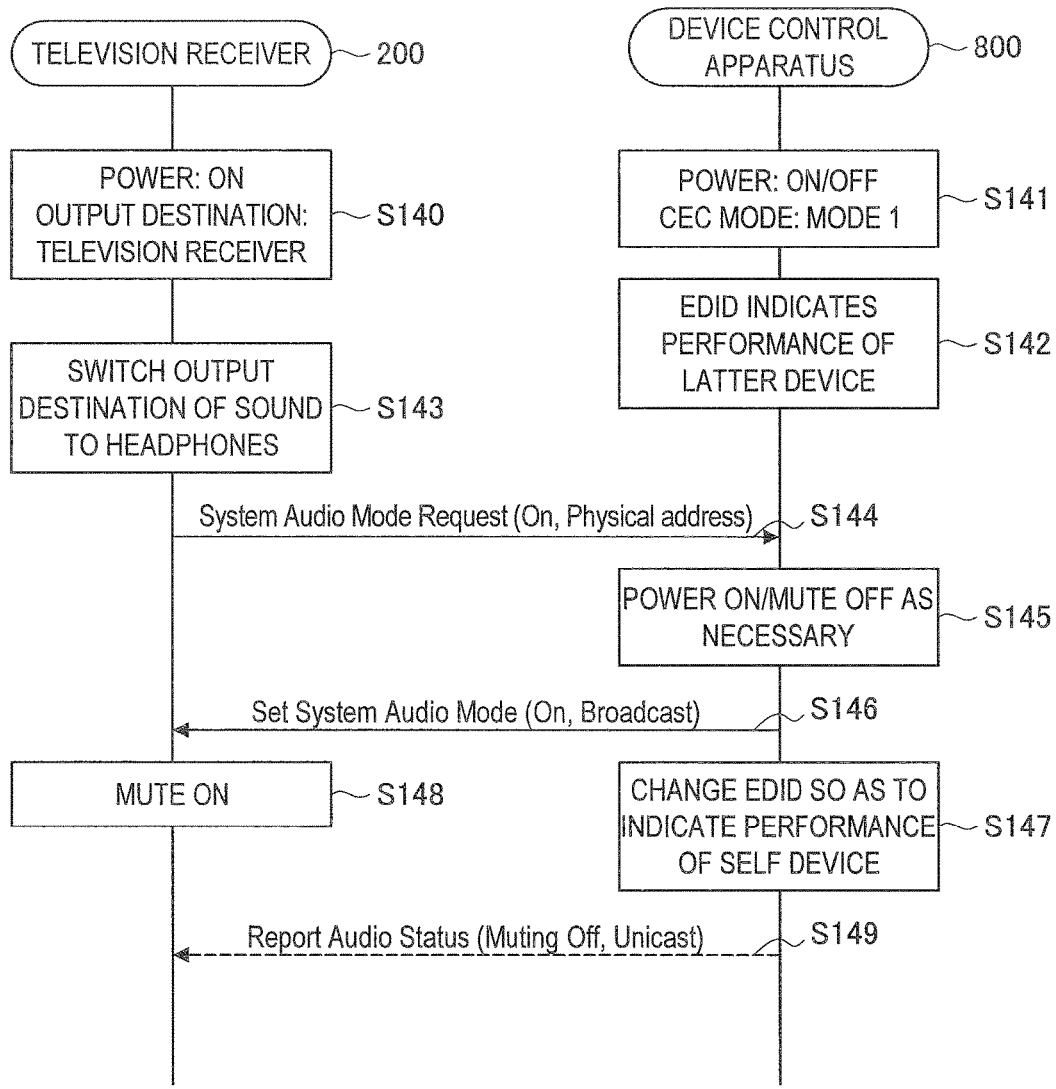
FIG. 28 is a diagram showing an operation example of the AV system in a case where the state of sound output changes from a state C5 to a state C4.

FIG. 28 is a diagram showing an operation example of the AV system in a case where the state of sound output changes from the state C5 to the state C4. In the example shown in FIG. 28, the case is shown where the power of the television receiver 200 is ON and the system audio mode is OFF (step S140). Further, in the example shown in FIG. 28, the case is shown where: the power of the device control apparatus 800 is ON or OFF, and the CEC mode is MODE 1 (step S141); and the EDID indicates the performance of the latter device (television receiver 200) (step S142).

In the case where the system audio mode is switched ON (step S143), the output control section 8212 transmits a message <System Audio Mode Request>[On, physical address] to the device control apparatus 800 (step S144). In the device control apparatus 800, when receiving the message, the output control section 8212 turns ON the power of the device control apparatus 800 as necessary, and sets the radio communication section 818 to the mute OFF state (step S145). In the mute OFF state, the audio is output from the headphones 900. Further, the output control section 8212 transmits a message <Set System Audio Mode>[On] in broadcast (step S146), and changes the EDID such that the EDID shown in the video player 500 indicates the performance of the self device (device control apparatus 800) (step S147).

In receiving the message, the CPU 231 of the television receiver 200 is set to the mute ON state (the sound amplification circuit 218 is set to the mute ON state) (step S148). In the mute ON state, no audio is output from the speaker

219 of the television receiver 200. After changing the EDID, the output control section 8212 transmits a message <Report Audio Status>[Muting Off] to the television receiver 200 in unicast (step S149).

Figure 29:
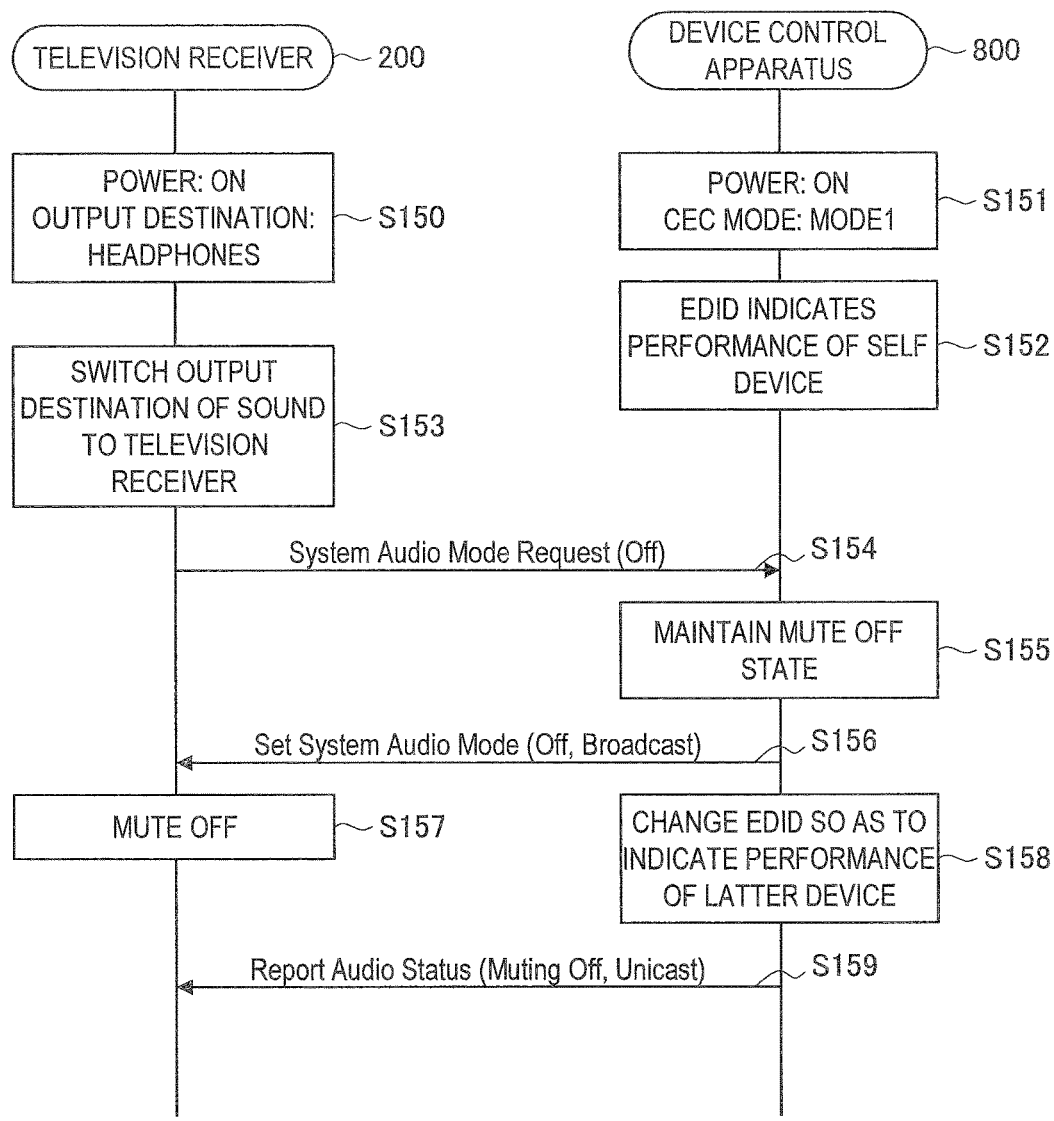
FIG. 29 is a diagram showing an operation example of the AV system in a case where the state of sound output changes from the state C4 to the state C5.

FIG. 29 is a diagram showing an operation example of the AV system in a case where the state of sound output changes from the state C4 to the state C5. In the example shown in FIG. 29, the case is shown where the power of the television receiver 200 is ON and the system audio mode is ON (step S150). Further, in the example shown in FIG. 29, the case is shown where: the power of the device control apparatus 800 is ON, and the CEC mode is MODE 1 (step S151); and the EDID indicates the performance of the self device (device control apparatus 800) (step S152).

In the case where the system audio mode is switched OFF (step S153), the output control section 8212 transmits a message <System Audio Mode Request>[Off] to the device control apparatus 800 (step S154). In the device control apparatus 800, when receiving the message, the output control section 8212 maintains the mute OFF state of the radio communication section 818 (step S155). In the mute OFF state, the audio keeps being output from the headphones 900. Further, the output control section 8212 transmits a message <Set System Audio Mode>[Off] in broadcast (step S156), and changes the EDID such that the EDID shown in the video player 500 indicates the performance of the latter device (television receiver 200) (step S158).

In receiving the message, the CPU 231 of the television receiver 200 is set to the mute OFF state (the sound amplification circuit 218 is set to the mute OFF state) (step S157). In the mute OFF state, the audio is output from the speaker 219 of the television receiver 200. After changing the EDID, the output control section 8212 transmits a message <Report Audio Status>[Muting Off] to the television receiver 200 in unicast (step S159).

FIG. 30 is a diagram showing an operation example of the AV system in a case where the state of sound output changes from the state C6# to the state C3. In the example shown in FIG. 30, the case is shown where the power of the television receiver 200 is ON (step S160). Further, in the example shown in FIG. 30, the case is shown where: the power of the device control apparatus 800 is OFF, and the CEC mode is MODE 2 or OFF (step S161); and the EDID indicates the performance of the latter device (television receiver 200) (step S162).

In the case where the wearing information detection section 8211 detects the wearing of the headphones 900 or the power state detection section 8213 detects that the power of the device control apparatus 800 is ON (step S163), the output control section 8212 changes the EDID such that the EDID shown in the video player 500 indicates the performance of the self device (device control apparatus 800) (step S164). After the EDID has been changed such that the EDID indicates the performance of the self device (device control apparatus 800), an HDMI signal is no longer transmitted to the television receiver 200, and no sound is output from the television receiver 200 (step S165).

Figure 31:
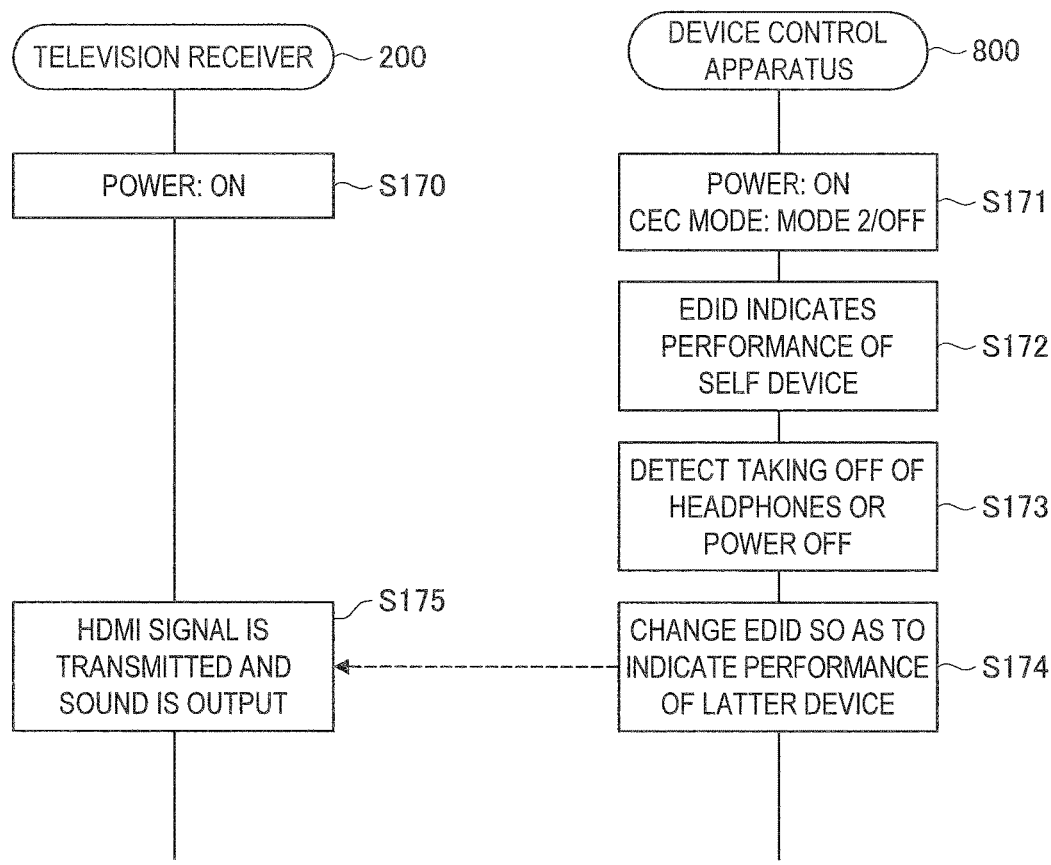
FIG. 31 is a diagram showing an operation example of the AV system in a case where the state of sound output changes from the state C3 to the state C6#.

FIG. 31 is a diagram showing an operation example of the AV system in a case where the state of sound output changes from the state C3 to the state C6#. In the example shown in FIG. 31, the case is shown where the power of the television receiver 200 is ON (step S170). Further, in the example shown in FIG. 31, the case is shown where: the power of the device control apparatus 800 is ON, and the CEC mode is MODE 2 or OFF (step S171); and the EDID indicates the performance of the self device (device control apparatus 800) (step S172).

In the case where the wearing information detection section 8211 detects the taking off of the headphones 900 or the power state detection section 8213 detects that the power of the device control apparatus 800 is OFF (step S173), the output control section 8212 changes the EDID such that the EDID shown in the video player 500 indicates the performance of the latter device (television receiver 200) (step S174). After the EDID has been changed such that the EDID indicates the performance of the latter device (television receiver 200), an HDMI signal is transmitted to the television receiver 200, and the sound is output from the television receiver 200 (step S175).

Figure 32:
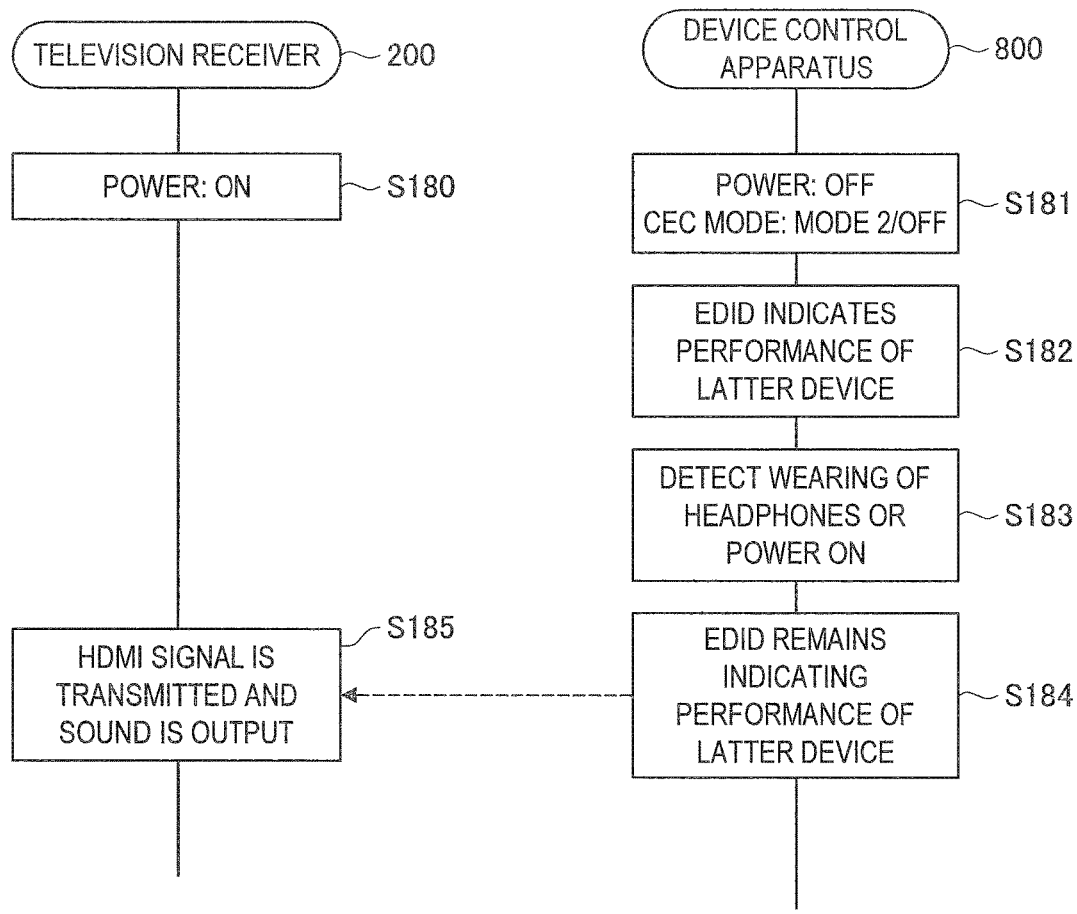
FIG. 32 is a diagram showing an operation example of the AV system in a case where the state of sound output changes from the state C6# to a state C6.

FIG. 32 is a diagram showing an operation example of the AV system in a case where the state of sound output changes from the state C6# to the state C6. In the example shown in FIG. 32, the case is shown where the power of the television receiver 200 is ON (step S180). Further, in the example shown in FIG. 32, the case is shown where: the power of the device control apparatus 800 is OFF, and the CEC mode is MODE 2 or OFF (step S181); and the EDID indicates the performance of the latter device (television receiver 200) (step S182).

In the case where the wearing information detection section 8211 detects the wearing of the headphones 900 or the power state detection section 8213 detects that the power of the device control apparatus 800 is ON (step S183), the output control section 8212 maintains the EDID shown in the video player 500 to indicate the performance of the latter device (television receiver 200) (step S184). Also after that, an HDMI signal is transmitted from the device control apparatus 800 to the television receiver 200, and the sound output from the television receiver 200 is continued (step S185).

Figure 33:
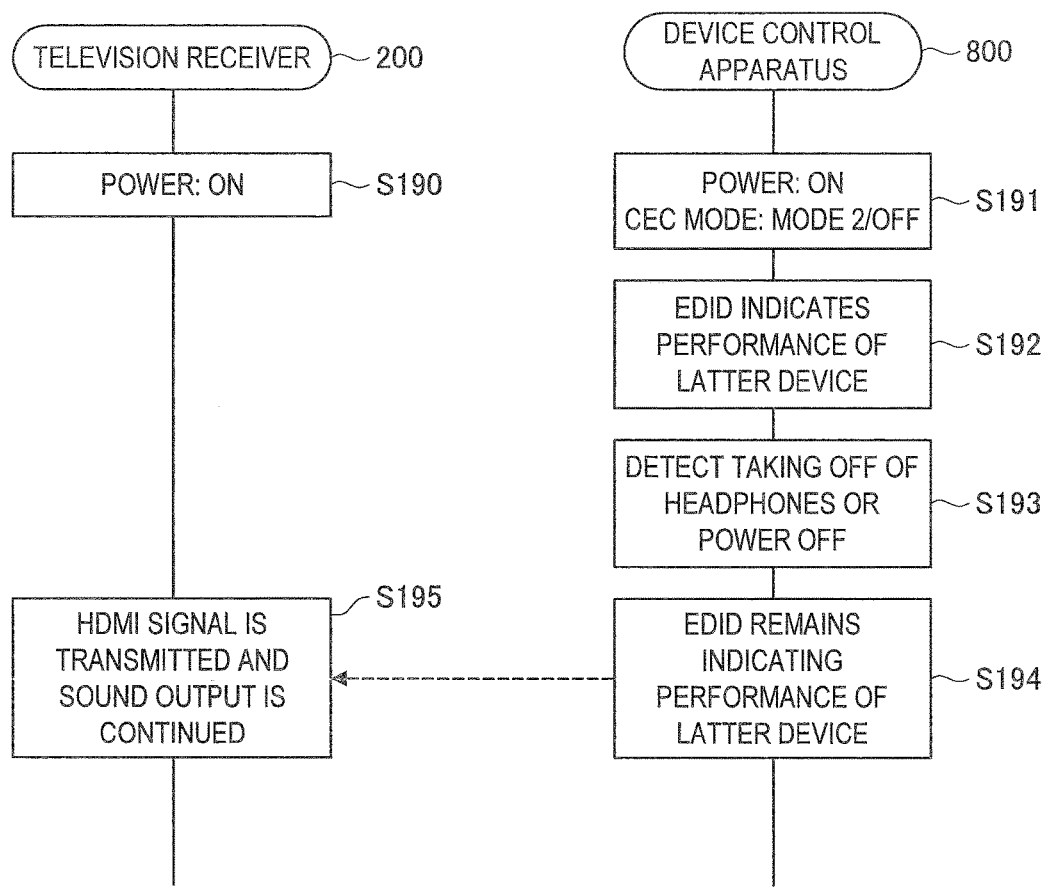
FIG. 33 is a diagram showing an operation example of the AV system in a case where the state of sound output changes from the state C6 to the state C6#.

FIG. 33 is a diagram showing an operation example of the AV system in a case where the state of sound output changes from the state C6 to the state C6#. In the example shown in FIG. 33, the case is shown where the power of the television receiver 200 is ON (step S190). Further, in the example shown in FIG. 33, the case is shown where: the power of the device control apparatus 800 is ON, and the CEC mode is MODE 2 or OFF (step S191); and the EDID indicates the performance of the latter device (television receiver 200) (step S192).

In the case where the wearing information detection section 8211 detects the taking off of the headphones 900 or the power state detection section 8213 detects that the power of the device control apparatus 800 is OFF (step S193), the output control section 8212 maintains the EDID shown in the video player 500 to indicate the performance of the latter device (television receiver 200) (step S194). Also after that, an HDMI signal is transmitted from the device control apparatus 800 to the television receiver 200, and the sound output from the television receiver 200 is continued (step S195).

Figure 34:
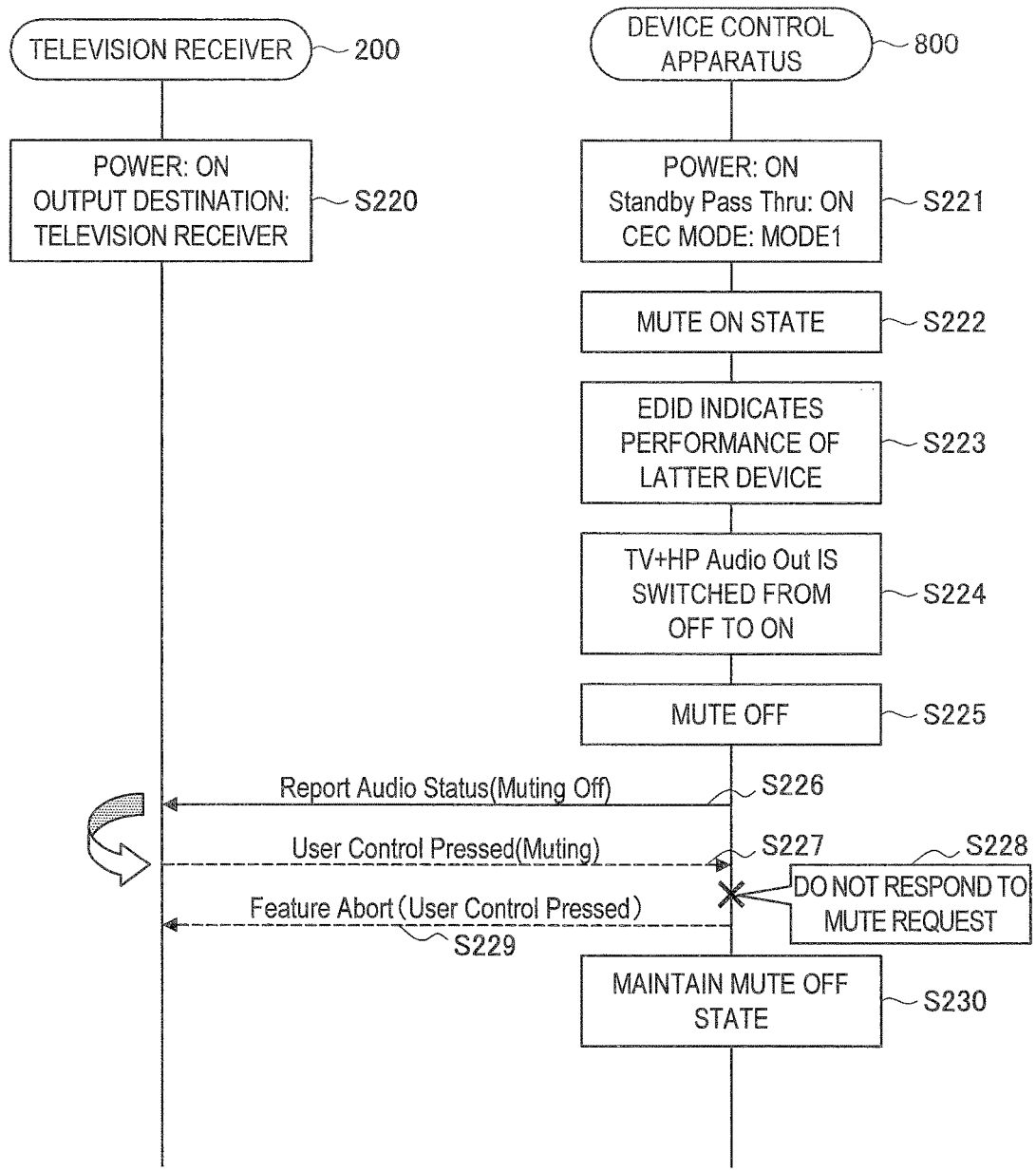
FIG. 34 is a diagram showing an operation example of the AV system in a case where the state of sound output changes from the state C2 to the state C5.

FIG. 34 is a diagram showing an operation example of the AV system in a case where the state of sound output changes from the state C2 to the state C5. In the example shown in FIG. 34, the case is shown where the power of the television receiver 200 is ON and the system audio mode is OFF (step S220). Further, in the example shown in FIG. 34, the case is shown where the power of the device control apparatus 800 is ON, Standby Pass Thru is ON, and the CEC mode is MODE 1 (step S221). Further, in the example shown in FIG. 34, the case is shown where the radio communication section 818 is in the mute ON state (step S222), and the EDID indicates the performance of the latter device (television receiver 200) (step S223).

When TV+HP Audio Out is switched from OFF to ON (step S224), the output control section 8212 controls the radio communication section 818 to be in the mute OFF state (step S225), and transmits a message <Report Audio Status> [Muting Off] to the television receiver 200 (step S226). In this way, the switching is performed from the output destination of the sound including the television receiver 200 to the output destinations including the headphones 900 and the television receiver 200.

After that, although a message <User Control Pressed> [Muting] may be transmitted from the television receiver 200 (step S227), the output control section 8212 does not respond to the mute request (step S228) and continues the sound output from the headphones 900. Note that the message <User Control Pressed>[Muting] is an example of the mute request, and, hereinafter, the message may be simply referred to as "UCP".

Further, the output control section 8212 may send back a message <Feature Abort> [User Control Pressed] in response to the UCP (step S229). The message <Feature Abort> [User Control Pressed] is an example of the message indicating that the mute request cannot be accepted (the output of sound from the headphones 900 is continued). If the radio communication section 818 remains in the mute OFF state (step S230), the audio keeps being output from the headphones 900.

Figure 35:
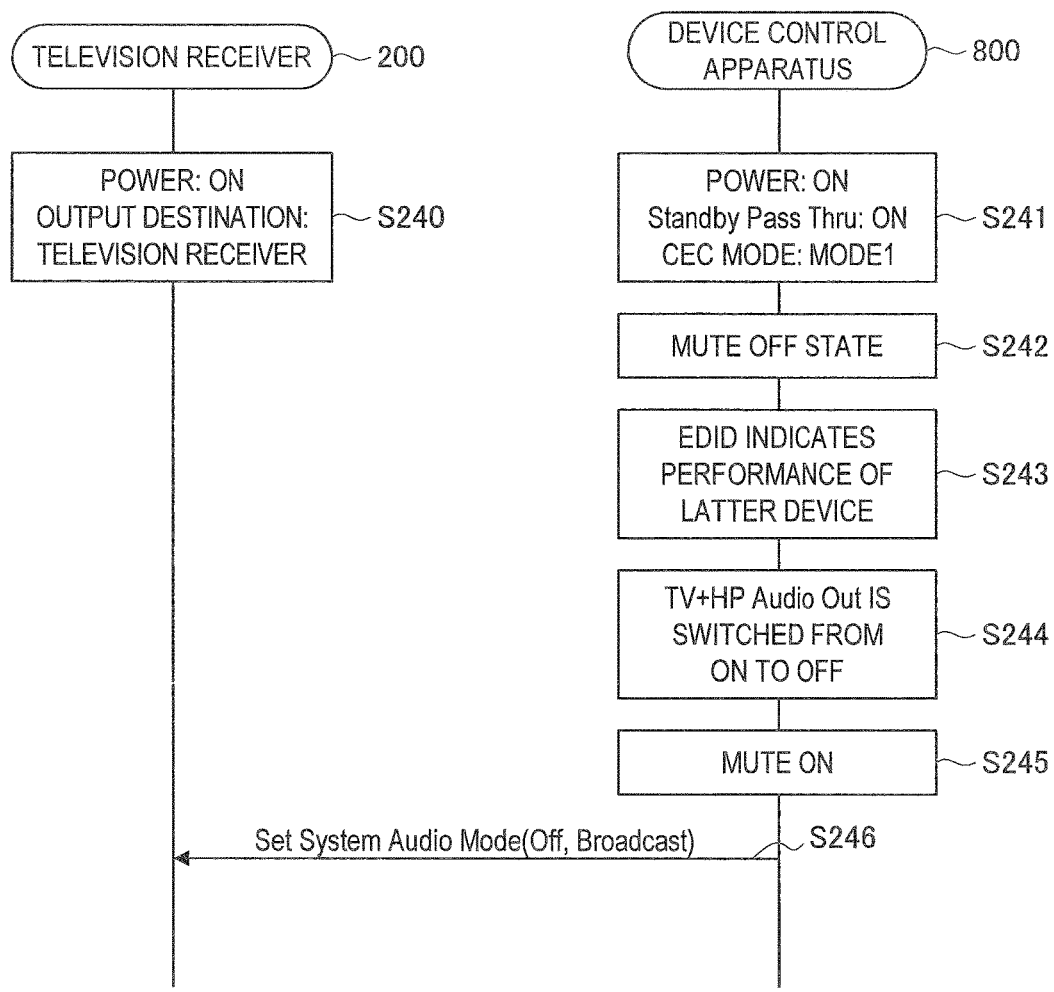
FIG. 35 is a diagram showing an operation example of the AV system in a case where the state of sound output changes from the state C5 to the state C2.

FIG. 35 is a diagram showing an operation example of the AV system in a case where the state of sound output changes from the state C5 to the state C2. In the example shown in FIG. 35, the case is shown where the power of the television receiver 200 is ON and the system audio mode is OFF (step S240). Further, in the example shown in FIG. 35, the case is shown where the power of the device control apparatus 800 is ON, Standby Pass Thru is ON, and the CEC mode is MODE 1 (step S241). Further, in the example shown in FIG. 35, the case is shown where the radio communication section 818 is in the mute OFF state (step S242), and the EDID indicates the performance of the latter device (television receiver 200) (step S243).

When TV+HP Audio Out is switched from ON to OFF (step S244), the output control section 8212 controls the radio communication section 818 to be in the mute ON state (step S245), and transmits a message <Set System Audio Mode>[Off] in broadcast (step S246). If the radio communication section 818 is switched to the mute ON state, the audio is no longer output from the headphones 900. The audio keeps being output from the television receiver 200.

Figure 36:
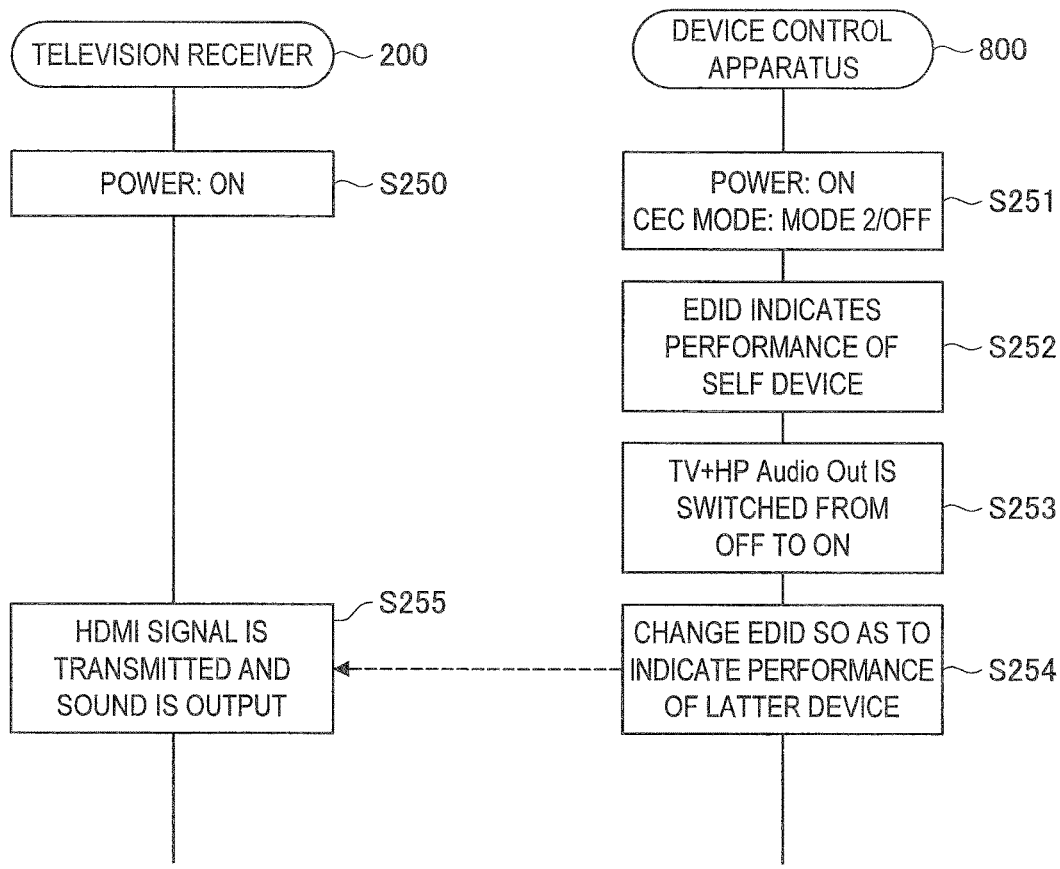
FIG. 36 is a diagram showing an operation example of the AV system in a case where the state of sound output changes from the state C3 to the state C6.

FIG. 36 is a diagram showing an operation example of the AV system in a case where the state of sound output changes from the state C3 to the state C6. In the example shown in FIG. 36, the case is shown where the power of the television receiver 200 is ON (step S250). Further, in the example shown in FIG. 36, the case is shown where: the power of the device control apparatus 800 is ON, and the CEC mode is MODE 2 or OFF (step S251); and the EDID indicates the performance of the self device (device control apparatus 800) (step S252).

When TV+HP Audio Out is switched from OFF to ON (step S253), the output control section 8212 changes the EDID such that the EDID shown in the video player 500 indicates the performance of the latter device (television receiver 200) (step S254). After the EDID has been changed such that the EDID indicates the performance of the latter device (television receiver 200), an HDMI signal is transmitted to the television receiver 200, and the sound is output from the television receiver 200 (step S255). In this way, the switching is performed from the output destination of the sound including the headphones 900 to the output destinations including the headphones 900 and the television receiver 200.

Figure 37:
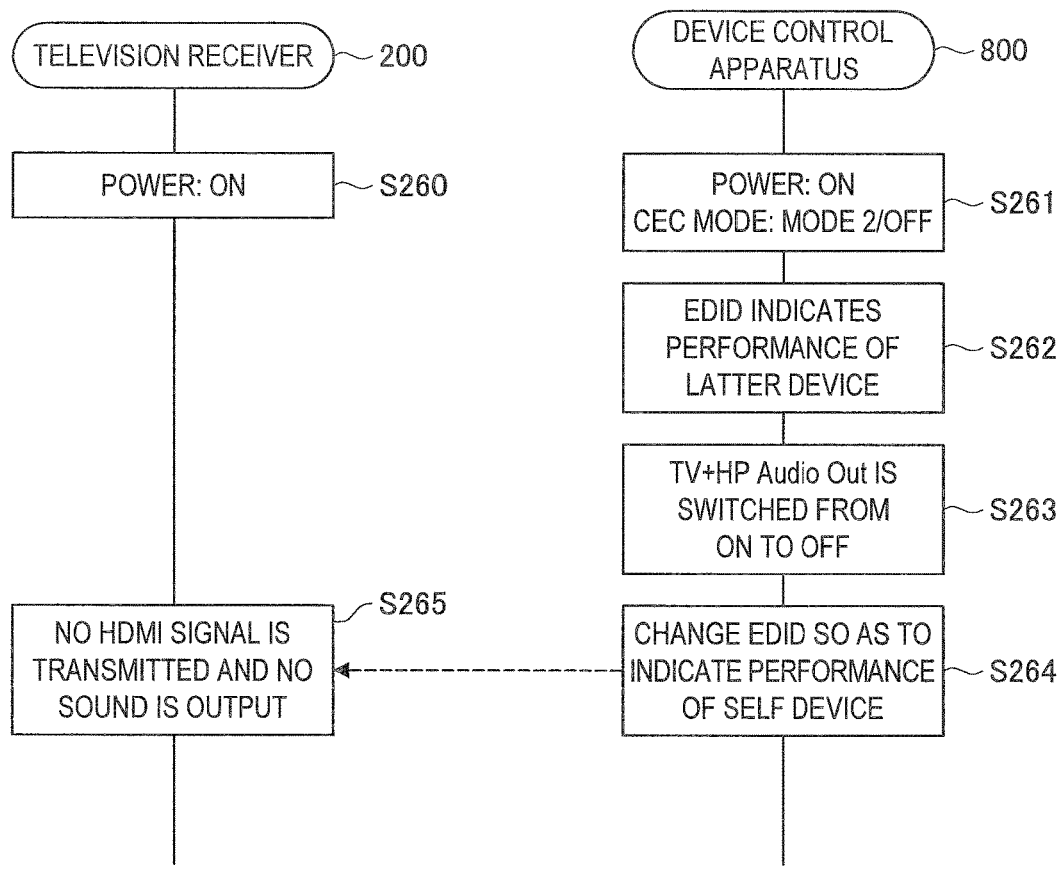
FIG. 37 is a diagram showing an operation example of the AV system in a case where the state of sound output changes from the state C6 to the state C3.

FIG. 37 is a diagram showing an operation example of the AV system in a case where the state of sound output changes from the state C6 to the state C3. In the example shown in FIG. 37, the case is shown where the power of the television receiver 200 is ON (step S260). Further, in the example shown in FIG. 37, the case is shown where: the power of the device control apparatus 800 is ON, and the CEC mode is MODE 2 or OFF (step S261); and the EDID indicates the performance of the latter device (television receiver 200) (step S262).

When TV+HP Audio Out is switched from ON to OFF (step S263), the output control section 8212 changes the EDID such that the EDID shown in the video player 500 indicates the performance of the self device (device control apparatus 800) (step S264). After the EDID has been changed such that the EDID indicates the performance of the self device (device control apparatus 800), an HDMI signal is no longer transmitted to the television receiver 200, and no sound is output from the television receiver 200 (step S265). In this way, the switching is performed from the output destinations of the sound including the television receiver 200 and the headphones 900 to the output destination including the headphones 900.

Figure 38:
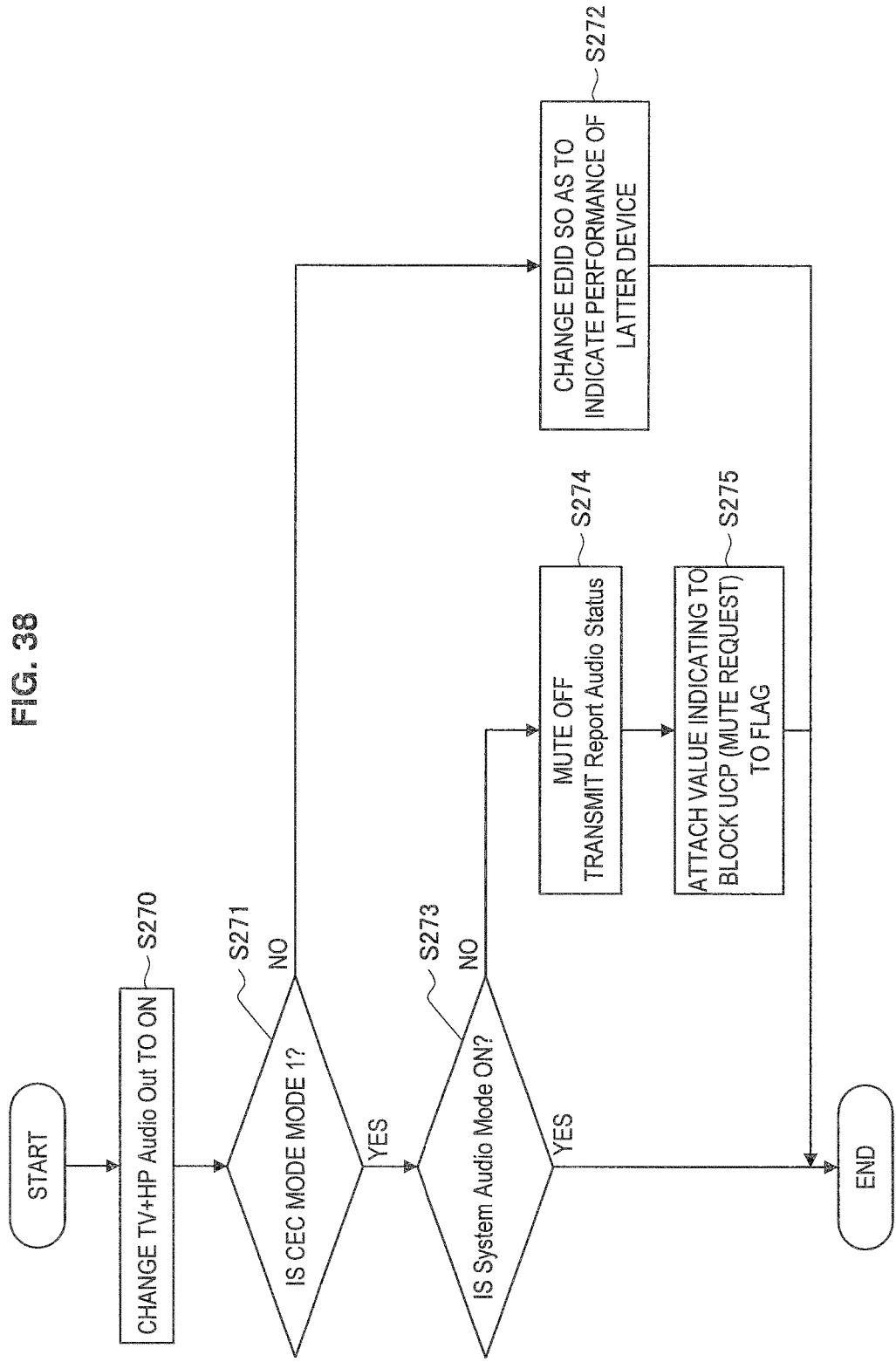

FIG. 38 is a diagram showing an operation example of the device control apparatus 800 in a case where TV+HP Audio Out is switched from OFF to ON. As shown in FIG. 38, when TV+HP Audio Out is changed from OFF to ON (step S270), the output control section 8212 changes, in the case where the CEC mode is not the first sound output mode (MODE 1) ("NO" in step S271), the EDID such that the EDID shown in the video player 500 indicates the performance of the latter device (television receiver 200) (step S272). The case where the CEC mode is not the first sound output mode (MODE 1) includes the case where the CEC mode is the second sound output mode (MODE 2) or is OFF.

On the other hand, in the case where the CEC mode is the first sound output mode (MODE 1) ("YES" in step S271) and the system audio mode is OFF ("NO" in step S273), the output control section 8212 controls the radio communication section 818 to be in the mute OFF state and transmits a message <Report Audio Status>[Muting Off] to the television receiver 200 in unicast (step S274). Further, the output control section 8212 attaches a value indicating to block the UCP (mute request) to a flag (step S275).

Figure 39:
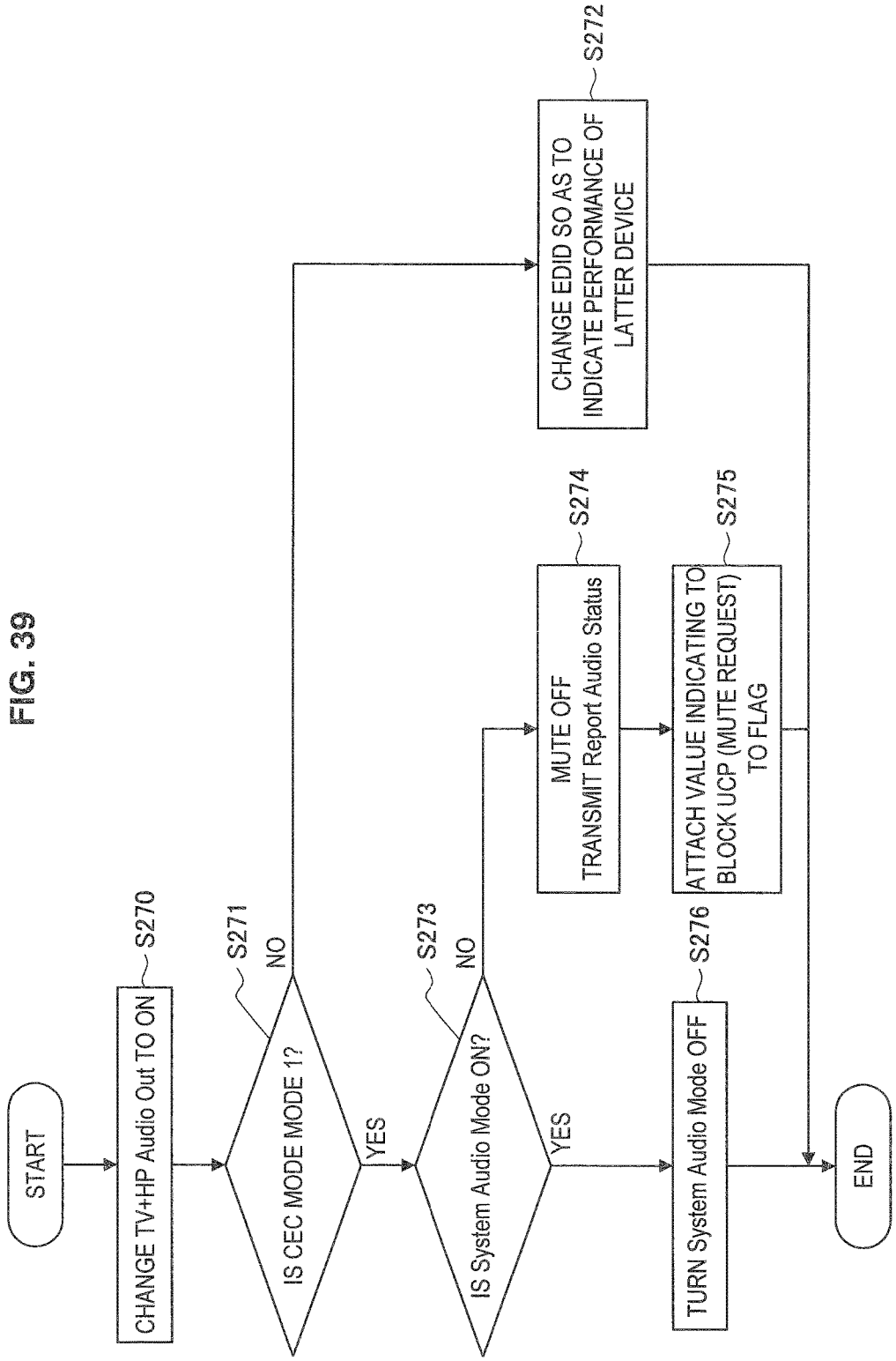

FIG. 39 is a diagram showing a modified operation example of the device control apparatus 800 in a case where TV+HP Audio Out is switched from OFF to ON. As shown in FIG. 39, the same operation as steps S270 to S275 shown in FIG. 38 may be performed. However, in the case where the CEC mode is the first sound output mode (MODE 1) ("YES" in step S271) and the system audio mode is ON ("YES" in step S273), the output control section 8212 may automatically turn ON the system audio mode (step S276). This is because, when a user switches ON TV+HP Audio Out, it is assumed that the user wants to listen to the sound output from the headphones 900 and the sound output from the television receiver 200.

Figure 40:
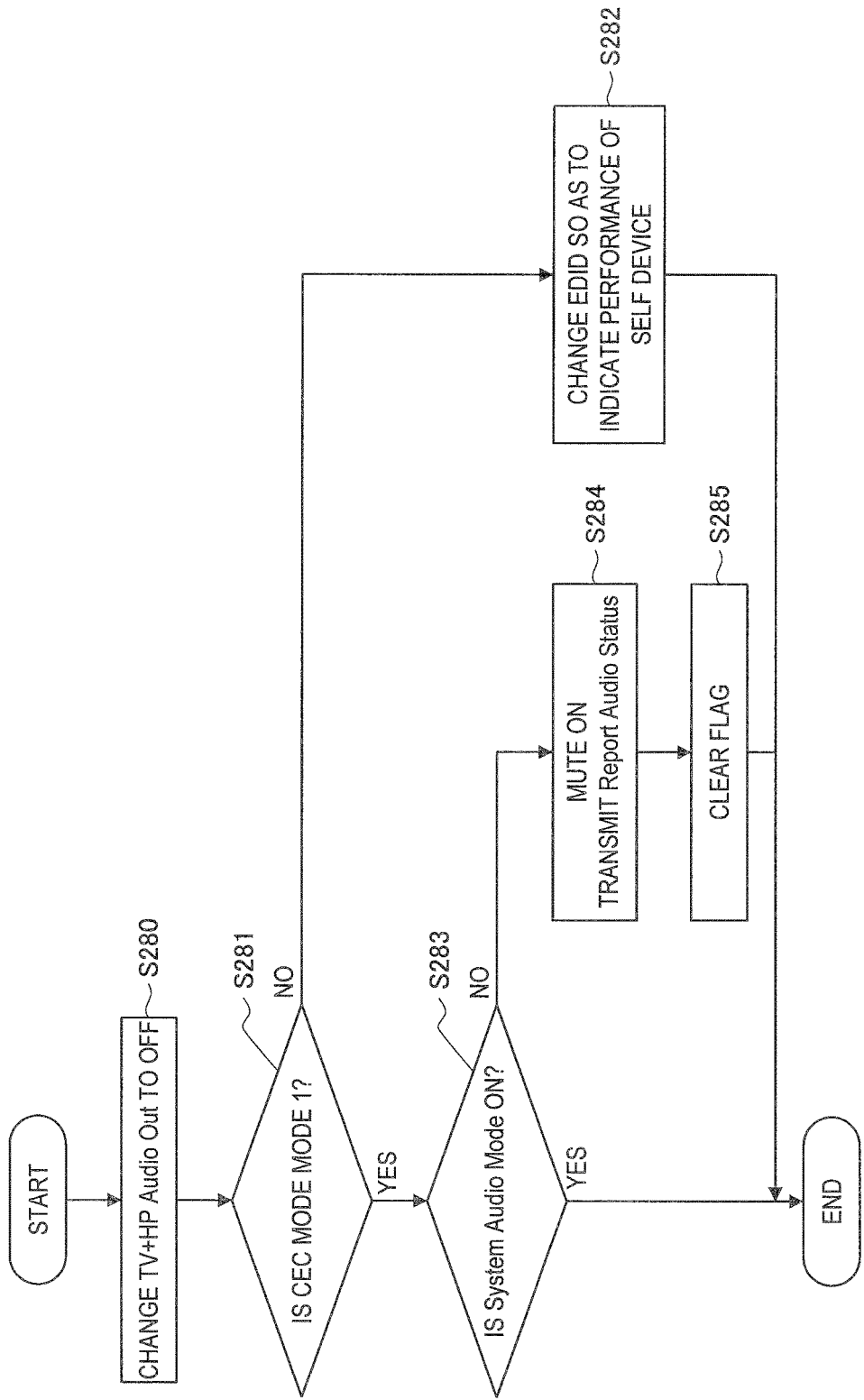
FIG. 40 is a diagram showing an operation example of the device control apparatus in a case where TV+HP Audio Out is switched from ON to OFF.

FIG. 40 is a diagram showing an operation example of the device control apparatus 800 in a case where TV+HP Audio Out is switched from ON to OFF. As shown in FIG. 40, when TV+HP Audio Out is changed from ON to OFF (step S280), the output control section 8212 changes, in the case where the CEC mode is not the first sound output mode (MODE 1) ("NO" in step S281), the EDID such that the EDID shown in the video player 500 indicates the self device (device control apparatus 800) (step S282). The case where the CEC mode is not the first sound output mode (MODE 1) includes the case where the CEC mode is the second sound output mode (MODE 2) or is OFF.

On the other hand, in the case where the CEC mode is the first sound output mode (MODE 1) ("YES" in step S281) and the system audio mode is OFF ("NO" in step S283), the output control section 8212 controls the radio communication section 818 to be in the mute ON state and transmits a message <Report Audio Status>[Muting On] to the television receiver 200 in unicast (step S284). Further, the output control section 8212 clears a flag (step S285).

Figure 41:
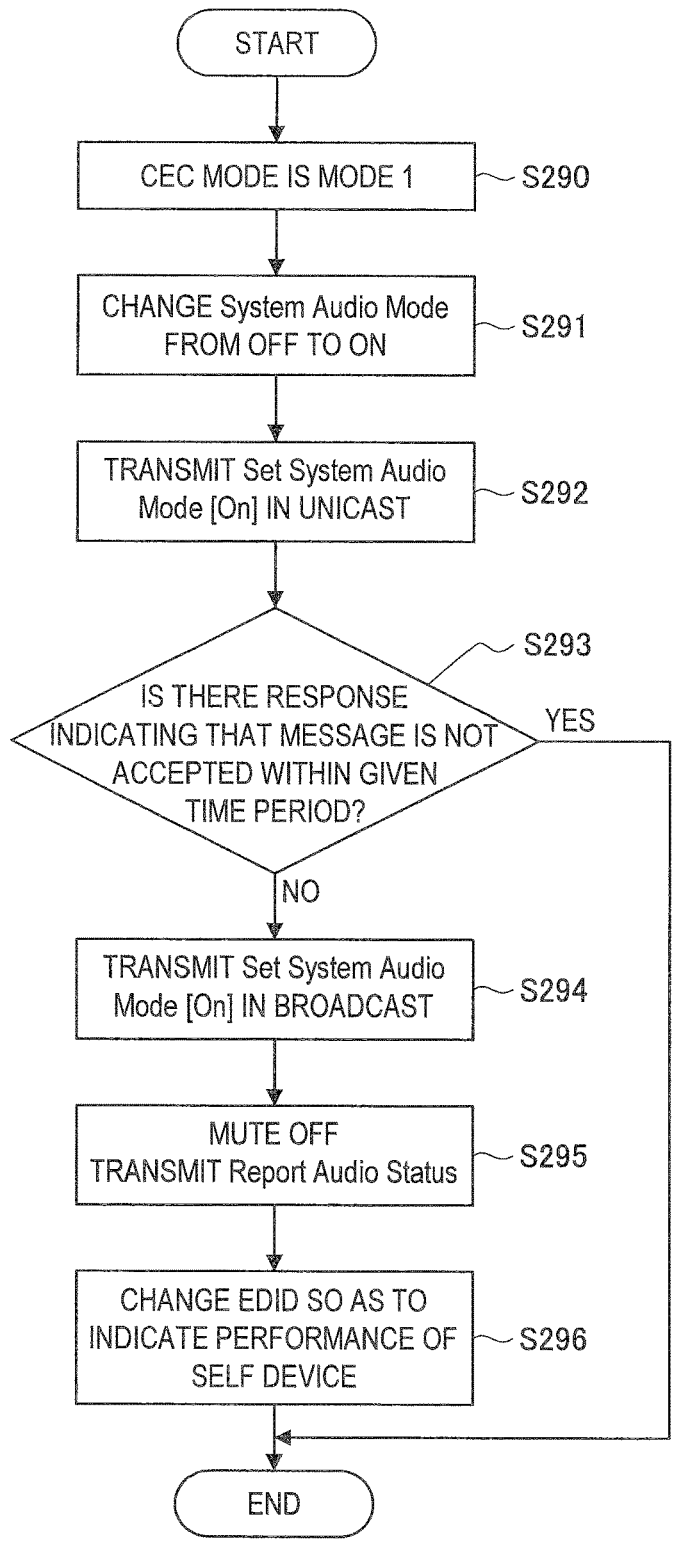

FIG. 41 is a diagram showing an operation example of the device control apparatus 800 in a case where a system audio mode is switched from OFF to ON. In the example shown in FIG. 41, the CEC mode is set to the first sound output mode (MODE 1) (step S290). When the system audio mode is changed from OFF to ON (step S291), the output control section 8212 transmits a message <Set System Audio Mode>[On] to the television receiver 200 in unicast (step S292). In the case where no response indicating that the message is not accepted is sent back from the television receiver 200 within a given time period ("NO" in step S293), the output control section 8212 transmits the message <Set System Audio Mode>[On] in broadcast (step S294). Example of the response indicating that the message is not accepted includes a message <Feature Abort>.

Further, the output control section 8212 controls the radio communication section 818 to be in the mute OFF state, and transmits a message <Report Audio Status>[Muting Off] to the television receiver 200 in unicast (step S295). Further, the output control section 8212 changes the EDID such that the EDID shown in the video player 500 indicates the self device (device control apparatus 800) (step S296). After the EDID has been changed such that the EDID indicates the performance of the self device (device control apparatus 800), an HDMI signal is no longer transmitted to the television receiver 200, and no sound is output from the television receiver 200.

FIG. 42 is a diagram showing an operation example of the device control apparatus 800 in a case where the system audio mode is switched from ON to OFF. In the example shown in FIG. 42, the CEC mode is set to the first sound output mode (MODE 1) (step S300). When the system audio mode is changed from ON to OFF (step S301), the output control section 8212 transmits a message <Set System Audio Mode>[Off] in broadcast (step S302).

In the case where TV+HP Audio Out is OFF ("NO" in step S303), the output control section 8212 controls the radio communication section 818 to be in the mute ON state and transmits a message <Report Audio Status>[Muting On] to the television receiver 200 in unicast (step S304). Subsequently, the output control section 8212 clears a flag (step S305), and changes the EDID such that the EDID shown in the video player 500 indicates the performance of the latter device (television receiver 200) (step S306).

After the radio communication section 818 has been controlled to be in the mute ON state, no sound is output from the headphones 900. On the other hand, after the EDID has been changed such that the EDID shown in the video player 500 indicates the performance of the latter device (television receiver 200), an HDMI signal is transmitted to the television receiver 200, and the sound is output from the television receiver 200. Accordingly, the user can listen to the sound output from the television receiver 200.

In the case where TV+HP Audio Out is ON ("YES" in step S303), the output control section 8212 attaches a value indicating to block the UCP (mute request) to a flag (step S307), and changes the EDID such that the EDID shown in the video player 500 indicates the performance of the latter device (television receiver 200) (step S308).

After the EDID has been changed such that the EDID indicates the performance of the latter device (television receiver 200), an HDMI signal is transmitted to the television receiver 200, and the sound is output from the television receiver 200. Further, if the mute OFF state of the radio communication section 818 is continued, the sound output from the headphones 900 is also continued. Accordingly, the user can listen to the sound output from the television receiver 200 and the sound output from the headphones 900.

FIG. 43 is a diagram showing an operation example of command monitoring processing performed by the device control apparatus 800. As shown in FIG. 43, when a UCP (mute request) is input from the television receiver 200 to the device control apparatus 800 ("YES" in step S310), the output control section 8212 determines whether a value indicating to block the UCP (mute request) is attached to a flag (step S311).

In the case where the value indicating to block the UCP (mute request) is attached to the flag ("YES" in step S311), the output control section 8212 controls the radio communication section 818 to be in the mute ON state, and transmits a message <Report Audio Status>[Muting On] to the television receiver 200 in unicast (step S312). On the other hand, in the case where the value indicating to block the UCP (mute request) is not attached to the flag ("NO" in step S311), the output control section 8212 sends back a message <Feature Abort> [User Control Pressed] in response to the UCP (step S313).

«3. Conclusion»

As described above, according to an embodiment of the present disclosure, there is provided the device control apparatus 800 including the information acquisition section 8210 configured to acquire information indicating whether the system audio mode is ON, and a output control section 8212 configured to cause the headphones 900 and the television receiver 200 to output sounds in the case where the system audio mode is OFF. According to such a configuration, the demand to listen to sounds in different volumes and sound fields simultaneously can be satisfied with an easy technique, by listening to the sound output from the television receiver 200 while listening to the sound output from headphones 900.

It should be understood by those skilled in the art that various modifications, combinations, sub-combinations and alterations may occur depending on design requirements and other factors insofar as they are within the scope of the appended claims or the equivalents thereof.

Further, respective steps included in the operation of the AV system of the present specification are not necessarily processed in chronological order in accordance with the flowcharts. For example, the respective steps included in the operation of the AV system may be processed in different order from the flowcharts, or may be processed in a parallel manner.

Further, it is also possible to create a computer program for causing hardware such as a CPU, ROM, and RAM, which are built in the device control apparatus 800, to exhibit the same functions as those of respective structures of the device control apparatus 800 described above. Further, there is also provided a storage medium having the computer program stored therein.

Further, the effects described in the present specification are merely illustrative or exemplified effects, and are not limitative. That is, with or in the place of the above effects, there may be achieved the effects described in this specification and/or other effects that are clear to those skilled in the art based on the description of this specification.

Additionally, the present technology may also be configured as below.

(1) A device control apparatus including:
an information acquisition section configured to acquire designation information for designating an output destination of a sound input from an external device; and
an output control section configured to, in a case where the designation information designates, out of one sound output apparatus and another sound output apparatus, the another sound output apparatus, cause each of the one sound output apparatus and the another sound output apparatus to output the sound.

(2) The device control apparatus according to (1),
wherein the information acquisition section acquires an output destination mode in which a dual output mode or a single output mode is set, the dual output mode being a mode in which the sound is output from each of the one sound output apparatus and the another sound output apparatus, the single output mode being a mode in which the sound is output from one of the one sound output apparatus and the another sound output apparatus, and
wherein the output control section controls the output destination of the sound in accordance with the output destination mode.

(3) The device control apparatus according to (2),
wherein, in a case where the designation information designates the another sound output apparatus and the output destination mode is set to the dual output mode, the output control section causes each of the one sound output apparatus and the another sound output apparatus to output the sound.

(4) The device control apparatus according to (3),
wherein, in a case where the designation information designates the another sound output apparatus and a setting of the output destination mode is switched from the single output mode to the dual output mode, the output control section performs switching from the output destination of the sound including the another sound output apparatus to the output destinations including the one sound output apparatus and the another sound output apparatus.

(5) The device control apparatus according to (4),
wherein, when the switching is performed from the output destination of the sound including the another sound output apparatus to the output destinations including the one sound output apparatus and the another sound output apparatus, even if there is a request to stop outputting the sound from the one sound output apparatus, the output control section continues outputting the sound from the one sound output apparatus.

(6) The device control apparatus according to (4) or (5),
wherein, when the switching is performed from the output destination of the sound including the another sound output apparatus to the output destinations including the one sound output apparatus and the another sound output apparatus, in a case where there is a request to stop outputting the sound from the one sound output apparatus, the output control section sends back a response that the output of the sound from the one sound output apparatus is continued.

(7) The device control apparatus according to any one of (3) to (6),
wherein, in a case where the output destination mode is set to the dual output mode and the designation information is updated such that an apparatus to be designated is changed from the one sound output apparatus to the another sound output apparatus, the output control section performs switching from the output destination of the sound including the one sound output apparatus to the output destinations including the one sound output apparatus and the another sound output apparatus.

(8) The device control apparatus according to any one of (3) to (7),
wherein, in a case where the designation information is updated such that an apparatus to be designated is changed from the one sound output apparatus to the another sound output apparatus, the output control section performs switching from the output destination of the sound including the one sound output apparatus to the output destinations including the one sound output apparatus and the another sound output apparatus.

(9) The device control apparatus according to (8),
wherein, in a case where the switching is performed from the output destination of the sound including the one sound output apparatus to the output destinations including the one sound output apparatus and the another sound output apparatus, the output control section switches the output destination mode to the dual output mode.

(10) The device control apparatus according to any one of (3) to (9),
wherein, when the output control section operates in accordance with a first sound output mode, in a case where the designation information designates the another sound output apparatus, the output control section causes each of the one sound output apparatus and the another sound output apparatus to output the sound.

(11) The device control apparatus according to (10),
wherein, when the output control section operates in accordance with a second sound output mode having functions more limited than functions of the first sound output mode, in a case where the output destination mode is set to the dual output mode, the output control section causes each of the one sound output apparatus and the another sound output apparatus to output the sound.

(12) The device control apparatus according to (11),
wherein, when the output control section operates in accordance with the second sound output mode, in a case where a setting of the output destination mode is switched from the single output mode to the dual output mode, the output control section performs switching from the output destination of the sound including the one sound output apparatus to the output destinations including the one sound output apparatus and the another sound output apparatus.

(13) The device control apparatus according to (11) or (12),
wherein, when the output control section operates in accordance with the second sound output mode, in a case where a power of the device control apparatus is switched from a power OFF state to a power ON state, the output control section maintains the output destinations of the sound to the one sound output apparatus and the another sound output apparatus.

(14) The device control apparatus according to any one of (10) to (13),
wherein, when a sound output mode is not selected, in a case where the output destination mode is set to the dual output mode, the output control section causes each of the one sound output apparatus and the another sound output apparatus to output the sound.

(15) A device control method including:
  acquiring designation information for designating an output destination of a sound input from an external device; and
  causing, in a case where the designation information designates, out of one sound output apparatus and another sound output apparatus, the another sound output apparatus, each of the one sound output apparatus and the another sound output apparatus to output the sound.

(16) A program for causing a computer to function as a device control apparatus including:
  an information acquisition section configured to acquire designation information for designating an output destination of a sound input from an external device; and
  an output control section configured to, in a case where the designation information designates, out of one sound output apparatus and another sound output apparatus, the another sound output apparatus, cause each of the one sound output apparatus and the another sound output apparatus to output the sound.

(17) A device control system including:
  one sound output apparatus;
  another sound output apparatus; and
  a device control apparatus including
  an information acquisition section configured to acquire designation information for designating an output destination of a sound input from an external device; and
  an output control section configured to, in a case where the designation information designates the another sound output apparatus, cause each of the one sound output apparatus and the another sound output apparatus to output the sound.

What is claimed is:

1. A device control apparatus, comprising:
  a switch;
  an information acquisition section configured to:
    acquire designation information that designates an output destination of a sound input from an external device; and
    acquire an output destination mode for the sound based on a position of the switch; and
  an output control section configured to:
    switch the output destination mode from a single output mode to a dual output mode based on the position of the switch;
    broadcast a message which indicates a system audio mode of the device control apparatus is an OFF state, wherein
      the sound is output from a second sound output apparatus in the OFF state of the system audio mode, and
      the sound is output from a first sound output apparatus in an ON state of the system audio mode;
    change, subsequent to the broadcast of the message, an Extended Display Identification Data (EDID) to indicate a performance of the second sound output apparatus,
      wherein the EDID indicates a performance of the device control apparatus prior to the change; and
    concurrently output the sound from both the first sound output apparatus and the second sound output apparatus, based on the designation information that designates the second sound output apparatus as the output destination of the sound, the indicated performance of the second sound output apparatus, and the output destination mode.

2. The device control apparatus according to claim 1,
  wherein, in the dual output mode, the sound is output from both the first sound output apparatus and the second sound output apparatus, and
  wherein, in the single output mode, the sound is output from one of the first sound output apparatus or the second sound output apparatus.

3. The device control apparatus according to claim 1, wherein based on the designation information that designates the second sound output apparatus, and based on the switch of the output destination mode switched from the single output mode to the dual output mode, the output control section is further configured to switch the output destination of the sound from the second sound output apparatus to both the first sound output apparatus and the second sound output apparatus.

4. The device control apparatus according to claim 3, wherein the output control section is further configured to continue the output of the sound from the first sound output apparatus based on the switch of the output destination of the sound from the second sound output apparatus to both the first sound output apparatus and the second sound output apparatus, and based on a request to stop the output of the sound from the first sound output apparatus.

5. The device control apparatus according to claim 4, wherein the output control section is further configured to send a response, wherein the response indicates that the output of the sound from the first sound output apparatus is continued, based on the switch of the output destination of the sound from the second sound output apparatus to both the first sound output apparatus and the second sound output apparatus, and based on the request to stop the output of the sound from the first sound output apparatus.

6. The device control apparatus according to claim 1, wherein based on the output destination mode that is set to the dual output mode, and based on the designation information that is updated such that the designated output destination is changed from the first sound output apparatus to the second sound output apparatus, the output control section is further configured to switch the output destination of the sound from the first sound output apparatus to both the first sound output apparatus and the second sound output apparatus.

7. The device control apparatus according to claim 1, wherein based on the designation information that is updated such that the designated output destination is changed from the first sound output apparatus to the second sound output apparatus, the output control section is further configured to switch the output destination of the sound from the first sound output apparatus to both the first sound output apparatus and the second sound output apparatus.

8. The device control apparatus according to claim 7, wherein the output control section is further configured to switch the output destination mode to the dual output mode based on a switch of the output destination of the sound from the first sound output apparatus to both the first sound output apparatus and the second sound output apparatus.

9. The device control apparatus according to claim 1, wherein the output control section is further configured to concurrently output the sound from the first sound output apparatus and the second sound output apparatus based on the output control section that is configured to operate in a first sound output mode, and based on the designation information that designates the second sound output apparatus.

10. The device control apparatus according to claim 9, wherein the output control section is further configured to concurrently output the sound from the first sound output apparatus and the second sound output apparatus based on the output control section that is configured to operate in a second sound output mode, and wherein the second sound output mode comprises second functions which are limited than first functions of the first sound output mode.

11. The device control apparatus according to claim 10, wherein based on the output control section that is configured to operate in the second sound output mode, and based on the switch of the output destination mode from the single output mode to the dual output mode, the output control section is further configured to switch the output destination of the sound from the first sound output apparatus to both the first sound output apparatus and the second sound output apparatus.

12. The device control apparatus according to claim 10, wherein the output control section is further configured to maintain the output destination of the sound to both the first sound output apparatus and the second sound output apparatus based on the output control section that is configured to operate in the second sound output mode, and based on a switch of a power of the device control apparatus from a power OFF state to a power ON state.

13. The device control apparatus according to claim 9, wherein the output control section is further configured to concurrently output the sound from both the first sound output apparatus and the second sound output apparatus based on non-selection of a sound output mode, and based on the output destination mode set to the dual output mode.

14. A device control method, comprising:
in a device control apparatus:
acquiring designation information for designating an output destination of a sound input from an external device;
acquiring an output destination mode for the sound based on a position of a switch on the device control apparatus;
switching the output destination mode from a single output mode to a dual output mode based on the position of the switch;
broadcasting a message which indicates a system audio mode of the device control apparatus is an OFF state, wherein
the sound is output from a second sound output apparatus in the OFF state of the system audio mode, and
the sound is output from a first sound output apparatus in an ON state of the system audio mode, subsequent to the broadcast of the message;
changing, subsequent to the broadcast of the message an Extended Display Identification Data (EDID) to indicate a performance of the second sound output apparatus,
wherein the EDID indicates a performance of the device control apparatus prior to the change; and
concurrently outputting the sound from both the first sound output apparatus and the second sound output apparatus, based on the designation information that designates the second sound output apparatus as the output destination of the sound, the indicated performance of the second sound output apparatus, and the output destination mode.

* * * * *